US012681210B2

(12) United States Patent
Forouzmand et al.

(10) Patent No.: US 12,681,210 B2
(45) Date of Patent: Jul. 14, 2026

(54) SELF-ALIGNED NANO-PILLAR COATINGS AND METHOD OF MANUFACTURING

(71) Applicant: Metalenz, Inc., Boston, MA (US)

(72) Inventors: Seyedali Forouzmand, Malden, MA (US); Pawel Latawiec, Chicago, IL (US)

(73) Assignee: Metalenz, Inc., Boston, MA (US)

( * ) Notice: Subject to any disclaimer, the term of this patent is extended or adjusted under 35 U.S.C. 154(b) by 285 days.

(21) Appl. No.: 18/260,464

(22) PCT Filed: Jan. 5, 2022

(86) PCT No.: PCT/US2022/070043
§ 371 (c)(1),
(2) Date: Jul. 5, 2023

(87) PCT Pub. No.: WO2022/150816
PCT Pub. Date: Jul. 14, 2022

(65) Prior Publication Data
US 2024/0012177 A1    Jan. 11, 2024

Related U.S. Application Data

(60) Provisional application No. 63/134,372, filed on Jan. 6, 2021.

(51) Int. Cl.
*G02B 1/00* (2006.01)
*B82Y 20/00* (2011.01)

(52) U.S. Cl.
CPC .............. *G02B 1/002* (2013.01); *B82Y 20/00* (2013.01); *G02B 2207/101* (2013.01)

(58) Field of Classification Search
CPC ........ G02B 5/008; G02B 1/002; G02B 1/007; G02B 26/06; G02B 1/005; G02B 5/1809; G02F 1/292; G02F 2202/30
See application file for complete search history.

(56) References Cited

U.S. PATENT DOCUMENTS 3,877,034 A     4/1975  Nelson
4,777,116 A     10/1988  Kawatsuki et al.
(Continued)

FOREIGN PATENT DOCUMENTS

CA          3006173 A1     6/2017
CA          3020261 A1    10/2017
(Continued)

OTHER PUBLICATIONS

Extended European Search Report for European Application No. 16869282.0, Search completed Nov. 8, 2019, Mailed Nov. 20, 2019, 15 pgs.
(Continued)

*Primary Examiner* — Jonathan Y Jung
(74) *Attorney, Agent, or Firm* — KPPB LLP

(57)          ABSTRACT

Meta-surface devices may be advantageously used for miniaturization, planar and thin film, high spatial resolution, and dense integration into optical devices. They have the potential to be used for steering a beam propagation direction, shaping wave-front light, and imparting information for application such as sensing, imaging, light detection, and ranging. However, meta-surface devices may have poor overall efficiency when compared with traditional optical devices. Embodiments of this disclosure relate to meta-surface devices including a pattern of high-index pillars with a low-index coating. Advantageously, the low-index coating may improve optical efficiency of the meta-surface devices which may make these meta-surface devices suitable for a variety of applications.

20 Claims, 32 Drawing Sheets

(56) References Cited

U.S. PATENT DOCUMENTS

| | | | |
|---|---|---|---|
| 4,856,899 A | 8/1989 | Iwaoka et al. |
| 5,085,496 A | 2/1992 | Yoshida et al. |
| 5,245,466 A | 9/1993 | Burns et al. |
| 5,337,146 A | 8/1994 | Azzam |
| 5,452,126 A | 9/1995 | Johnson |
| 5,620,792 A | 4/1997 | Challener |
| 6,097,856 A | 8/2000 | Hammond |
| 6,731,839 B2 | 5/2004 | Bhagavatula et al. |
| 6,825,986 B2 | 11/2004 | Ashkinazy et al. |
| 6,834,027 B1 | 12/2004 | Sakaguchi et al. |
| 6,924,457 B2 | 8/2005 | Koyama et al. |
| 6,927,922 B2 | 8/2005 | George et al. |
| 7,057,151 B2 | 6/2006 | Lezec et al. |
| 7,061,612 B2 | 6/2006 | Johnston |
| 7,061,693 B2 | 6/2006 | Zalevsky |
| 7,171,078 B2 | 1/2007 | Sasaki et al. |
| 7,171,084 B2 | 1/2007 | Izumi et al. |
| 7,186,969 B2 | 3/2007 | Altendorf et al. |
| 7,241,988 B2 | 7/2007 | Gruber et al. |
| 7,324,210 B2 | 1/2008 | De et al. |
| 7,327,468 B2 | 2/2008 | Maznev et al. |
| 7,402,131 B2 | 7/2008 | Mueth et al. |
| 7,450,618 B2 | 11/2008 | Dantus et al. |
| 7,547,874 B2 | 6/2009 | Liang |
| 7,561,264 B2 | 7/2009 | Treado et al. |
| 7,576,899 B2 | 8/2009 | Kanesaka et al. |
| 7,679,830 B2 | 3/2010 | Dowski |
| 7,684,097 B2 | 3/2010 | Fukumoto et al. |
| 7,773,307 B2 | 8/2010 | Shih |
| 7,800,683 B2 | 9/2010 | Zalevsky et al. |
| 7,812,295 B2 | 10/2010 | Zalevsky et al. |
| 7,928,900 B2 | 4/2011 | Fuller et al. |
| 7,929,220 B2 | 4/2011 | Sayag |
| 7,965,607 B2 | 6/2011 | Fukumoto et al. |
| 8,009,358 B2 | 8/2011 | Zalevsky et al. |
| 8,040,604 B2 | 10/2011 | Zalevsky et al. |
| 8,107,705 B2 | 1/2012 | Dowski et al. |
| 8,152,307 B2 | 4/2012 | Duelli et al. |
| 8,169,703 B1 | 5/2012 | Mossberg et al. |
| 8,192,022 B2 | 6/2012 | Zalevsky |
| 8,212,866 B2 | 7/2012 | Lemmer et al. |
| 8,318,386 B2 | 11/2012 | Kobrin |
| 8,328,396 B2 | 12/2012 | Capasso et al. |
| 8,351,048 B2 | 1/2013 | Millerd |
| 8,351,120 B2 | 1/2013 | Deng et al. |
| 8,390,932 B2 | 3/2013 | Jia et al. |
| 8,400,494 B2 | 3/2013 | Zalevsky et al. |
| 8,430,513 B2 | 4/2013 | Chang et al. |
| 8,451,368 B2 | 5/2013 | Sung et al. |
| 8,472,797 B2 | 6/2013 | Ok et al. |
| 8,481,948 B2 | 7/2013 | Frach et al. |
| 8,558,873 B2 | 10/2013 | Mceldowney |
| 8,587,474 B2 | 11/2013 | Fuller et al. |
| 8,649,631 B2 | 2/2014 | Islam et al. |
| 8,681,428 B1 | 3/2014 | Brown |
| 8,687,040 B2 | 4/2014 | Silveira |
| 8,716,677 B2 | 5/2014 | Cui |
| 8,734,033 B2 | 5/2014 | Walters et al. |
| 8,743,923 B2 | 6/2014 | Geske et al. |
| 8,816,460 B2 | 8/2014 | Kalevo et al. |
| 8,848,273 B2 | 9/2014 | Yu et al. |
| 8,876,289 B2 | 11/2014 | Dorronsoro Diaz et al. |
| 8,908,149 B2 | 12/2014 | Freimann |
| 8,912,973 B2 | 12/2014 | Werner et al. |
| 8,981,337 B1 | 3/2015 | Burckel et al. |
| 9,007,451 B2 | 4/2015 | Rogers et al. |
| 9,116,302 B2 | 8/2015 | Mccarthy et al. |
| 9,151,891 B2 | 10/2015 | Ma et al. |
| 9,212,899 B2 | 12/2015 | Johnson et al. |
| 9,298,060 B2 | 3/2016 | Shen et al. |
| 9,309,274 B2 | 4/2016 | Van Der Boom et al. |
| 9,310,535 B1 | 4/2016 | Greiner et al. |
| 9,329,484 B1 | 5/2016 | Markle et al. |
| 9,330,704 B2 | 5/2016 | Nishimura et al. |
| 9,367,036 B2 | 6/2016 | Pyun et al. |
| 9,369,621 B2 | 6/2016 | Malone et al. |
| 9,391,700 B1 | 7/2016 | Bruce et al. |
| 9,392,153 B2 | 7/2016 | Myhre et al. |
| 9,411,103 B2 | 8/2016 | Astratov |
| 9,482,796 B2 | 11/2016 | Arbabi et al. |
| 9,500,771 B2 | 11/2016 | Liu et al. |
| 9,553,423 B2 | 1/2017 | Chen et al. |
| 9,557,585 B1 | 1/2017 | Yap et al. |
| 9,606,415 B2 | 3/2017 | Zheludev et al. |
| 9,609,190 B2 | 3/2017 | Lee et al. |
| 9,739,918 B2 | 8/2017 | Arbabi et al. |
| 9,766,463 B2 | 9/2017 | Border et al. |
| 9,778,404 B2 | 10/2017 | Divliansky et al. |
| 9,825,074 B2 | 11/2017 | Tian et al. |
| 9,829,700 B2 | 11/2017 | Parent et al. |
| 9,835,870 B2 | 12/2017 | Astratov et al. |
| 9,836,122 B2 | 12/2017 | Border |
| 9,869,580 B2 | 1/2018 | Grossinger et al. |
| 9,880,377 B1 | 1/2018 | Safrani et al. |
| 9,885,859 B2 | 2/2018 | Harris |
| 9,891,393 B2 | 2/2018 | Reece |
| 9,939,129 B2 | 4/2018 | Byrnes et al. |
| 9,947,118 B2 | 4/2018 | Khare et al. |
| 9,952,096 B2 | 4/2018 | Kats et al. |
| 9,958,251 B1 | 5/2018 | Brock et al. |
| 9,967,541 B2 | 5/2018 | Piestun |
| 9,978,801 B2 | 5/2018 | Park et al. |
| 9,989,680 B2 | 6/2018 | Arbabi et al. |
| 9,992,474 B2 | 6/2018 | Grunnet-Jepsen et al. |
| 9,995,859 B2 | 6/2018 | Kamali et al. |
| 9,995,930 B2 | 6/2018 | Arbabi et al. |
| 10,007,118 B2 | 6/2018 | Border |
| 10,054,859 B2 | 8/2018 | Ye et al. |
| 10,084,239 B2 | 9/2018 | Shaver et al. |
| 10,108,085 B2 | 10/2018 | Peters et al. |
| 10,126,466 B2 | 11/2018 | Lin et al. |
| 10,132,465 B2 | 11/2018 | Byrnes et al. |
| 10,149,612 B2 | 12/2018 | Muyo et al. |
| 10,155,846 B2 | 12/2018 | Fuji et al. |
| 10,234,383 B2 | 3/2019 | Wang et al. |
| 10,254,454 B2 | 4/2019 | Klug et al. |
| 10,267,957 B2 | 4/2019 | Kamali et al. |
| 10,310,148 B2 | 6/2019 | Stewart et al. |
| 10,310,387 B2 | 6/2019 | Palmer et al. |
| 10,315,951 B2 | 6/2019 | Toussaint et al. |
| 10,317,667 B2 | 6/2019 | Waller et al. |
| 10,324,314 B2 | 6/2019 | Czaplewski et al. |
| 10,338,275 B1 | 7/2019 | Acosta et al. |
| 10,341,640 B2 | 7/2019 | Shechtman et al. |
| 10,345,246 B2 | 7/2019 | Tian et al. |
| 10,345,519 B1 | 7/2019 | Miller et al. |
| 10,365,416 B2 | 7/2019 | Zhan et al. |
| 10,371,936 B2 | 8/2019 | Didomenico |
| 10,386,620 B2 | 8/2019 | Astratov et al. |
| 10,388,805 B2 | 8/2019 | Engel et al. |
| 10,402,993 B2 | 9/2019 | Han et al. |
| 10,408,416 B2 | 9/2019 | Khorasaninejad et al. |
| 10,408,419 B2 | 9/2019 | Aieta et al. |
| 10,416,565 B2 | 9/2019 | Ahmed et al. |
| 10,435,814 B2 | 10/2019 | Plummer et al. |
| 10,440,244 B2 | 10/2019 | Rosenblatt et al. |
| 10,440,300 B2 | 10/2019 | Rephaeli et al. |
| 10,466,394 B2 | 11/2019 | Lin et al. |
| 10,468,447 B2 | 11/2019 | Akselrod et al. |
| 10,481,317 B2 | 11/2019 | Peroz et al. |
| 10,514,296 B2 | 12/2019 | Han et al. |
| 10,527,832 B2 | 1/2020 | Schwab et al. |
| 10,527,851 B2 | 1/2020 | Lin et al. |
| 10,536,688 B2 | 1/2020 | Haas et al. |
| 10,539,723 B2 | 1/2020 | Iazikov et al. |
| 10,545,323 B2 | 1/2020 | Schwab et al. |
| 10,591,643 B2 | 3/2020 | Lin et al. |
| 10,670,782 B2 | 6/2020 | Arbabi et al. |
| 10,725,290 B2 | 7/2020 | Fan et al. |
| 10,795,168 B2 | 10/2020 | Riley et al. |
| 10,816,704 B2 | 10/2020 | Arbabi et al. |
| 10,816,815 B2 | 10/2020 | Aieta et al. |
| 10,916,060 B2 | 2/2021 | West et al. |
| 11,092,717 B2 | 8/2021 | Capasso et al. |

(56) References Cited

U.S. PATENT DOCUMENTS

| | | |
|---|---|---|
| 11,231,544 B2 | 1/2022 | Lin et al. |
| 11,298,052 B2 | 4/2022 | Palikaras et al. |
| 11,385,516 B2 | 7/2022 | Didomenico |
| 11,579,456 B2 | 2/2023 | Riley et al. |
| 2002/0048727 A1 | 4/2002 | Zhou et al. |
| 2002/0118903 A1 | 8/2002 | Cottrell et al. |
| 2002/0181126 A1 | 12/2002 | Nishioka |
| 2003/0077983 A1 | 4/2003 | Hagan et al. |
| 2003/0107787 A1 | 6/2003 | Bablumyan |
| 2004/0173738 A1 | 9/2004 | Mizuno |
| 2004/0184752 A1 | 9/2004 | Aoki et al. |
| 2004/0190116 A1 | 9/2004 | Lezec et al. |
| 2004/0258128 A1 | 12/2004 | Johs et al. |
| 2005/0151698 A1 | 7/2005 | Mohamadi |
| 2005/0161589 A1 | 7/2005 | Kim et al. |
| 2005/0211665 A1 | 9/2005 | Gao et al. |
| 2005/0220162 A1 | 10/2005 | Nakamura |
| 2005/0239003 A1 | 10/2005 | Chiodini et al. |
| 2006/0042322 A1 | 3/2006 | Mendoza et al. |
| 2006/0127829 A1 | 6/2006 | Deng et al. |
| 2007/0024975 A1 | 2/2007 | McGrew |
| 2007/0026585 A1 | 2/2007 | Wong et al. |
| 2007/0273957 A1 | 11/2007 | Zalevsky et al. |
| 2008/0014632 A1 | 1/2008 | Cunningham et al. |
| 2009/0135086 A1 | 5/2009 | Fuller et al. |
| 2009/0230333 A1 | 9/2009 | Eleftheriades |
| 2009/0296223 A1 | 12/2009 | Werner et al. |
| 2010/0033701 A1 | 2/2010 | Lee et al. |
| 2010/0055621 A1 | 3/2010 | Hatakeyama et al. |
| 2010/0072170 A1 | 3/2010 | Wu et al. |
| 2010/0091224 A1* | 4/2010 | Cho ........................ G02B 5/201 |
| | | 359/589 |
| 2010/0110430 A1 | 5/2010 | Ebbesen et al. |
| 2010/0134869 A1 | 6/2010 | Bernet et al. |
| 2010/0177164 A1 | 7/2010 | Zalevsky et al. |
| 2010/0187658 A1 | 7/2010 | Wei |
| 2010/0226134 A1 | 9/2010 | Capasso et al. |
| 2010/0232017 A1 | 9/2010 | Mccarthy et al. |
| 2010/0255428 A1 | 10/2010 | Chen et al. |
| 2010/0259823 A1 | 10/2010 | Xi et al. |
| 2011/0012807 A1 | 1/2011 | Sorvala |
| 2011/0019180 A1 | 1/2011 | Kruglick |
| 2011/0187577 A1 | 8/2011 | Fuller et al. |
| 2012/0140235 A1 | 6/2012 | Lee et al. |
| 2012/0258407 A1 | 10/2012 | Sirat |
| 2012/0293854 A1 | 11/2012 | Zheludev et al. |
| 2012/0327666 A1 | 12/2012 | Liu et al. |
| 2012/0328240 A1 | 12/2012 | Ma et al. |
| 2013/0016030 A1 | 1/2013 | Liu et al. |
| 2013/0037873 A1 | 2/2013 | Suzuki et al. |
| 2013/0050285 A1 | 2/2013 | Takahashi et al. |
| 2013/0058071 A1 | 3/2013 | Ben |
| 2013/0194787 A1 | 8/2013 | Geske et al. |
| 2013/0208332 A1 | 8/2013 | Yu et al. |
| 2014/0043846 A1 | 2/2014 | Yang et al. |
| 2014/0210835 A1 | 7/2014 | Hong et al. |
| 2015/0011073 A1 | 1/2015 | Lei et al. |
| 2015/0017466 A1 | 1/2015 | Ayon et al. |
| 2015/0018500 A1 | 1/2015 | Gerber et al. |
| 2015/0055745 A1 | 2/2015 | Holzner et al. |
| 2015/0068599 A1 | 3/2015 | Chou |
| 2015/0090862 A1 | 4/2015 | Matsui et al. |
| 2015/0092139 A1 | 4/2015 | Eguchi |
| 2015/0098002 A1 | 4/2015 | Wang |
| 2015/0116721 A1 | 4/2015 | Kats et al. |
| 2015/0219806 A1 | 8/2015 | Arbabi et al. |
| 2015/0241608 A1 | 8/2015 | Shian et al. |
| 2015/0316717 A1 | 11/2015 | Astratov |
| 2016/0025914 A1 | 1/2016 | Brongersma et al. |
| 2016/0037146 A1 | 2/2016 | Mcgrew |
| 2016/0077261 A1 | 3/2016 | Arbabi et al. |
| 2016/0161826 A1 | 6/2016 | Shen et al. |
| 2016/0195705 A1 | 7/2016 | Betzig et al. |
| 2016/0254638 A1 | 9/2016 | Chen et al. |
| 2016/0276979 A1 | 9/2016 | Shaver et al. |
| 2016/0299337 A1 | 10/2016 | Arbabi et al. |
| 2016/0299426 A1 | 10/2016 | Gates et al. |
| 2016/0306079 A1 | 10/2016 | Arbabi et al. |
| 2016/0306157 A1 | 10/2016 | Rho et al. |
| 2016/0318067 A1 | 11/2016 | Banerjee et al. |
| 2016/0331457 A1 | 11/2016 | Varghese et al. |
| 2016/0341859 A1 | 11/2016 | Shvets et al. |
| 2016/0359235 A1 | 12/2016 | Driscoll et al. |
| 2016/0361002 A1 | 12/2016 | Palikaras et al. |
| 2016/0370568 A1 | 12/2016 | Toussaint et al. |
| 2017/0003169 A1 | 1/2017 | Shaltout et al. |
| 2017/0010466 A1 | 1/2017 | Klug et al. |
| 2017/0030773 A1 | 2/2017 | Han et al. |
| 2017/0038574 A1 | 2/2017 | Zhuang et al. |
| 2017/0045652 A1 | 2/2017 | Arbabi et al. |
| 2017/0082263 A1 | 3/2017 | Byrnes et al. |
| 2017/0090221 A1 | 3/2017 | Atwater |
| 2017/0121843 A1 | 5/2017 | Plummer et al. |
| 2017/0125911 A1 | 5/2017 | Alu et al. |
| 2017/0131460 A1 | 5/2017 | Lin et al. |
| 2017/0146806 A1 | 5/2017 | Lin et al. |
| 2017/0176758 A1 | 6/2017 | Lerner et al. |
| 2017/0186166 A1 | 6/2017 | Grunnet-jepsen et al. |
| 2017/0201658 A1 | 7/2017 | Rosenblatt et al. |
| 2017/0212285 A1 | 7/2017 | Arbabi et al. |
| 2017/0235162 A1 | 8/2017 | Shaltout et al. |
| 2017/0250577 A1 | 8/2017 | Ho et al. |
| 2017/0299784 A1 | 10/2017 | Mikkelsen et al. |
| 2017/0329201 A1 | 11/2017 | Arnold |
| 2017/0374352 A1 | 12/2017 | Horesh |
| 2018/0035101 A1 | 2/2018 | Osterhout |
| 2018/0039102 A1* | 2/2018 | Baik ....................... G06F 30/17 |
| 2018/0044234 A1 | 2/2018 | Hokansson et al. |
| 2018/0045953 A1 | 2/2018 | Fan et al. |
| 2018/0052276 A1 | 2/2018 | Klienman et al. |
| 2018/0052320 A1 | 2/2018 | Curtis et al. |
| 2018/0107015 A1 | 4/2018 | Dümpelmann et al. |
| 2018/0129866 A1 | 5/2018 | Hicks et al. |
| 2018/0216797 A1 | 8/2018 | Khorasaninejad et al. |
| 2018/0217395 A1 | 8/2018 | Lin et al. |
| 2018/0224574 A1 | 8/2018 | Lee et al. |
| 2018/0231700 A1 | 8/2018 | Ahmed et al. |
| 2018/0231702 A1 | 8/2018 | Lin et al. |
| 2018/0236596 A1 | 8/2018 | Ihlemann et al. |
| 2018/0246262 A1 | 8/2018 | Zhan et al. |
| 2018/0248268 A1 | 8/2018 | Shvets et al. |
| 2018/0252857 A1 | 9/2018 | Glik et al. |
| 2018/0259700 A1 | 9/2018 | Khorasaninejad et al. |
| 2018/0259757 A1 | 9/2018 | Urzhumov |
| 2018/0267605 A1 | 9/2018 | Border |
| 2018/0274750 A1 | 9/2018 | Byrnes et al. |
| 2018/0299595 A1 | 10/2018 | Arbabi et al. |
| 2018/0314130 A1 | 11/2018 | Joo et al. |
| 2018/0341090 A1 | 11/2018 | Devlin et al. |
| 2018/0364158 A1 | 12/2018 | Wang et al. |
| 2019/0003892 A1 | 1/2019 | Aieta et al. |
| 2019/0025463 A1 | 1/2019 | She et al. |
| 2019/0025477 A1 | 1/2019 | She et al. |
| 2019/0041642 A1 | 2/2019 | Haddick et al. |
| 2019/0044003 A1 | 2/2019 | Heck et al. |
| 2019/0049632 A1 | 2/2019 | Shin et al. |
| 2019/0049732 A1 | 2/2019 | Lee et al. |
| 2019/0057512 A1 | 2/2019 | Han et al. |
| 2019/0064532 A1* | 2/2019 | Riley, Jr. ............ G02B 27/0916 |
| 2019/0086579 A1 | 3/2019 | Kim et al. |
| 2019/0086683 A1 | 3/2019 | Aieta et al. |
| 2019/0101448 A1 | 4/2019 | Lee et al. |
| 2019/0113775 A1 | 4/2019 | Jang et al. |
| 2019/0120817 A1 | 4/2019 | Anderson |
| 2019/0121004 A1 | 4/2019 | Ahmed et al. |
| 2019/0137075 A1 | 5/2019 | Aieta et al. |
| 2019/0137793 A1 | 5/2019 | Luo et al. |
| 2019/0154877 A1 | 5/2019 | Capasso et al. |
| 2019/0170655 A1 | 6/2019 | Smith |
| 2019/0196068 A1 | 6/2019 | Tsai et al. |
| 2019/0206136 A1 | 7/2019 | West et al. |
| 2019/0219835 A1 | 7/2019 | Skinner et al. |
| 2019/0235139 A1 | 8/2019 | Chen et al. |
| 2019/0250107 A1 | 8/2019 | Sreenivasan et al. |

(56) References Cited

U.S. PATENT DOCUMENTS

| | | | |
|---|---|---|---|
| 2019/0369401 A1 | 12/2019 | Rolland et al. | |
| 2019/0377084 A1 | 12/2019 | Sleasman et al. | |
| 2019/0391378 A1 | 12/2019 | Eichelkraut et al. | |
| 2020/0025888 A1 | 1/2020 | Jang et al. | |
| 2020/0096672 A1 | 3/2020 | Yu et al. | |
| 2020/0096833 A1* | 3/2020 | Lee | G02B 1/002 |
| 2020/0174163 A1 | 6/2020 | Han et al. | |
| 2020/0270746 A1 | 8/2020 | Roy et al. | |
| 2020/0271941 A1 | 8/2020 | Riley et al. | |
| 2020/0387046 A1* | 12/2020 | Kim | G02F 1/292 |
| 2021/0014394 A1* | 1/2021 | Han | G02B 5/286 |
| 2021/0028215 A1 | 1/2021 | Devlin et al. | |
| 2021/0048569 A1 | 2/2021 | Rubin et al. | |
| 2021/0109364 A1 | 4/2021 | Aieta et al. | |
| 2021/0190593 A1 | 6/2021 | Yao | |
| 2021/0208469 A1 | 7/2021 | Didomenico | |
| 2021/0302763 A1 | 9/2021 | Yao et al. | |
| 2022/0091428 A1 | 3/2022 | Riley et al. | |
| 2022/0197107 A1* | 6/2022 | Ogawa | G02F 1/31 |
| 2022/0206186 A1 | 6/2022 | Chen et al. | |
| 2022/0214219 A1 | 7/2022 | Faraon et al. | |
| 2023/0194883 A1 | 6/2023 | Riley et al. | |

FOREIGN PATENT DOCUMENTS

| | | | |
|---|---|---|---|
| CA | 3064764 A1 | 11/2018 |
| CA | 3020261 C | 9/2025 |
| CN | 101158727 A | 4/2008 |
| CN | 101164147 A | 4/2008 |
| CN | 100476504 C | 4/2009 |
| CN | 101510013 B | 6/2010 |
| CN | 101510012 B | 8/2010 |
| CN | 101510011 B | 9/2010 |
| CN | 101241173 B | 8/2011 |
| CN | 202854395 U | 4/2013 |
| CN | 103092049 A | 5/2013 |
| CN | 203799117 U | 8/2014 |
| CN | 104374745 A | 2/2015 |
| CN | 204422813 U | 6/2015 |
| CN | 104932043 A | 9/2015 |
| CN | 104956491 A | 9/2015 |
| CN | 204719330 U | 10/2015 |
| CN | 105068396 A | 11/2015 |
| CN | 103869484 B | 1/2016 |
| CN | 105223689 A | 1/2016 |
| CN | 105278026 A | 1/2016 |
| CN | 105278309 A | 1/2016 |
| CN | 105655286 A | 6/2016 |
| CN | 105676314 A | 6/2016 |
| CN | 105917277 A | 8/2016 |
| CN | 103257441 B | 10/2016 |
| CN | 205620619 U | 10/2016 |
| CN | 104834079 B | 4/2017 |
| CN | 106611699 A | 5/2017 |
| CN | 104834089 B | 6/2017 |
| CN | 106848555 A | 6/2017 |
| CN | 106200276 B | 10/2017 |
| CN | 104834088 B | 12/2017 |
| CN | 105676314 B | 1/2018 |
| CN | 107561857 A | 1/2018 |
| CN | 108089325 A | 5/2018 |
| CN | 108291983 A | 7/2018 |
| CN | 207623619 U | 7/2018 |
| CN | 106199997 B | 8/2018 |
| CN | 108474869 A | 8/2018 |
| CN | 108507542 A | 9/2018 |
| CN | 207923075 U | 9/2018 |
| CN | 108680544 A | 10/2018 |
| CN | 108761779 A | 11/2018 |
| CN | 109000692 A | 12/2018 |
| CN | 208270846 U | 12/2018 |
| CN | 109196387 A | 1/2019 |
| CN | 106199956 B | 2/2019 |
| CN | 109360139 A | 2/2019 |
| CN | 106950195 B | 5/2019 |
| CN | 106324832 B | 7/2019 |
| CN | 106526730 B | 7/2019 |
| CN | 106485761 B | 8/2019 |
| CN | 110160685 A | 8/2019 |
| CN | 110678773 A | 1/2020 |
| CN | 108474869 B | 6/2020 |
| CN | 111316138 A | 6/2020 |
| CN | 111580190 A | 8/2020 |
| CN | 111656707 A | 9/2020 |
| CN | 111819489 A | 10/2020 |
| CN | 213092332 U | 4/2021 |
| CN | 113050295 A | 6/2021 |
| CN | 110376665 B | 8/2021 |
| CN | 213902664 U | 8/2021 |
| CN | 213903843 U | 8/2021 |
| CN | 214098104 U | 8/2021 |
| CN | 113703080 A | 11/2021 |
| CN | 113791524 A | 12/2021 |
| CN | 113807312 A | 12/2021 |
| CN | 113820839 A | 12/2021 |
| CN | 113834568 A | 12/2021 |
| CN | 113835227 A | 12/2021 |
| CN | 113851573 A | 12/2021 |
| CN | 215005942 U | 12/2021 |
| CN | 215010478 U | 12/2021 |
| CN | 110494771 B | 1/2022 |
| CN | 113885106 A | 1/2022 |
| CN | 113899451 A | 1/2022 |
| CN | 113900078 A | 1/2022 |
| CN | 113900162 A | 1/2022 |
| CN | 113917574 A | 1/2022 |
| CN | 113917578 A | 1/2022 |
| CN | 113934004 A | 1/2022 |
| CN | 113934005 A | 1/2022 |
| CN | 113959984 A | 1/2022 |
| CN | 114002707 A | 2/2022 |
| CN | 114019589 A | 2/2022 |
| CN | 114047632 A | 2/2022 |
| CN | 114047637 A | 2/2022 |
| CN | 114112058 A | 3/2022 |
| CN | 114156168 A | 3/2022 |
| CN | 114176492 A | 3/2022 |
| CN | 215932365 U | 3/2022 |
| CN | 114280704 A | 4/2022 |
| CN | 114280716 A | 4/2022 |
| CN | 114296180 A | 4/2022 |
| CN | 114325886 A | 4/2022 |
| CN | 114326163 A | 4/2022 |
| CN | 114354141 A | 4/2022 |
| CN | 114373825 A | 4/2022 |
| CN | 114384612 A | 4/2022 |
| CN | 114397092 A | 4/2022 |
| CN | 114397718 A | 4/2022 |
| CN | 114415386 A | 4/2022 |
| CN | 216345776 U | 4/2022 |
| CN | 216351311 U | 4/2022 |
| CN | 216351591 U | 4/2022 |
| CN | 216355281 U | 4/2022 |
| CN | 216361353 U | 4/2022 |
| CN | 111316138 B | 5/2022 |
| CN | 114488365 A | 5/2022 |
| CN | 114543993 A | 5/2022 |
| CN | 114545367 A | 5/2022 |
| CN | 114545370 A | 5/2022 |
| CN | 114554062 A | 5/2022 |
| CN | 114561266 A | 5/2022 |
| CN | 216593224 U | 5/2022 |
| CN | 216605227 U | 5/2022 |
| CN | 216622749 U | 5/2022 |
| CN | 114578642 A | 6/2022 |
| CN | 114593689 A | 6/2022 |
| CN | 114623960 A | 6/2022 |
| CN | 114624878 A | 6/2022 |
| CN | 114660683 A | 6/2022 |
| CN | 114660780 A | 6/2022 |
| CN | 114690387 A | 7/2022 |
| CN | 114740631 A | 7/2022 |
| CN | 114743714 A | 7/2022 |
| CN | 114779437 A | 7/2022 |

(56) References Cited

FOREIGN PATENT DOCUMENTS

| | | | |
|---|---|---|---|
| CN | 216896898 U | 7/2022 |
| CN | 216900930 U | 7/2022 |
| CN | 216901121 U | 7/2022 |
| CN | 216901165 U | 7/2022 |
| CN | 216901317 U | 7/2022 |
| CN | 216901952 U | 7/2022 |
| CN | 216903719 U | 7/2022 |
| CN | 216933177 U | 7/2022 |
| CN | 217034311 U | 7/2022 |
| CN | 217034418 U | 7/2022 |
| CN | 217034466 U | 7/2022 |
| CN | 114859446 A | 8/2022 |
| CN | 114859447 A | 8/2022 |
| CN | 114859570 A | 8/2022 |
| CN | 114935741 A | 8/2022 |
| CN | 217276608 U | 8/2022 |
| CN | 217278911 U | 8/2022 |
| CN | 217278915 U | 8/2022 |
| CN | 217278989 U | 8/2022 |
| CN | 217279003 U | 8/2022 |
| CN | 217279087 U | 8/2022 |
| CN | 217279110 U | 8/2022 |
| CN | 217279168 U | 8/2022 |
| CN | 217279244 U | 8/2022 |
| CN | 217280797 U | 8/2022 |
| CN | 217280851 U | 8/2022 |
| CN | 217281621 U | 8/2022 |
| CN | 217281623 U | 8/2022 |
| CN | 114995038 A | 9/2022 |
| CN | 115016099 A | 9/2022 |
| CN | 115016150 A | 9/2022 |
| CN | 115032766 A | 9/2022 |
| CN | 115047432 A | 9/2022 |
| CN | 115047548 A | 9/2022 |
| CN | 115047653 A | 9/2022 |
| CN | 115061114 A | 9/2022 |
| CN | 115079415 A | 9/2022 |
| CN | 115113174 A | 9/2022 |
| CN | 217456368 U | 9/2022 |
| CN | 217465697 U | 9/2022 |
| CN | 217466052 U | 9/2022 |
| CN | 217466667 U | 9/2022 |
| CN | 217467162 U | 9/2022 |
| CN | 217467176 U | 9/2022 |
| CN | 217467177 U | 9/2022 |
| CN | 217467226 U | 9/2022 |
| CN | 217467326 U | 9/2022 |
| CN | 217467327 U | 9/2022 |
| CN | 217467336 U | 9/2022 |
| CN | 217467338 U | 9/2022 |
| CN | 217467351 U | 9/2022 |
| CN | 217467352 U | 9/2022 |
| CN | 217467353 U | 9/2022 |
| CN | 217467355 U | 9/2022 |
| CN | 217467357 U | 9/2022 |
| CN | 217467358 U | 9/2022 |
| CN | 217467363 U | 9/2022 |
| CN | 217467364 U | 9/2022 |
| CN | 217467367 U | 9/2022 |
| CN | 217467368 U | 9/2022 |
| CN | 217467395 U | 9/2022 |
| CN | 217467396 U | 9/2022 |
| CN | 217467399 U | 9/2022 |
| CN | 217467439 U | 9/2022 |
| CN | 217467452 U | 9/2022 |
| CN | 115164714 A | 10/2022 |
| CN | 115166876 A | 10/2022 |
| CN | 115166958 A | 10/2022 |
| CN | 115185082 A | 10/2022 |
| CN | 115211799 A | 10/2022 |
| CN | 115236795 A | 10/2022 |
| CN | 217639515 U | 10/2022 |
| CN | 217639519 U | 10/2022 |
| CN | 217639539 U | 10/2022 |
| CN | 217639544 U | 10/2022 |
| CN | 217639611 U | 10/2022 |
| CN | 217639612 U | 10/2022 |
| CN | 217639613 U | 10/2022 |
| CN | 217639715 U | 10/2022 |
| CN | 217639718 U | 10/2022 |
| CN | 217639719 U | 10/2022 |
| CN | 217639720 U | 10/2022 |
| CN | 217639722 U | 10/2022 |
| CN | 217639723 U | 10/2022 |
| CN | 217639724 U | 10/2022 |
| CN | 217639725 U | 10/2022 |
| CN | 217639726 U | 10/2022 |
| CN | 217639763 U | 10/2022 |
| CN | 217639765 U | 10/2022 |
| CN | 217639767 U | 10/2022 |
| CN | 217639768 U | 10/2022 |
| CN | 217639769 U | 10/2022 |
| CN | 217639770 U | 10/2022 |
| CN | 217639771 U | 10/2022 |
| CN | 217639772 U | 10/2022 |
| CN | 217639773 U | 10/2022 |
| CN | 217639774 U | 10/2022 |
| CN | 217639776 U | 10/2022 |
| CN | 217639777 U | 10/2022 |
| CN | 217639778 U | 10/2022 |
| CN | 217639903 U | 10/2022 |
| CN | 217639920 U | 10/2022 |
| CN | 115268058 A | 11/2022 |
| CN | 115327865 A | 11/2022 |
| CN | 115332917 A | 11/2022 |
| CN | 115343795 A | 11/2022 |
| CN | 115390176 A | 11/2022 |
| CN | 217809433 U | 11/2022 |
| CN | 217818613 U | 11/2022 |
| CN | 217819022 U | 11/2022 |
| CN | 217820828 U | 11/2022 |
| CN | 217820829 U | 11/2022 |
| CN | 217820831 U | 11/2022 |
| CN | 217820834 U | 11/2022 |
| CN | 217820838 U | 11/2022 |
| CN | 217820839 U | 11/2022 |
| CN | 217820840 U | 11/2022 |
| CN | 217820943 U | 11/2022 |
| CN | 217820944 U | 11/2022 |
| CN | 217820945 U | 11/2022 |
| CN | 217820971 U | 11/2022 |
| CN | 217821058 U | 11/2022 |
| CN | 217821068 U | 11/2022 |
| CN | 217821071 U | 11/2022 |
| CN | 217821091 U | 11/2022 |
| CN | 217821110 U | 11/2022 |
| CN | 217821111 U | 11/2022 |
| CN | 217821113 U | 11/2022 |
| CN | 217821122 U | 11/2022 |
| CN | 217821160 U | 11/2022 |
| CN | 217821236 U | 11/2022 |
| CN | 217821680 U | 11/2022 |
| CN | 217821696 U | 11/2022 |
| CN | 217822825 U | 11/2022 |
| CN | 217823690 U | 11/2022 |
| CN | 217825178 U | 11/2022 |
| CN | 217885960 U | 11/2022 |
| CN | 217902220 U | 11/2022 |
| CN | 217902222 U | 11/2022 |
| CN | 115421295 A | 12/2022 |
| CN | 115453754 A | 12/2022 |
| CN | 115524768 A | 12/2022 |
| CN | 115524775 A | 12/2022 |
| CN | 115524874 A | 12/2022 |
| CN | 217981833 U | 12/2022 |
| CN | 217981857 U | 12/2022 |
| CN | 217981991 U | 12/2022 |
| CN | 217981992 U | 12/2022 |
| CN | 217982020 U | 12/2022 |
| CN | 217982038 U | 12/2022 |
| CN | 217982089 U | 12/2022 |
| CN | 217982120 U | 12/2022 |
| CN | 217983382 U | 12/2022 |
| CN | 217984044 U | 12/2022 |

(56)  References Cited

FOREIGN PATENT DOCUMENTS

| | | | |
|---|---|---|---|
| CN | 116940866 | A | 10/2023 |
| DE | 102007058558 | A1 | 6/2009 |
| DE | 102009037629 | A1 | 2/2011 |
| DE | 102012212753 | A1 | 1/2014 |
| DE | 102015221985 | A1 | 5/2017 |
| DE | 102016218996 | A1 | 9/2017 |
| DE | 112018002811 | T5 | 2/2020 |
| DE | 112018002670 | T5 | 3/2020 |
| EP | 1251397 | A2 | 10/2002 |
| EP | 1252623 | B1 | 10/2004 |
| EP | 2763519 | A2 | 8/2014 |
| EP | 2338114 | B1 | 3/2017 |
| EP | 3226042 | A1 | 10/2017 |
| EP | 3353578 | A1 | 8/2018 |
| EP | 3380876 | A1 | 10/2018 |
| EP | 3385770 | A1 | 10/2018 |
| EP | 3440484 | A1 | 2/2019 |
| EP | 3504566 | A2 | 7/2019 |
| EP | 3631533 | A1 | 4/2020 |
| EP | 3676973 | A1 | 7/2020 |
| EP | 3743764 | A1 | 12/2020 |
| EP | 3799626 | A1 | 4/2021 |
| EP | 4275080 | A1 | 11/2023 |
| EP | 3440484 | B1 | 7/2024 |
| GB | 2490895 | A | 11/2012 |
| GB | 2499869 | B | 3/2018 |
| GB | 2578049 | A | 4/2020 |
| GB | 2578233 | A | 4/2020 |
| GB | 2578236 | A | 4/2020 |
| GB | 2578236 | B | 11/2022 |
| HK | 40010538 | | 7/2020 |
| JP | 2004302457 | A | 10/2004 |
| JP | 2005017408 | A | 1/2005 |
| JP | 2005274847 | A | 10/2005 |
| JP | 2008046428 | A | 2/2008 |
| JP | 2008299084 | A | 12/2008 |
| JP | 2010085977 | A | 4/2010 |
| JP | 2015502581 | A | 1/2015 |
| JP | 2015092234 | A | 5/2015 |
| JP | 2016511936 | A | 4/2016 |
| JP | 2017062373 | A | 3/2017 |
| JP | 2018536204 | A | 12/2018 |
| JP | 2018537804 | A | 12/2018 |
| JP | 2019516128 | A | 6/2019 |
| JP | 2020522009 | A | 7/2020 |
| JP | 2021511553 | A | 5/2021 |
| KR | 20080099452 | A | 11/2008 |
| KR | 20080103149 | A | 11/2008 |
| KR | 20090002583 | A | 1/2009 |
| KR | 20100027995 | A | 3/2010 |
| KR | 101493928 | B1 | 3/2015 |
| KR | 20150113041 | A | 10/2015 |
| KR | 20170015109 | A | 2/2017 |
| KR | 20180083885 | A | 7/2018 |
| KR | 20180121309 | A | 11/2018 |
| KR | 20180124106 | A | 11/2018 |
| KR | 101905444 | B1 | 12/2018 |
| KR | 20190038221 | A | 4/2019 |
| KR | 102036640 | B1 | 10/2019 |
| KR | 1020200008630 | A | 1/2020 |
| KR | 1020200108901 | A | 9/2020 |
| KR | 102363805 | B1 | 2/2022 |
| SG | 11201804346 | P | 6/2018 |
| SG | 11201808772 | W | 11/2021 |
| SG | 11202001717V | | 2/2023 |
| TW | 201017338 | A | 5/2010 |
| TW | 201438242 | A | 10/2014 |
| TW | 201908232 | A | 3/2019 |
| WO | 2000043750 | A2 | 7/2000 |
| WO | 2007141788 | A2 | 12/2007 |
| WO | 2009067540 | A1 | 5/2009 |
| WO | 2009124181 | A2 | 10/2009 |
| WO | 2011106553 | A2 | 9/2011 |
| WO | 2011106553 | A3 | 1/2012 |
| WO | 2012139634 | A1 | 10/2012 |
| WO | 2012144997 | A1 | 10/2012 |
| WO | 2012172366 | A1 | 12/2012 |
| WO | 2013033591 | A1 | 3/2013 |
| WO | 2014116500 | A1 | 7/2014 |
| WO | 2015021255 | A1 | 2/2015 |
| WO | 2015077926 | A1 | 6/2015 |
| WO | 2015079051 | A1 | 6/2015 |
| WO | 2015112939 | A1 | 7/2015 |
| WO | 2015160412 | A2 | 10/2015 |
| WO | 2016049629 | A1 | 3/2016 |
| WO | 2016051325 | A1 | 4/2016 |
| WO | 2016086204 | A1 | 6/2016 |
| WO | 2016140720 | A2 | 9/2016 |
| WO | 2016140720 | A3 | 10/2016 |
| WO | 2016168173 | A1 | 10/2016 |
| WO | 2016178740 | A2 | 11/2016 |
| WO | 2016191142 | A2 | 12/2016 |
| WO | 2017005709 | A1 | 1/2017 |
| WO | 2017034995 | A1 | 3/2017 |
| WO | 2017040854 | A1 | 3/2017 |
| WO | 2017053309 | A1 | 3/2017 |
| WO | 2017091738 | A1 | 6/2017 |
| WO | 2017176921 | A1 | 10/2017 |
| WO | 2018063455 | A1 | 4/2018 |
| WO | 2018067246 | A2 | 4/2018 |
| WO | 2018063455 | A9 | 5/2018 |
| WO | 2018118984 | A1 | 6/2018 |
| WO | 2018134215 | A1 | 7/2018 |
| WO | 2018067246 | A3 | 8/2018 |
| WO | 2018142339 | A1 | 8/2018 |
| WO | 2018204856 | A1 | 11/2018 |
| WO | 2018218063 | A1 | 11/2018 |
| WO | 2018219710 | A1 | 12/2018 |
| WO | 2018222944 | A1 | 12/2018 |
| WO | 2019015735 | A1 | 1/2019 |
| WO | 2019039241 | A1 | 2/2019 |
| WO | 2019043016 | A1 | 3/2019 |
| WO | 2019046827 | A1 | 3/2019 |
| WO | 2019057907 | A1 | 3/2019 |
| WO | 2019075335 | A1 | 4/2019 |
| WO | 2019101750 | A2 | 5/2019 |
| WO | 2019103762 | A2 | 5/2019 |
| WO | 2019108290 | A1 | 6/2019 |
| WO | 2019113106 | A1 | 6/2019 |
| WO | 2019116364 | A1 | 6/2019 |
| WO | 2019118646 | A1 | 6/2019 |
| WO | 2019119025 | A1 | 6/2019 |
| WO | 2019103762 | A3 | 7/2019 |
| WO | 2019136166 | A1 | 7/2019 |
| WO | 2019103762 | A9 | 8/2019 |
| WO | 2019147828 | A1 | 8/2019 |
| WO | 2019148200 | A1 | 8/2019 |
| WO | 2019164542 | A1 | 8/2019 |
| WO | 2019164849 | A1 | 8/2019 |
| WO | 2019173357 | A1 | 9/2019 |
| WO | 2019198568 | A1 | 10/2019 |
| WO | 2019203876 | A2 | 10/2019 |
| WO | 2019204667 | A1 | 10/2019 |
| WO | 2019206430 | A1 | 10/2019 |
| WO | 2020001938 | A1 | 1/2020 |
| WO | 2020010084 | A1 | 1/2020 |
| WO | 2020101568 | A1 | 5/2020 |
| WO | 2020176227 | A1 | 9/2020 |
| WO | 2020214617 | A1 | 10/2020 |
| WO | 2021021671 | A1 | 2/2021 |
| WO | 2022150816 | A1 | 7/2022 |

OTHER PUBLICATIONS

Extended European Search Report for European Application No. 17779772.7, Search completed Oct. 15, 2019, Mailed Oct. 25, 2019, 10 pgs.

Extended European Search Report for European Application No. 17858861.2, Search completed Mar. 13, 2020, Mailed Mar. 23, 2020, 9 pgs.

Extended European Search Report for European Application No. 18805669.1, Search completed Feb. 9, 2021, Mailed Feb. 18, 2021, 13 pgs.

(56) References Cited

OTHER PUBLICATIONS

Extended European Search Report for European Application No. 18852460.7, Search completed Mar. 25, 2021, Mailed Apr. 6, 2021, 13 pgs.

Extended European Search Report for European Application No. 22737330.5, Search completed Oct. 7, 2024, Mailed Oct. 15, 2024, 11 pgs.

International Preliminary Report on Patentability for International Application No. PCT/US2008/084068, Report issued May 25, 2010, 5 pgs.

International Preliminary Report on Patentability for International Application No. PCT/US2012/053434, Report issued Mar. 4, 2014, Mailed Mar. 13, 2014, 7 pgs.

International Preliminary Report on Patentability for International Application No. PCT/US2015/064930, Report issued Jun. 13, 2017, Mailed Jun. 22, 2017, 9 pgs.

International Preliminary Report on Patentability for International Application No. PCT/US2016/052685, Report issued Mar. 27, 2018, Mailed Apr. 5, 2018, 9 pgs.

International Preliminary Report on Patentability for International Application No. PCT/US2016/063617, Report issued May 29, 2018, Mailed Jun. 7, 2018, 7 pgs.

International Preliminary Report on Patentability for International Application No. PCT/US2017/026206, Report issued Oct. 9, 2018, Mailed Oct. 18, 2018, 9 pgs.

International Preliminary Report on Patentability for International Application No. PCT/US2017/036897, Report issued Dec. 11, 2018, Mailed Dec. 20, 2018, 9 pgs.

International Preliminary Report on Patentability for International Application No. PCT/US2017/048469, Report issued Feb. 26, 2019, Mailed Mar. 7, 2019, 6 pgs.

International Preliminary Report on Patentability for International Application No. PCT/US2018/031204, Report issued Nov. 5, 2019, Mailed Nov. 14, 2019, 9 pgs.

International Preliminary Report on Patentability for International Application No. PCT/US2018/034460, Report issued Nov. 26, 2019, Mailed Dec. 5, 2019, 7 pgs.

International Preliminary Report on Patentability for International Application No. PCT/US2018/035502, Report issued Dec. 3, 2019, Mailed Dec. 12, 2019, 8 pgs.

International Preliminary Report on Patentability for International Application No. PCT/US2018/038357, Report issued Dec. 24, 2019, Mailed Jan. 2, 2020, 7 pgs.

International Preliminary Report on Patentability for International Application No. PCT/US2018/046947, Report issued Feb. 18, 2020, Mailed on Feb. 27, 2020, 7 pgs.

International Preliminary Report on Patentability for International Application No. PCT/US2018/049276, Report issued on Mar. 3, 2020, Mailed on Mar. 12, 2020, 9 pgs.

International Preliminary Report on Patentability for International Application No. PCT/US2019/040302, Report issued Jan. 5, 2021, Mailed Jan. 14, 2021, 6 pgs.

International Preliminary Report on Patentability for International Application No. PCT/US2020/028159, Report issued Sep. 28, 2021, Mailed on Oct. 28, 2021, 7 pgs.

International Preliminary Report on Patentability for International Application No. PCT/US2022/070043, Report issued Jul. 4, 2023, Mailed on Jul. 20, 2023, 10 pgs.

International Search Report and Written Opinion for International Application No. PCT/US2008/084068, Search completed Jan. 13, 2009, Mailed Feb. 2, 2009, 6 pgs.

International Search Report and Written Opinion for International Application No. PCT/US2012/053434, Search completed Oct. 17, 2012, Mailed Dec. 17, 2012, 7 pgs.

International Search Report and Written Opinion for International Application No. PCT/US2015/064930, Search completed Sep. 9, 2016, Mailed Sep. 20, 2016, 11 pgs.

International Search Report and Written Opinion for International Application No. PCT/US2016/052685, Search completed Nov. 30, 2016, Mailed Dec. 9, 2016, 12 pgs.

International Search Report and Written Opinion for International Application No. PCT/US2016/063617, Search completed Jan. 19, 2017, Mailed Mar. 31, 2017, 9 pgs.

International Search Report and Written Opinion for International Application No. PCT/US2017/026206, Search completed Jun. 10, 2017, Mailed Jun. 28, 2017, 15 pgs.

International Search Report and Written Opinion for International Application No. PCT/US2017/036897, Search completed Jan. 31, 2018, Mailed Feb. 21, 2018, 9 pgs.

International Search Report and Written Opinion for International Application No. PCT/US2017/048469, Search completed Apr. 20, 2018, Mailed May 4, 2018, 9 pgs.

International Search Report and Written Opinion for International Application No. PCT/US2018/031204, Search completed Jun. 29, 2018, Mailed Jul. 23, 2018, 14 pgs.

International Search Report and Written Opinion for International Application No. PCT/US2018/034460, Search completed Jul. 29, 2018, Mailed Aug. 24, 2018, 10 pgs.

International Search Report and Written Opinion for International Application No. PCT/US2018/035502, Search completed Jul. 31, 2018, Mailed Aug. 24, 2018, 13 pgs.

International Search Report and Written Opinion for International Application No. PCT/US2018/038357, Search completed Apr. 9, 2019, Mailed May 13, 2019, 12 pgs.

International Search Report and Written Opinion for International Application No. PCT/US2018/046947, Search completed Oct. 14, 2019, Mailed Oct. 25, 2019, 10 pgs.

International Search Report and Written Opinion for International Application No. PCT/US2018/049276, Search completed Oct. 26, 2018, Mailed Jan. 15, 2019, 12 pgs.

International Search Report and Written Opinion for International Application No. PCT/US2019/014975, Search completed Jun. 17, 2019, Mailed Jul. 8, 2019, 10 pgs.

International Search Report and Written Opinion for International Application No. PCT/US2019/018615, Search completed Apr. 12, 2019, Mailed May 6, 2019, 12 pgs.

International Search Report and Written Opinion for International Application No. PCT/US2019/040302, Search completed Aug. 29, 2019, Mailed Oct. 17, 2019, 6 pgs.

International Search Report and Written Opinion for International Application No. PCT/US2020/028159, Search completed Jun. 15, 2020, Mailed Aug. 11, 2020, 7 pgs.

International Search Report and Written Opinion for International Application No. PCT/US2020/043600, Search completed Sep. 29, 2020, Mailed Nov. 24, 2020, 11 pgs.

International Search Report and Written Opinion for International Application No. PCT/US2022/070043, Search completed May 5, 2022, Mailed Jun. 9, 2022, 16 pgs.

Search Report and Written Opinion for Singapore Patent Application No. SG11201808772W, Search completed Jan. 20, 2020, Mailed Jan. 28, 2020, 12 pgs.

Supplementary Partial European Search Report for European Application No. 16869282.0, Search completed Jun. 19, 2019, Mailed Jul. 2, 2019, 12 pgs.

"Materials for High and Low Refractive Index Coatings", Sigma-Aldrich Inc., Retrieved from the Internet URL: <www.sigmaaldrich.com/materials-science/organic-electronics/ri-coatings.html>, 2019, 3 pgs.

"These Tiny, Incredible 'Metalenses' are the Next Giant Leap in Optics", PetaPixel, retrieved from the Internet URL: <https://petapixel.com/2016/06/03/incredible-flat-metalenses-may-future-optics/>, Jun. 3, 2016, 21 pgs.

Aieta et al., "Aberration-Free Ultrathin Flat Lenses and Axicons at Telecom Wavelengths Based on Plasmonic Metasurfaces", Nano Letters, vol. 12, No. 9, Aug. 15, 2012, pp. 4932-4936, doi: 10.1021/nl302516v.

Aieta et al., "Aberrations of flat lenses and aplanatic metasurfaces", Optics Express, vol. 21, No. 25, Dec. 16, 2013, pp. 31530-31539, doi: 10.1364/OE.21.031530.

Aieta et al., "Multiwavelength achromatic metasurfaces by dispersive phase compensation", Science, vol. 347, No. 6228, Mar. 20, 2015, pp. 1342-1345, doi: 10.1126/science.aaa2494.

(56) References Cited

OTHER PUBLICATIONS

Aieta et al., "Out-of-Plane Reflection and Refraction of Light by Anisotropic Optical Antenna Metasurfaces with Phase Discontinuities", Nano Letters, vol. 12, No. 3, Feb. 15, 2012, pp. 1702-1706, doi: 10.1021/nl300204s.

Arbabi et al., "Dielectric metasurfaces for complete control of phase and polarization with subwavelength spatial resolution and high transmission", Nature Nanotechnology, vol. 10, Nov. 2015, pp. 937-943, doi: 10.1038/NNANO.2015.186.

Arbabi et al., "Efficient dielectric metasurface collimating lenses for mid-infrared quantum cascade lasers", Optics Express, vol. 23, No. 26, Dec. 28, 2015, pp. 33310-33317, doi: 10.1364/OE.23.033310.

Arbabi et al., "Miniature optical planar camera based on a wide-angle metasurface doublet corrected for monochromatic aberrations", Nature Communications, vol. 7, No. 13682, Nov. 28, 2016, 9 pgs., doi: 10.1038/ncomms13682.

Arbabi et al., "Subwavelength-thick lenses with high numerical apertures and large efficiency based on high-contrast transmitar-rays", Nature Communications, vol. 6, No. 7069, May 7, 2015, pp. 1-6, doi: 10.1038/ncomms8069.

Azadegan et al., "A Novel Approach for Miniaturization of Slot Antennas", IEEE Transactions on Antennas and Propagation, vol. 51, No. 3, Mar. 2003, pp. 421-429, doi: 10.1109/TAP.2003.809853.

Birch et al., "3D Imaging with Structured Illumination for Advanced Security Applications", Sandia Report, Sep. 2015, Retrieved from the internet: URL: <https://www.osti.gov/biblio/1221516>, 64 pgs., doi: 10.2172/1221516.

Blanchard et al., "Modeling nanoscale V-shaped antennas for the design of optical phased arrays", Physical Review B, vol. 85, No. 155457, Apr. 30, 2012, pp. 155457-1-155457-11, doi: 10.1103/physRevB.85.155457.

Buralli et al., "Optical performance of holographic kinoforms", Applied Optics, vol. 28, No. 5, Mar. 1, 1989, pp. 976-983, doi: 10.1364/AO.28.000976.

Byrnes et al., "Designing large, high-efficiency, high-numerical-aperture, transmissive meta-lenses for visible light", Optics Express, vol. 24, No. 5, Mar. 7, 2016, pp. 5110-5124, doi: 10.1364/OE.24.005110.

Campione et al., "Tailoring dielectric resonator geometries for directional scattering and Huygens' metasurfaces", Optics Express, vol. 23, No. 3, Feb. 9, 2015, pp. 2293-2307, doi: 10.1364/OE.23.002293.

Chen et al., "A broadband achromatic metalens for focusing and imaging in the visible", Nature Nanotechnology, vol. 13, Jan. 1, 2018, pp. 220-226, doi: 10.1038/s41565-017-0034-6.

Chen et al., "A review of metasurfaces: physics and applications", Reports on Progress in Physics, vol. 79, No. 7, Jun. 16, 2016, 40 pgs., doi: 10.1088/0034-4885/79/7/076401.

Chen et al., "Broadband Achromatic Metasurface-Refractive Optics", Nano Letters, vol. 18, No. 12, Nov. 13, 2018, pp. 7801-7808, doi: 10.1021/acs.nanolett.8b03567.

Chen et al., "Dual-polarity plasmonic metalens for visible light", Nature Communications, vol. 3, No. 1198, Nov. 13, 2012, pp. 1-6, doi: 10.10388/ncomms2207.

Chen et al., "High-Efficiency Broadband Meta-Hologram with Polarization-Controlled Dual Images", Nano Letters, vol. 14, No. 1, Dec. 13, 2013, pp. 225-230, doi: 10.1021/nl403811d.

Chen et al., "Immersion Meta-Lenses at Visible Wavelengths for Nanoscale Imaging", Nano Letters, vol. 17, No. 5, Apr. 7, 2017, pp. 3188-3194, doi: 10.1021/acs.nanolett.7b00717.

Chen et al., "Phase and dispersion engineering of metalenses: broadband achromatic focusing and imaging in the visible", arXiv:1711.09343 [physics.optics][v1], Nov. 26, 2017, 30 pgs.

Chou et al., "Imprint Lithography with 25-Nanometer Resolution", Science, vol. 272, No. 5258, Apr. 5, 1996, pp. 85-87, doi: 10.1126/science.272.5258.85.

Cumme et al., "From regular periodic micro-lens arrays to randomized continuous phase profiles", Advanced Optical Technologies, vol. 4, No. 1, Feb. 6, 2015, pp. 47-61, doi: 10.1515/aot-2014-0062.

Dayal et al., "Polarization control of 0.85 μm vertical-cavity surface-emitting lasers integrated with gold nanorod arrays", Applied Physics Letters, vol. 91, No. 11, Sep. 12, 2007, pp. 111107-1-111107-3, doi: 10.1063/1.2783281.

Decker et al., "High-efficiency light-wave control with all-dielectric optical Huygens' metasurfaces", arXiv:1405.5038v1 [physics.optics] [v1], May 20, 2014, 17 pgs.

Devlin et al., "Arbitrary spin-to-orbital angular momentum conversion of light", Science, vol. 358, No. 6365, Nov. 17, 2017, pp. 896-901, doi: 10.1126/science.aao5392.

Devlin et al., "Broadband high-efficiency dielectric metasurfaces for the visible spectrum", PNAS, vol. 113, No. 38, Sep. 6, 2016, pp. 10473-10478, doi: 10.1073/pnas.1611740113.

Devlin et al., "High efficiency dielectric metasurfaces at visible wavelengths", arXiv:1603.02735v1 [physics.optics][v1], Mar. 8, 2016, pp. 1-18.

Ding et al., "Gradient metasurfaces: fundamentals and applications", arXiv:1704:03032v1 [physics.optics], Apr. 10, 2017, 83 pgs.

Dong et al., "Zero-Index Photonic Crystal as Low-Aberration Optical Lens (Conference Presentation)", Proceedings of SPIE, Metamaterials, Metadevices, and Metasystems, vol. 9918, No. 991822, Nov. 9, 2016, p. 991822-1, doi: 10.1117/12.2237137.

Evlyukhin et al., "Optical response features of Si-nanoparticle arrays", Physical Review B, vol. 82, No. 045404, Jul. 8, 2010, pp. 045404-1-045404-11, doi: 10.1103/PhysRevB.82.045404.

Fattal et al., "Flat dielectric grating reflectors with focusing abilities", Nature Photonics, vol. 4, May 2, 2010, pp. 466-470, doi: 10.1038/nphoton.2010.116.

Genevet et al., "Breakthroughs in Photonics 2013: Flat Optics: Wavefronts Control with Huygens' Interfaces", IEEE Photonics Journal, vol. 6, No. 2, Article 0700404, Apr. 2014, 4 pgs., doi: 10.1109/JPHOT.2014.2308194.

Genevet et al., "Recent advances in planar optics: from plasmonic to dielectric metasurfaces", Optica, vol. 4, No. 1, Jan. 2017, pp. 139-152, doi: 10.1364/OPTICA.4.000139.

Goldberg, "Genetic Algorithms in Search, Optimization, and Machine Learning", Addison Wesley, 1989, 432 pgs. (presented in 2 parts).

Groever et al., "Meta-Lens Doublet in the Visible Region", Nano Letters, vol. 17, No. 8, Jun. 29, 2017, pp. 4902-4907, doi: 10.1021/acs.nanolett.7b01888.

Hartwig et al., "Challenges for Reducing the Size of Laser Activated Remote Phosphor Light Engines for DLP Projection", Proceedings of SPIE, International Optical Design Conference, vol. 9293, Dec. 17, 2014, pp. 929313-1-929313-6, doi: 10.1117/12.2073275.

Herrera-Fernandez et al., "Double diffractive optical element system for near-field shaping", Applied Optics, vol. 50, No. 23, Aug. 10, 2011, pp. 4587-4593, doi: 10.1364/AO.50.004587.

Hidber et al., "Microcontact Printing of Palladium Colloids: Micron-Scale Patterning by Electroless Deposition of Copper", Langmuir, vol. 12, No. 5, Mar. 6, 1996, pp. 1375-1380, doi: 10.1021/la9507500.

Hsiao et al., "Fundamentals and Applications of Metasurfaces", Small Methods, vol. 1, No. 4, Article 1600064, Mar. 24, 2017, 20 pgs., doi: 10.1002/smtd.201600064.

Jin et al., "Waveforms for optimal sub-keV high-order harmonics with synthesized two- or three-colour laser fields", Nature Communications, vol. 5, No. 4003, May 30, 2014, pp. 1-6, doi: 10.1038/ncomms5003.

Kats et al., "Giant birefringence in optical antenna arrays with widely tailorable optical anisotropy", PNAS, vol. 109, No. 31, Jul. 31, 2012, pp. 12364-12368, doi: 10.1073/pnas. 1210686109.

Khorasaninejad et al., "Achromatic Metalens over 60 nm Bandwidth in the Visible and Metalens with Reverse Chromatic Dispersion", Nano Letters, vol. 17, No. 3, Jan. 26, 2017, pp. 1819-1824, doi: 10.1021/acs.nanolett.6b05137.

Khorasaninejad et al., "Achromatic Metasurface Lens at Telecommunication Wavelengths", Nano Letters, vol. 15, No. 8, Jul. 13, 2015, pp. 5358-5362, doi: 10.1021/acs.nanolett.5b01727.

Khorasaninejad et al., "Broadband and chiral binary dielectric meta-holograms", Science Advances, vol. 2, No. 5, e1501258, May 13, 2016, pp. 1-6, doi: 10.1126/sciadv.1501258.

(56) References Cited

OTHER PUBLICATIONS

Khorasaninejad et al., "Broadband Multifunctional Efficient Meta-Gratings Based on Dielectric Waveguide Phase Shifters", Nano Letters, vol. 15, No. 10, Sep. 15, 2015, pp. 6709-6715, doi: 10.1021/acs.nanolett.5b02524.

Khorasaninejad et al., "Metalenses at visible wavelengths: Diffraction-limited focusing and subwavelength resolution imaging", Science, vol. 352, No. 6290, Jun. 3, 2016, pp. 1190-1194, XP055490038, ISSN: 0036-8075, doi: 10.1126/science.aaf6644.

Khorasaninejad et al., "Multispectral Chiral Imaging with a Metalens", Nano Letters, vol. 16, No. 7, Jun. 7, 2016, pp. 4595-4600, doi: 10.1021/acs.nanolett.6b01897.

Khorasaninejad et al., "Planar Lenses at Visible Wavelengths", arXiv:1605.02248v1 [physics.optics][v1], May 7, 2016, 17 pgs.

Khorasaninejad et al., "Polarization-Insensitive Metalenses at Visible Wavelengths", Nano Letters, vol. 16, No. 11, Oct. 24, 2016, pp. 7229-7234, doi: 10.1021/acs.nanolett.6b03626.

Khorasaninejad et al., "Silicon nanofin grating as a miniature chirality-distinguishing beam-splitter", Nature Communications, vol. 5, No. 5386, Nov. 12, 2014, 6 pgs., doi: 10.1038/ncomms6386.

Khorasaninejad et al., "Super-Dispersive Off-Axis Meta-Lenses for Compact High Resolution Spectroscopy", Nano Letters, vol. 16, No. 6, Apr. 27, 2016, pp. 3732-3737, doi: 10.1021/acs.nanolett.6b01097.

Khorasaninejad et al., "Visible Wavelength Planar Metalenses Based on Titanium Dioxide", IEEE Journal of Selected Topics in Quantum Electronics, vol. 23, No. 3, Article 4700216, May/Jun. 2017, pp. 43-58, doi: 10.1109/JSTQE.2016.2616447.

Kildishev et al., "Planar Photonics with Metasurfaces", Science, vol. 339, No. 6125, Mar. 15, 2013, pp. 1232009-1-1232009-6, doi: 10.1126.science.1232009.

Kokkoris et al., "Nanoscale Roughness Effects at the Interface of Lithography and Plasma Etching: Modeling of Line-Edge-Roughness Transfer During Plasma Etching", IEEE Transactions on Plasma Science, vol. 37, No. 9, Sep. 2009, pp. 1705-1714, doi: 10.1109/TPS.2009.2024117.

Kominami et al., "Dipole and Slot Elements and Arrays on Semi-Infinite Substrates", IEEE Transactions on Antennas and Propagation, vol. AP33, No. 6, Jun. 1985, pp. 600-607, doi: 10.1109/TAP.1985.1143638.

Krasnok et al., "All-dielectric optical nanoantennas", Optics Express, vol. 20, No. 18, Aug. 27, 2012, pp. 20599-20604, doi: 10.1063/1.4750083.

Kress et al., "Applied Digital Optics from Micro-Optics to Nanophotonics", Applied Digital Optics, Wiley, 2009, 24 pgs.

Lalanne et al., "Interaction between optical nano-objects at metallo-dielectric interfaces", Nature Physics, vol. 2, Aug. 2006, pp. 551-556, doi: 10.1038/nphys364.

Lee et al., "Giant nonlinear response from plasmonic metasurfaces coupled to intersubband transitions", Nature, vol. 511, Jul. 3, 2014, pp. 65-69, doi: 10.1038/nature13455.

Leveque et al., "Transient behavior of surface plasmon polaritons scattered at a subwavelength groove", Physical Reviews B, vol. 76, No. 155418, Oct. 18, 2007, pp. 155418-1-155418-8, doi: 10.1103/PhysRevB.76.155418.

Lezec et al., "Beaming Light from a Subwavelength Aperture", Science, vol. 297, No. 5582, Aug. 2, 2002, pp. 820-822, doi: 10.1126/science.1071895.

Li et al., "Achromatic flat optical components via compensation between structure and material dispersions", Scientific Reports, vol. 6, No. 19885, Jan. 22, 2016, pp. 1-7, doi: 10.1038/srep19885.

Li et al., "All-silicon nanorod-based Dammann gratings", Optics Letters, vol. 40, No. 18, Sep. 15, 2015, pp. 4285-4288, doi: 10.1364/OL.40.004285.

Li et al., "Broadband diodelike asymmetric transmission of linearly polarized light in ultrathin hybrid metamaterial", Applied Physics Letters, vol. 105, No. 20, Nov. 19, 2014, pp. 201103-1-201103-5, doi: 10.1063/1.4902162.

Li et al., "Dispersion controlling meta-lens at visible frequency", Optics Express, vol. 25, No. 18, Sep. 4, 2017, pp. 21419-21427, doi: 10.1364/OE.25.021419.

Li et al., "Flat metasurfaces to focus electromagnetic waves in reflection geometry", Optics Letters, vol. 37, No. 23, Dec. 1, 2012, pp. 4940-4942, doi: 10.1364/OL.37.004940.

Lin et al., "Dielectric gradient metasurface optical elements", Science, vol. 345, No. 6194, Jul. 18, 2014, pp. 298-302, doi: 10.1126/science.1253213.

Liu et al., "Realization of polarization evolution on higher-order Poincaré sphere with metasurface", Applied Physics Letters, vol. 104, No. 19, 2014, pp. 191110-1-191101-4, doi: 10.1063/1.4878409.

Lo et al., "New architecture for space telescopes uses Fresnel lenses", SPIE Newsroom, Aug. 9, 2006, 2 pgs., doi: 10.1117/2.1200608.0333.

Lu et al., "Planar high-numerical-aperture low-loss focusing reflectors and lenses using subwavelength high contrast gratings", Optics Express, vol. 18, No. 12, Jun. 7, 2010, pp. 12606-12614, doi: 10.1364/OE.18.012606.

Luk et al., "Dielectric Resonator Antennas", Research Studies Press Ltd., Hertfordshire, 2003, 404 pgs. (presented in 2 parts).

Mackus et al., "The use of atomic layer deposition in advanced nanopatterning", Nanoscale, vol. 6, 2014, pp. 10941-10960, doi: 10.1039/C4NR01954G.

Mao et al., "Nanopatterning using a simple bi-layer lift-off process for the fabrication of a photonic crystal nanostructure", Nanotechnology, vol. 24, No. 8, Article 085302, Feb. 1, 2013, pp. 1-6, doi: 10.1088/0957-4484/24/8/085302.

Mao et al., "Surface patterning of nonscattering phosphors for light extraction", Optics Letters, vol. 38, No. 15, Aug. 1, 2013, pp. 2796-2799, doi: 10.1364/OL.38.002796.

Martin-Moreno et al., "Theory of Highly Directional Emission from a Single Subwavelength Aperture Surrounded by Surface Corrugations", Physical Review Letters, vol. 90, No. 16, Apr. 25, 2003, pp. 167401-1-167401-4, doi: 10.1103/PnysRevLett.9.167401.

McLeod, "Thin-Film Optical Filters", Third Edition, Institute of Physics Publishing, Adam Hilger, 1986, 667 pgs. (presented in 2 parts).

Meng et al., "A Novel Nanofabrication Technique of Silicon-Based Nanostructures", Nanoscale Research Letters, vol. 11, Article 504, Nov. 15, 2016, pp. 1-9, doi: 10.1186/s11671-016-1702-4.

Miyazaki et al., "Ultraviolet-nanoimprinted packaged metasurface thermal emitters for infrared CO2 sensing", Science and Technology of Advanced Materials, vol. 16, No. 3, Article 035005, May 20, 2015, pp. 1-5, doi: 10.1088/1468-6996/16/3/035005.

Monticone et al., "Full Control of Nanoscale Optical Transmission with a Composite Metascreen", Physical Review Letters, vol. 110, No. 203903, May 17, 2013, pp. 203903-1-203903-5, doi: 10.1103/PhysRevLett.110.203903.

Mueller et al., "Metasurface Polarization Optics: Independent Phase Control of Arbitrary Orthogonal States of Polarization", Physical Review Letters, vol. 118, No. 11, Mar. 14, 2017, pp. 113901-1-113901-5, doi: 10.1103/PhysRevLett.118.113901.

Ni et al., "Broadband Light Bending with Plasmonic Nanoantennas", Sciencexpress, vol. 335, No. 6067, Dec. 22, 2011, p. 427, doi: 10.1126/science.1214686.

Ni et al., "Ultra-thin, planar, Babinet-inverted plasmonic metalenses", Light: Science & Applications, vol. 2, No. e72, Apr. 26, 2013, pp. 1-6, doi: 10.1038/lsa.2013.28.

Okaya et al., "The Dielectric Microwave Resonator", Proceedings of the IRE, vol. 50, No. 10, Oct. 1962, pp. 2081-2092, doi: 10.1109/JRPROC.1962.288245.

Orazbayev et al., "Tunable beam steering enabled by graphene metamaterials", Optics Express, vol. 24, No. 8, Apr. 18, 2016, pp. 8848-8861, doi: 10.1364/OE.24.008848.

Pacheco-Peña et al., "Epsilon-near-zero metalenses operating in the visible", Optics & Laser Technology, vol. 80, Jun. 2016, pp. 162-168, doi: 10.1016/j.optlastec.2016.01.009.

Peinado et al., "Optimization and performance criteria of a Stokes polarimeter based on two variable retarders", Optics Express, vol. 18, No. 10, May 10, 2010, pp. 9815-9830, doi: 10.1364/OE.18.009815.

(56) References Cited

OTHER PUBLICATIONS

Petosa, "An Overview of Tuning Techniques for Frequency-Agile Antennas", IEEE Antennas and Propagation Magazine, vol. 54, No. 5, Oct. 2012, pp. 271-296, doi: 10.1109/MAP.2012.6348178.

Pfeiffer et al., "Cascaded metasurfaces for complete phase and polarization control", Applied Physics Letters, vol. 102, No. 23, Jun. 10, 2013, pp. 231116-1-231116-4, doi: 10.1063/1.4810873.

Pfeiffer et al., "Metamaterial Huygens' Surface: Tailoring Wave Fronts with Reflectionless Sheets", Physical Review Letters, vol. 110, No. 197401, May 10, 2013, pp. 197401-1-197401-5, doi: 10.1103/PhysRevLett.110.197401.

Pors et al., "Broadband Focusing Flat Mirrors Based on Plasmonic Gradient Metasurfaces", Nano Letters, vol. 13, No. 2, Jan. 23, 2013, pp. 829-834, doi: 10.1021/nl304761m.

Reichelt et al., "Capabilities of diffractive optical elements for real-time holographic displays", Proceedings of SPIE, Practical Holography XXII: Materials and Applications, vol. 6912, Feb. 2008, pp. 69120-69130, doi: 10.1117/12.762887.

Roy et al., "Sub-wavelength focusing meta-lens", Optics Express, vol. 21, No. 6, Mar. 25, 2013, pp. 7577-7582, doi: 10.1364/OE.21.007577.

Rubin et al., "Polarization state generation and measurement with a single metasurface", Optics Express, vol. 26, No. 17, Aug. 20, 2018, pp. 21455-21478, doi: 10.1364/OE.26.021455.

Saeidi et al., "Wideband plasmonic focusing metasurfaces", Applied Physics Letters, vol. 105, No. 053107, Aug. 2014, pp. 053107-1-053107-4, doi: 10.1063/1.4892560.

Sales et al., "Diffractive-refractive behavior of kinoform lenses", Applied Optics, vol. 36, No. 1, Jan. 1, 1997, pp. 253-257, doi: 10.1364/AO.36.000253.

Sancho-Parramon et al., "Optical characterization of HfO2 by spectroscopic ellipsometry: Dispersion models and direct data inversion", Thin Solid Films, vol. 516, No. 22, Sep. 30, 2008, pp. 7990-7995, doi: 10.1016/j.tsf.2008.04.007.

Sayyah et al., "Two-dimensional pseudo-random optical phased array based on tandem optical injection locking of vertical cavity surface emitting lasers", Optics Express, vol. 23, No. 15, Jul. 27, 2015, pp. 19405-19416, doi: 10.1364/OE.23.019405.

Schulz et al., "Quantifying the impact of proximity error correction on plasmonic metasurfaces", Optical Materials Express, vol. 5, No. 12, Dec. 1, 2015, pp. 2798-2803, doi: 10.1364/OME.5.002798.

Seurin et al., "High-efficiency VCSEL arrays for illumination and sensing in consumer applications", Proceedings of SPIE, Vertical-Cavity Surface-Emitting Lasers XX, vol. 9766, 2016, pp. 97660D-1-97660D-9, doi: 10.1117/12.2213295.

She et al., "Large area metalenses: design, characterization, and mass manufacturing", Optics Express, vol. 26, No. 2, Jan. 22, 2018, pp. 1573-1585, doi: 10.1364/OE.26.001573.

Shim et al., "Hard-tip, soft-spring lithography", Nature, vol. 469, Jan. 27, 2011, pp. 516-521, doi: 10.1038/nature09697.

Silvestri et al., "Robust design procedure for dielectric resonator metasurface lens array", Optics Express, vol. 24, No. 25, Dec. 12, 2016, pp. 29153-29169, doi: 10.1364/OE.24.029153.

Song et al., "Vividly-Colored Silicon Metasurface Based on Collective Electric and Magnetic Resonances", 11th Conference on Lasers and Electro-Optics Pacific Rim (CLEO-PR), 2015, 2 pgs., doi: 10.1109/CLEOPR.2015.7375849.

Sun et al., "High-Efficiency Broadband Anomalous Reflection by Gradient Meta-Surfaces", Nano Letters, vol. 12, No. 12, Nov. 28, 2012, pp. 6223-6229, doi: 10.1021/nl3032668.

Vo et al., "Sub-Wavelength Grating Lenses With a Twist", IEEE Photonics Technology Letters, vol. 26, No. 13, Jul. 1, 2014, pp. 1375-1378, doi: 10.1109/LPT.2014.2325947.

Voelkel et al., "Laser Beam Homogenizing: Limitations and Constraints", Proceedings of SPIE, Europe, Optical Systems Design, vol. 7102, 2008, 12 pgs.

Voelz, "Transmittance Functions, Lenses, and Gratings", Chapter 6, Computational Fourier Optics: a Matlab Tutorial, 2011, pp. 89-111, doi: 10.1117/3.858456.ch6.

Walther et al., "Spatial and Spectral Light Shaping with Metamaterials", Advanced Materials, vol. 24, No. 47, Dec. 11, 2012, pp. 6300-6304, doi: 10.1002/adma.201202540.

Wang et al., "Broadband achromatic optical metasurface devices", Nature Communications, vol. 8, No. 187, Aug. 4, 2017, pp. 1-9, doi: 10.1038/s41467-017-00166-7.

Wang et al., "Generation of steep phase anisotropy with zero-backscattering by arrays of coupled dielectric nano-resonators", Applied Physics Letters, vol. 105, No. 121112, Sep. 25, 2014, pp. 121112-1-121112-5, doi: 10.1063/1.4896631.

Wen et al., "Metasurface for characterization of the polarization state of light", Optics Express, vol. 23, No. 8, Apr. 20, 2015, pp. 10272-10281, doi: 10.1364/OE.23.010272.

Wu et al., "Spectrally selective chiral silicon metasurfaces based on infrared Fano resonances", Nature Communications, vol. 5, No. 3892, 2014, published online May 27, 2014, 9 pgs., doi: 10.1038/ncomms4892.

Xu et al., "Metasurface external cavity laser", Applied Physics Letters, vol. 107, No. 221105, 2015, pp. 221105-1-221105-5, doi: 10.1063/1.4936887.

Yang et al., "Design of ultrathin plasmonic quarter-wave plate based on period coupling", Optics Letters, vol. 38, No. 5, Mar. 1, 2013, pp. 679-681, doi: 10.1364/OL.38.000679.

Yao et al., "Wide Wavelength Tuning of Optical Antennas on Graphene with Nanosecond Response Time", Nano Letters, vol. 14, No. 1, Dec. 3, 2013, pp. 214-219, doi: 10.1021/nl403751p.

Yu et al., "A Broadband, Background-Free Quarter-Wave Plate Based on Plasmonic Metasurfaces", Nano Letters, vol. 12, No. 12, Nov. 6, 2012, pp. 6328-6333, doi: 10.1021/nl303445u.

Yu et al., "Flat optics with designer metasurfaces", Nature Materials, vol. 13, Feb. 23, 2014, pp. 139-150, doi :10.1038/NMAT3839.

Yu et al., "Flat Optics: Controlling Wavefronts With Optical Antenna Metasurfaces", IEEE Journal of Selected Topics, vol. 19, No. 3, May/Jun. 2013, 23 pgs., doi: 10.1109/JSTQE.2013.2241399.

Yu et al., "High-Transmission Dielectric Metasurface with 2TT Phase Control at Visible Wavelengths", Laser & Photonics Reviews, vol. 9, No. 4, Jul. 2015, pp. 412-418, doi: 10.1002/lpor.201500041.

Yu et al., "Light Propagation with Phase Discontinuities: Generalized Laws of Reflection and Refraction", Science, vol. 334, No. 6054, Oct. 21, 2011, pp. 333-337, doi: 10.1126/science.1210713.

Yu et al., "Optical Metasurfaces and Prospect of Their Applications Including Fiber Optics", Journal of Lightwave Technology, vol. 33, No. 12, Jun. 15, 2015, pp. 2344-2358, doi: 10.1109/JLT.2015.2404860.

Yu et al., "Quantum cascade lasers with integrated plasmonic antenna-array collimators", Optics Express, vol. 16, No. 24, Nov. 24, 2008, pp. 19447-19461, doi: 10.1364/OE.16.019447.

Yu et al., "Small divergence edge-emitting semiconductor lasers with two-dimensional plasmonic collimators", Applied Physics Letters, vol. 93, No. 181101, 2008, pp. 181101-1-181101-3, doi: 10.1063/1.3009599.

Yu et al., "Small-divergence semiconductor lasers by plasmonic collimation", Nature Photonics, vol. 2, Sep. 2008, pp. 564-570, doi: 10.1038/nphoton.2008.152.

Zhan et al., "Low-Contrast Dielectric Metasurface Optics", ACS Photonics, vol. 3, No. 2, Feb. 1, 2016, pp. 209-214, doi: 10.1021/acsphotonics.5b00660.

Zhao et al., "Mie resonance-based dielectric metamaterials", Materials Today, vol. 12, No. 12, Dec. 2009, pp. 60-69, doi: 10.1016/S1369-7021(09)70318-9.

Zhao et al., "Recent Advances on Optical Metasurfaces", Journal of Optics, vol. 16, No. 12, Nov. 27, 2014, pp. 1-14, doi: 10.1088/2040-8978/16/12/123001.

Zhao et al., "Tailoring the Dispersion of Plasmonic Nanorods to Realize Broadband Optical Meta-Waveplates", Nano Letter, vol. 13, No. 3, Feb. 5, 2013, pp. 1086-1091, doi: 10.1021/nl304392b.

Zhao et al., "Twisted optical metamaterials for planarized ultrathin broadband circular polarizers", Nature Communications, vol. 3, No. 870, May 29, 2012, pp. 1-7, doi: 10.1038/ncomms1877.

Zhou et al., "Characteristic Analysis of Compact Spectrometer Based on Off-Axis Meta-Lens", Applied Sciences, vol. 8, No. 321, 2018, 11 pgs., doi: 10.3390/app8030321.

(56)        References Cited

OTHER PUBLICATIONS

Zhou et al., "Plasmonic holographic imaging with V-shaped nanoantenna array", Optics Express, vol. 21, No. 4, Feb. 25, 2013, pp. 4348-4354, doi: 10.1364/OE.21.004348.

Zhou et al., "Progress on vertical-cavity surface-emitting laser arrays for infrared illumination applications", Proceedings of SPIE, Vertical-Cavity Surface-Emitting Lasers XVIII, vol. 9001, 90010E, Feb. 27, 2014, 11 pgs., doi: 10.1117/12.2040429.

Zhu et al., "Ultra-compact visible chiral spectrometer with meta-lenses", APL Photonics, vol. 2, No. 3, Article 036103, Feb. 7, 2017, pp. 036103-1-036103-12, doi: 10.1063/1.4974259.

Zou et al., "Dielectric resonator nanoantennas at visible frequencies", Optics Express, vol. 21, No. 1, Jan. 14, 2013, pp. 1344-1352, doi: 10.1364/OE.21.001344.

* cited by examiner

No

No

| Cap | h [nm] | P [nm] | $h^1_{cap}$ [nm] | $n^1_{cap}$ | $h^2_{cap}$ [nm] | $n^2_{cap}$ | $\bar{T}$ | $\bar{t}$ | $\bar{r}$ | $\sigma_T$ | $\sigma_t$ |
|-----|--------|--------|------------------|-------------|------------------|-------------|-----------|-----------|-----------|-----------|-----------|
| 0 | 658 | 454 | - | - | - | - | 0.916 | 86.4% | 13.6% | 0.16 | 0.21 |
| 1 | 626 | 469 | 100 | 2.054 | - | - | 0.964 | 94.2% | 5.8% | 0.117 | 0.142 |
| 2 | 643 | 469 | 95 | 1.465 | 52 | 1.574 | 0.979 | 96.2% | 3.8% | 0.0588 | 0.0898 |

FIG. 18

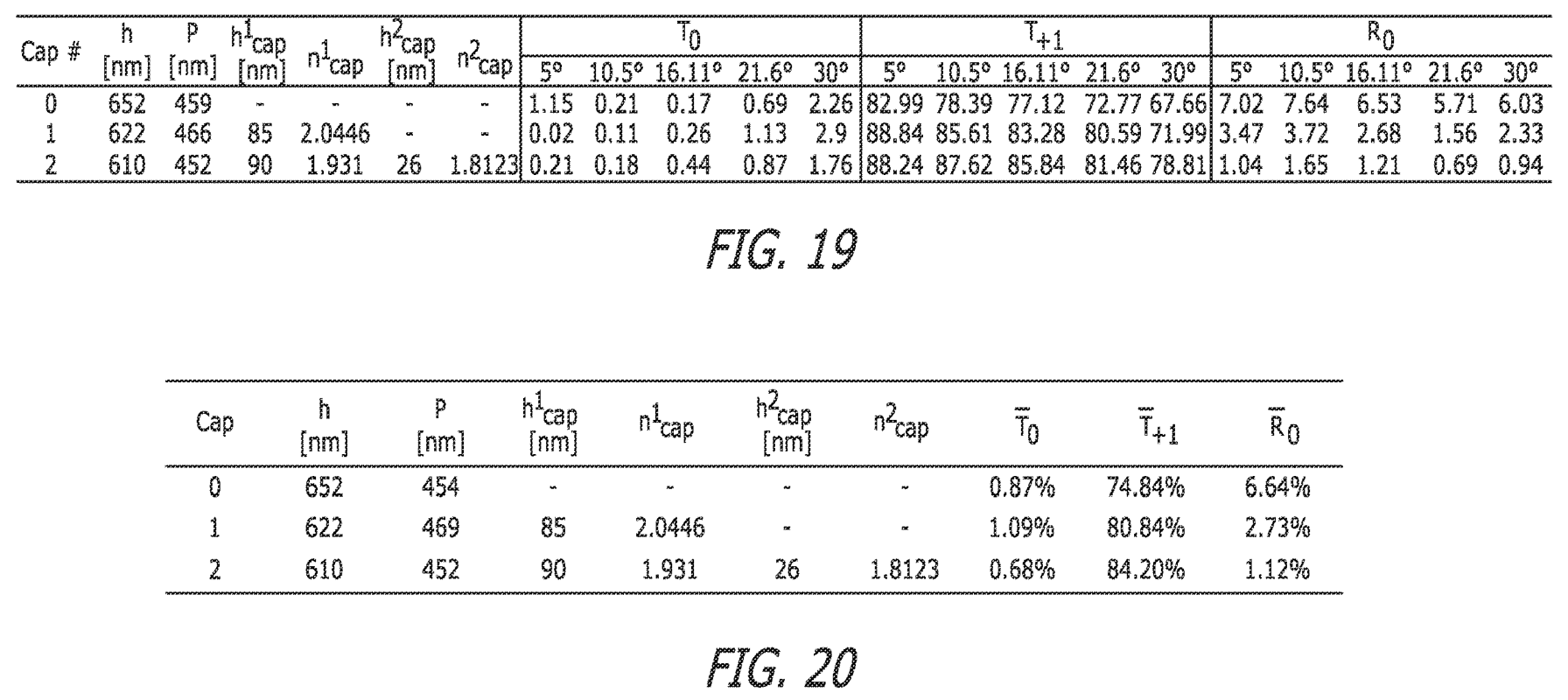

| Cap # | h [nm] | P [nm] | $h^1_{cap}$ [nm] | $n^1_{cap}$ | $h^2_{cap}$ [nm] | $n^2_{cap}$ | $T_0$ | | | | | $T_{+1}$ | | | | | $R_0$ | | | | |
|---|---|---|---|---|---|---|---|---|---|---|---|---|---|---|---|---|---|---|---|---|---|
| | | | | | | | 5° | 10.5° | 16.11° | 21.6° | 30° | 5° | 10.5° | 16.11° | 21.6° | 30° | 5° | 10.5° | 16.11° | 21.6° | 30° |
| 0 | 652 | 459 | - | - | - | - | 1.15 | 0.21 | 0.17 | 0.69 | 2.26 | 82.99 | 78.39 | 77.12 | 72.77 | 67.66 | 7.02 | 7.64 | 6.53 | 5.71 | 6.03 |
| 1 | 622 | 466 | 85 | 2.0446 | - | - | 0.02 | 0.11 | 0.26 | 1.13 | 2.9 | 88.84 | 85.61 | 83.28 | 80.59 | 71.99 | 3.47 | 3.72 | 2.68 | 1.56 | 2.33 |
| 2 | 610 | 452 | 90 | 1.931 | 26 | 1.8123 | 0.21 | 0.18 | 0.44 | 0.87 | 1.76 | 88.24 | 87.62 | 85.84 | 81.46 | 78.81 | 1.04 | 1.65 | 1.21 | 0.69 | 0.94 |

*FIG. 19*

| Cap | h [nm] | P [nm] | $h^1_{cap}$ [nm] | $n^1_{cap}$ | $h^2_{cap}$ [nm] | $n^2_{cap}$ | $\bar{T}_0$ | $\bar{T}_{+1}$ | $\bar{R}_0$ |
|---|---|---|---|---|---|---|---|---|---|
| 0 | 652 | 454 | - | - | - | - | 0.87% | 74.84% | 6.64% |
| 1 | 622 | 469 | 85 | 2.0446 | - | - | 1.09% | 80.84% | 2.73% |
| 2 | 610 | 452 | 90 | 1.931 | 26 | 1.8123 | 0.68% | 84.20% | 1.12% |

*FIG. 20*

SELF-ALIGNED NANO-PILLAR COATINGS AND METHOD OF MANUFACTURING

CROSS-REFERENCE TO RELATED APPLICATIONS

This application is a national stage of PCT Patent Application No. PCT/US2022/070043, entitled "Self-Aligned Nano-Pillar Coatings and Method of Manufacturing," to Forouzmand et al., filed Jan. 5, 2022, which claims the benefit of and priority under 35 U.S.C. § 119 (e) to U.S. Provisional Patent Application Ser. No. 63/134,372, entitled "Self-Aligned Nano-Pillar Coatings and Method of Manufacturing" and filed Jan. 6, 2021, the disclosures of which are incorporated by reference herein in their entirety.

FIELD OF THE INVENTION

The present invention generally relates to meta-surface structures and methods of manufacturing thereof.

BACKGROUND

Wave-front shaping and beam-forming are the procedures in which the spatial amplitude/phase distribution of the free-space propagating light can be tailored in order to create a desired beam pattern (e.g., focal spot, deflection, and holography). The traditional methods, widely used in industry, involve dielectric parabolic mirrors/lenses which are bulky, relatively heavy, and curved. These undesired features stem from the physical mechanism behind conventional optical lenses, which is the enforcement of different optical path lengths to accumulate distinct phase delays. In contrast, meta-surfaces include non-uniform subwavelength scatterers with capability of abrupt control over the reflection/transmission phase (0-2π) and amplitude (0-1) at the interface. These spatially varying phase shifts over the incident light can be realized by utilizing an array of unit-cells having carefully engineered constituent materials, geometry, orientation, and structural parameters.

In general, meta-surfaces as artificially structured materials can offer device miniaturization, planar and thin form, high spatial resolution, and opportunity of dense integration into optical devices. In addition, they have the potentials to be used for steering the beam propagation direction, shaping the wave-front of light, and imparting information for applications such as sensing, imaging, light detection, and ranging (e.g. LiDAR). Although there has been remarkable progress in the design of optical meta-surfaces as a promising replacement for conventional optical elements (e.g., gratings, lenses, holograms, wave-plates, polarizers, and spectral filters), there remain several limitations that have not been adequately addressed including the overall efficiency of the large-scale graded-pattern meta-surfaces. In particular, it may be beneficial to achieve highly efficient beam deflection engineering (e.g., maximizing the diffraction efficiency) in order to transfer the total intensity of the impinging light into a desired deflection angle. This can be considered as the underlying mechanism behind a wide range of optical imaging/sensing devices. Thus, it can have a significant impact on the next-generation of flat-lenses with not only low-cost fabrication, planar form factor, and compactness but also relatively high optical efficiency.

BRIEF DESCRIPTION OF THE DRAWINGS

The description will be more fully understood with reference to the following figures and data graphs, which are presented as various embodiment of the disclosure and should not be construed as a complete recitation of the scope of the disclosure, wherein:

FIG. 18 is a table comparison of the optical performances ($T$, $\bar{t}$, $\bar{r}$, $\sigma_T$, and $\sigma_t$) of the Si nanobar unit-cell which are illustrated in FIGS. 17A-17C in the absence and presence of multilayer self-aligned low-index coatings in accordance with various embodiments of the invention.

FIG. 19 is a table comparison of the optical performances ($T_{+1}$, $T_0$, and $R_0$) of Si nanogratings in the presence and absence of multilayer self-aligned low-index coatings for target angles of 5°, 10.5°, 16.11°, 21.6°, and 30° in accordance with various embodiments of the invention.

FIG. 20 is a table comparison of the optical performances ($\bar{T_1}$, $\bar{R_0}$, and $\bar{T_0}$) of the optimized Si nanogratings in the absence and presence of multilayer self-aligned low-index coatings in accordance with various embodiments of the invention.

SUMMARY OF THE DISCLOSURE

Figures 1A, 1B, 1C:
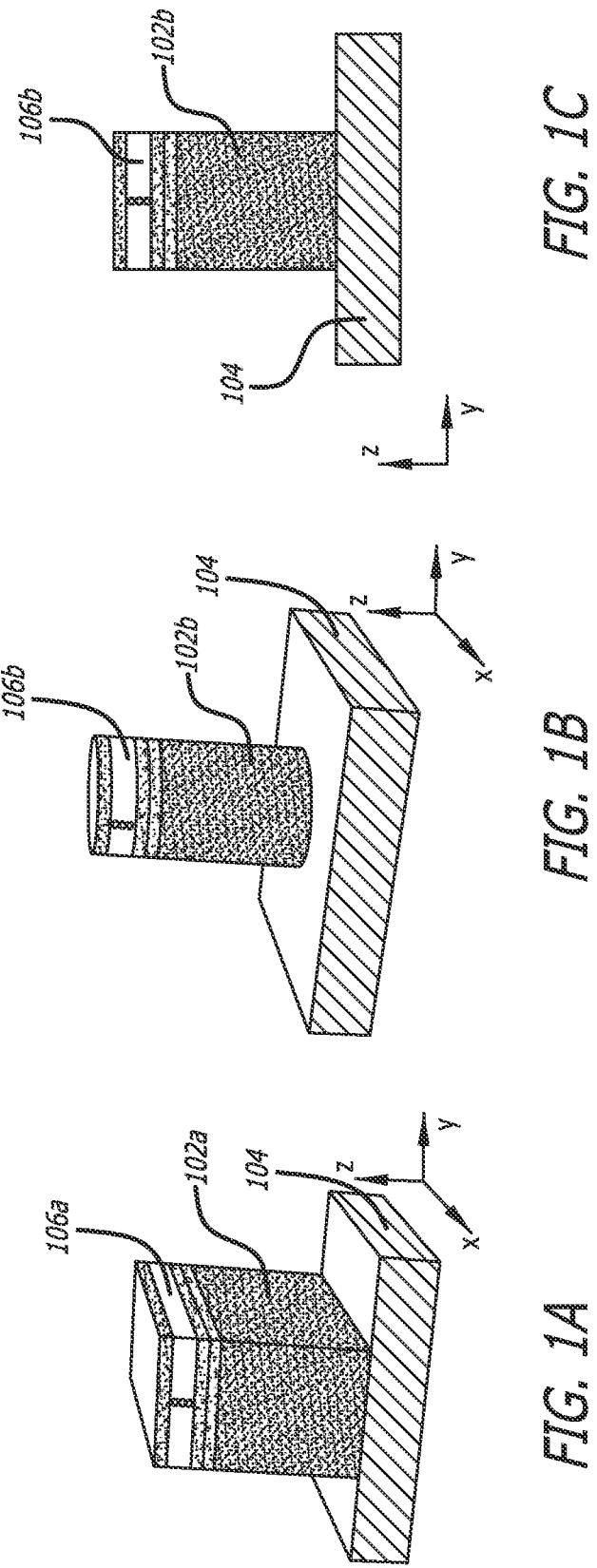
FIG. 1A illustrates an isometric view of a nanostructure including nanogratings with a low-index coating in accordance with an embodiment of the invention.
FIG. 1B illustrates an isometric view of a nanostructure including nanopillars with a low-index coating in accordance with an embodiment of the invention.
FIG. 1C illustrates a cross-sectional view of the nanopillars disclosed in connection with FIG. 1B.

Many embodiments of the invention include a meta-surface device including a substrate; a pattern of high-index pillars formed on the substrate; and a coating of low-index material in direct contact with the high-index pillars, where the coating of low-index material has a lower refractive index than the high-index pillars. Advantageously, the coating of low-index material may increase the optical efficiency of the meta-surface device. In some embodiments, the coating of low-index material may be a multi-layer low-index material comprising two or more layers of low-index material each having a refractive index lower than the high-index pillars. In some embodiments, the low-index material may be coated above or beneath the high-index pillars. In some embodiments, the coating of low-index material includes one or more transverse dimensions about equal to one or more transverse dimensions of the high index pillars.

Further, many embodiments of the invention include a meta-surface device including: a substrate; a pattern of high-index pillars formed on the substrate; and a coating of low-index material overlapping with the high-index pillars. The coating of low-index material has a lower refractive index than the high-index pillars.

In various other embodiments, the pattern of high-index pillars includes silicon, germanium, gallium phosphorus, gallium arsenic, gallium antimony, indium phosphorus, indium arsenic, indium antimony, titanium oxide, silicon nitride, or germanium-antimony-tellurium, and the coating of low-index material includes aluminum oxide, silicon oxide, magnesium oxide, magnesium fluoride, silicon nitride, or hafnium oxide.

In still various other embodiments, the high-index pillars are surrounded by a low-index encapsulation material.

In still various other embodiments, the coating of low-index material includes a multi-layer low-index material.

In still various other embodiments, the multi-layer low-index material includes two or more layers of low-index material each having a refractive index lower than the high-index pillars.

In still various other embodiments, the substrate comprises lower refractive index than the refractive index of the high-index pillars.

In still various other embodiments, the coating of low-refractive index material is located on a side of the high-index pillars opposite to the substrate.

In still various other embodiments, the coating of low-refractive index material is located between the high-index pillars and the substrate.

In still various other embodiments, the coating of low-refractive index material is located both on a side of the high-index pillars opposite to the substrate and between the high-index pillars and the substrate.

In still various other embodiments, the coating of low-refractive index material is conformally coated on the top and side surfaces of the high-index pillars.

In still various other embodiments, the coating of low-refractive index material is coated only on top surfaces of the high-index pillars.

In still various other embodiments, the high-index pillars each reside within a plurality of openings in the substrate.

In still various other embodiments, the low-index coating is conformally coated on the substrate including the plurality of openings.

In still various other embodiments, portions of the low-index coating are between the substrate and the high-index pillars.

In still various other embodiments, the coating of low-refractive index material comprises one or more transverse dimensions about equal to one or more transverse dimensions of the high-index pillars.

In still various other embodiments, the high-index pillars comprise a semiconductor or chalcogenide material and the coating of low-refractive index material comprises a lower index dielectric or oxide.

In still various other embodiments, the coating of low-refractive index material has a refractive index between 1.46 and 2.1.

In still various other embodiments, the high-index pillars have a refractive index above 1.8.

In still various other embodiments, the high-index pillars have a refractive index above 2.5.

In still various other embodiments, the coating of low-index material is in direct contact with the high-index pillars.

In still various other embodiments, the coating of low-refractive index material is coated only on top surfaces of the high-index pillars.

In still various other embodiments, the meta-surface device further includes a low-index encapsulation material, wherein the low-index coating is positioned between the low-index encapsulation material and the high-index pillars.

In still various other embodiments, the meta-surface device further includes a second low-index coating located between the high-index pillars and the substrate.

In still various other embodiments, the second low-index coating is a continuous layer coating the substrate directly contacting the high index pillars and the encapsulation media.

In still various other embodiments, the meta-surface device further includes a low-index encapsulation material positioned between the high-index pillars and the low-index coating.

In still various other embodiments, the low-index coating is a continuous layer coated over the low-index encapsulation material.

In still various other embodiments, the meta-surface device further includes a second low-index coating located between the high-index pillars and the substrate.

In still various other embodiments, the second low-index coating is a continuous layer coating the substrate.

In still various other embodiments, the low-index coating comprises a first top low-index coating and a second top low-index coating, and wherein the second low-index coating includes a first bottom low-index coating and a second bottom low-index coating.

In still various other embodiments, the first top low-index coating includes a thickness of 25 nm-55 nm and the second top low-index coating comprises a thickness of 70 nm-35 nm.

In still various other embodiments, the first bottom low-index coating includes a thickness of 160 nm-185 nm and the second bottom low-index coating includes a thickness of 100 nm-135 nm.

In still various other embodiments, the low-index coating further includes a third top low-index coating and a fourth top low-index coating, and the second low-index coating includes a third bottom low-index coating and a fourth bottom low-index coating.

In still various other embodiments, the coating of low-index material provides anti-reflection properties for the high-index pillars.

Further, many embodiments of the invention include a method of fabricating a meta-surface device, the method including: providing a substrate; fabricating a pattern of high-index pillars on the substrate; and coating the high-index pillars with a low-index coating using a self-aligning deposition process.

In various other embodiments, the self-aligning deposition process includes conformally coating the high-index pillars.

In still various other embodiments, the method further includes depositing a low index encapsulation media over the high-index pillars.

In still various other embodiments, the low index encapsulation media is deposited before coating the high-index pillars such that the low-index coating is positioned above the low index encapsulation media.

In still various other embodiments, the low index encapsulation media is deposited after coating the high-index pillars such the low index encapsulation media directly contacts a top surface of the low-index coating and the sidewalls of the high-index pillars.

In still various other embodiments, the self-aligning deposition process includes depositing a high-index layer and one or more low-index layers on top of the high index layer, etching the high-index layer and the one or more low-index layers leaving the high-index pillars and the low-index coating which forms a cap on the high-index pillars.

Further, many embodiments of the invention include a method of fabricating a meta-surface device, the method including: providing a substrate, the substrate including a plurality of openings; coating the surface of the substrate, including the inside of the plurality of openings with a low-index coating; and depositing a pattern of high-index pillars within the plurality of openings.

In various other embodiments, the top surface of the high-index pillars is approximately coplanar with the top surface of the low-index coating.

DETAILED DESCRIPTION

Previous methods of creating transmission efficiency improvements in meta-surface-based optical systems may include:

Topology adjustment to support high quality factor (Q-factor) features such as guided-mode resonances or optical bound states in the continuum (BICs). The supported high Q-factor resonance may provide robust control for the light and achieve high transmission level and full phase agility but may include both complicated physical geometry and highly accurate fabrication procedures.

Vertically cascaded multilayer meta-surfaces (e.g. shared-aperture optical platforms). It has been demonstrated that the integration of several layered meta-surfaces can enhance the transmission efficiency possibly due to the increment of light interaction with high-index materials and experiencing strongly coupled electromagnetic modes. However, in some cases, the horizontally arranged nanostructures may have less fabrication tolerance due to the possible lateral misalignment between cascaded layers and higher incident-angle sensitivity.

Multi-part unit-cell meta-surfaces. Incorporating more than a single inclusion in each unit-cell with different geometries or structural parameters may add more degrees of freedom in the design and offer the enhancement of the optical efficiency but this approach may not keep the footprint compactness. The enlargement of unit-cell ($>\lambda/2$) may decrease the angle-of-view and diffraction efficiency at the large target angles.

All-dielectric meta-surfaces, as advanced optical lenses, may be capable of performing beam steering with wide scanning angles, divergence/convergence, and two- and three-dimensional beam-forming/shaping with characteristics superior to the conventional optics, including subwavelength ultra-thin thickness, a flat and planar form, compatibility with micro-/nano-fabrication methods, and low-cost fabrication due at least partially to advances in nanotechnology and materials science. However, unlike conventional optics, they may not be able to direct light with near-unity efficiency. This may be due to several physical phenomena, such as undesired coupling effects between adjacent unit-cells, imperfect realization of the required phase distribution and inaccessibility to full phase pick up ($2\pi$), abrupt phase shift in the neighbor elements, and non-uniformity of transmission amplitude during phase modulation. Embodiments of the invention are compatible with available micro-/nano-fabrication techniques and tolerant to the fabrication imperfections in order to improve the diffraction efficiency of meta-surface based lenses.

The input impedance of optical meta-platforms may vary over the phase tuning range due to the presence of geometrically-different subwavelength unit-cells. This may create an impedance mismatch between the light source and the optical meta-surface, resulting in light reflection or an inefficient power transfer. As an inevitable phenomenon for the intrinsically narrowband meta-surfaces, tuning the structural parameters of building blocks to achieve a spatial phase modulation may create a non-negligible mismatch. As a consequence, some of the power from the source that illuminates the transmit array meta-surface may be reflected back towards the source (e.g. reflection loss).

Embodiments of the invention pertain to a multi-layer stack of dielectric materials self-aligned to high-index subwavelength structures, such that the transverse dimensions and texture of the multi-layer stack are proportional and related to the transverse dimensions of the subwavelength structure which may enhance the optical performance of the final device. The incorporation of self-aligned multi-layer low-index coatings into a meta-surface-based platform may be carried out in multiple ways, adjustable based on the situational purposes. In some embodiments, the multi-layer stack includes N-layer low-index dielectric materials wherein the layers include refractive indices of $n_i$=1.46-2.1 and thicknesses of $d_i$=5 nm-300 nm, where i=1, 2, . . . , N.

FIGS. 1A-1I illustrate example nanostructures which include self-aligned nanostructure coatings. Each nanostructures may include multi-layer low-index materials above or beneath the main high-index nanostructures. The multi-layer stack may be placed only on top of the high-index one-dimensional (1D) and two-dimensional (2D) inclusions as described in connection with FIGS. 1A-1C. FIG. 1A illustrates an isometric view of a nanostructure including nanogratings with a low-index coating in accordance with an embodiment of the invention. The nanogratings 102a are positioned on a substrate 104. The nanogratings 102a may include a high-index material. The low-index coating 106a may be a cap on the nanogratings 102a. The low-index coating 106a may be multilayer coating. The low-index coating 106a has a lower refractive index than the nanogratings 102a. The nanogratings 102a may be nanobars. The nanogratings 102a may be one dimensional nanogratings. FIG. 1B illustrates an isometric view of a nanostructure including nanopillars with a low-index coating in accordance with an embodiment of the invention. The nanopillars 102b are positioned on a substrate 104. The nanopillars 102b may include a high-index material. The low-index coating 106b may be a cap on the nanopillars 102b. The low-index coating 106b may be multilayer coating. The low-index coating 106b has a lower refractive index than the nanopillars 102b. The nanopillars 102b may include a circular cross-section. The nanopillars 102b may be two dimensional nanopillars. FIG. 1C illustrates a cross-sectional view of the nanopillars 102b disclosed in connection with FIG. 1B.

In some embodiments, for the nanogratings 102a of FIG. 1A and the nanopillars 102b of FIG. 1B, a method of making self-aligned structures may include depositing a high-index layer and then low index-layers, then etching the high-index layer and the low-index layers such that the low-index coating 106a, 106b and the high-index nanogratings 102a or nanopillars 102b both take on the transverse cross-section of a hard mask. In some embodiments, the high-index layer may be masked off and then an oxidation may be performed. Alternatively, a lift-off process, where an opening is defined in a resist (aligned to the high-index nanogratings 102a or nanopillars 102b, or used in the definition of the high-index nanogratings 102a or nanopillars 102b) and then additional dielectric layers are deposited, then the resist is lifted off.

Figure 1F:
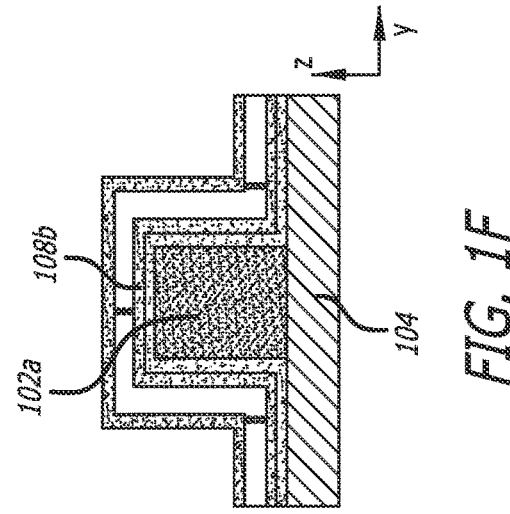
FIG. 1F illustrates a cross-sectional view of the nanopillars disclosed in connection with FIG. 1E.
Figure 1E:
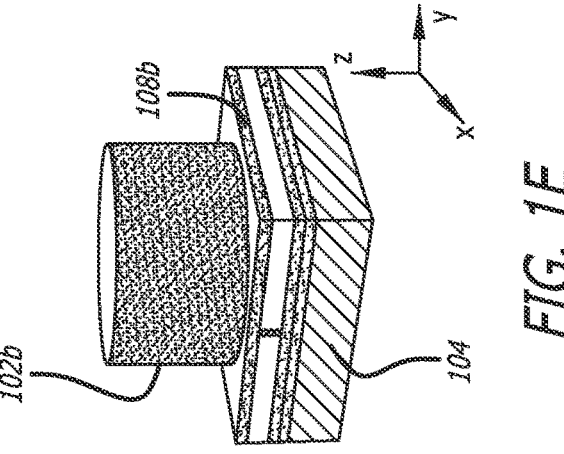
FIG. 1E illustrates an isometric view of a nanostructure including nanopillars with a low-index coating in accordance with an embodiment of the invention.
Figure 1D:
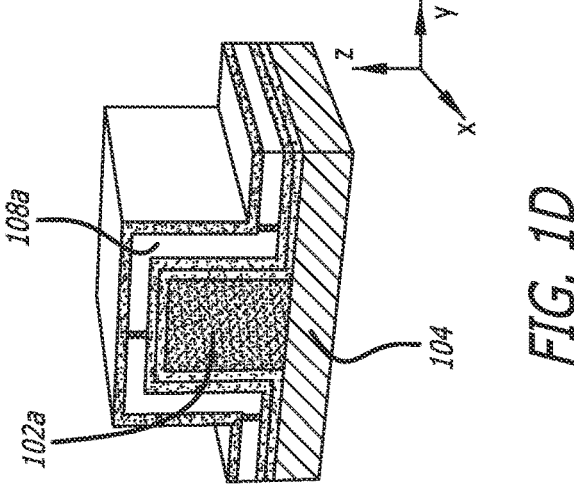
FIG. 1D illustrates an isometric view of a nanostructure including nanogratings with a low-index coating in accordance with an embodiment of the invention.

The multi-layer stack may be placed on the entire meta-surface's interface (both high-index inclusions and substrate), as described in connection with FIGS. 1D-1F. FIG. 1D illustrates an isometric view of a nanostructure including nanogratings with a low-index coating in accordance with an embodiment of the invention. The nanogratings 102a share the features discussed in FIG. 1A and these features will not be repeated in detail. A low-index coating 108a may be conformally deposited on the nanogratings 102a. The low-index coating 108a may be a multi-layer low-index coating. The low-index coating 108a has a lower refractive index than the nanogratings 102a. FIG. 1E illustrates an isometric view of a nanostructure including nanopillars with a low-index coating in accordance with an embodiment of the invention. The nanopillars 102b share the features discussed in FIG. 1B and these features will not be repeated in detail. A low-index coating 108b may be conformally deposited on the nanopillars 102b. The low-index coating 108b may be a multi-layer low-index coating. The low-index coating 108b has a lower refractive index than the nanopillars 102b. FIG. 1F illustrates a cross-sectional view of the nanopillars 102b disclosed in connection with FIG. 1E.

Figure 1I:
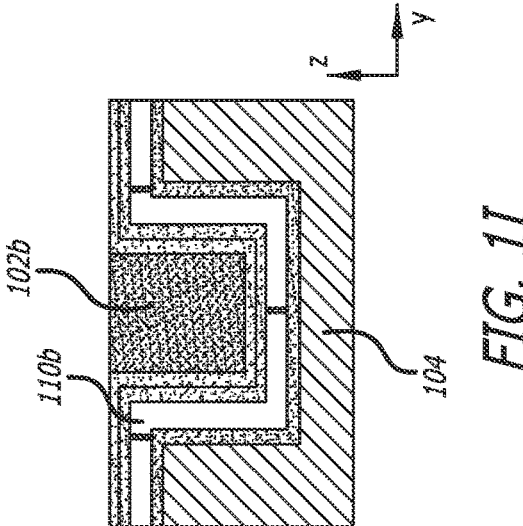
FIG. 1I illustrates a cross-sectional view of the nanopillars disclosed in connection with FIG. 1H.
Figure 1H:
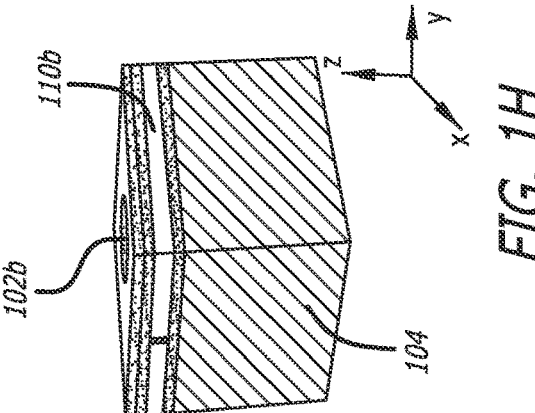
FIG. 1H illustrates an isometric view of a nanostructure including nanopillars with a low-index coating in accordance with an embodiment of the invention.
Figure 1G:
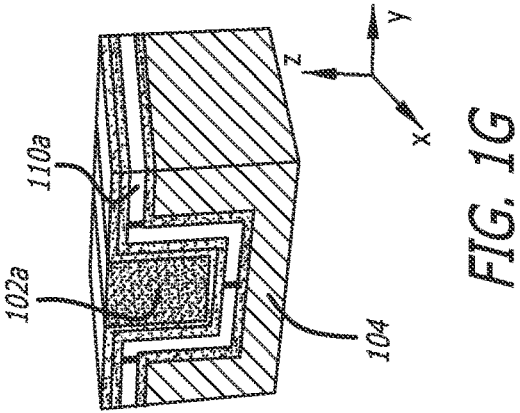
FIG. 1G illustrates an isometric view of a nanostructure including nanogratings with a low-index coating in accordance with an embodiment of the invention.

The multi-layer stack may be placed on a patterned low-index dielectric substrate then filled by a high-index material. The multi-layer low-index coatings are laid beneath the high-index nanostructures as described in connection with FIGS. 1G-1I. FIG. 1G illustrates an isometric view of a nanostructure including nanogratings with a low-index coating in accordance with an embodiment of the invention. The nanogratings 102a may be positioned in voids or holes within the substrate 104. A low-index coating 110a may be conformally deposited in the voids or holes such that the low-index coating 110a is positioned between the substrate 104 and the nanogratings 102a. The low-index coating 110a may be a multi-layer low-index coating. The low-index coating 110a has a lower refractive index than the nanogratings 102a. FIG. 1H illustrates an isometric view of a nanostructure including nanopillars with a low-index coating in accordance with an embodiment of the invention. The nanopillars 102b may be positioned in voids or holes within the substrate 104. A low-index coating 110b may be conformally deposited in the voids or holes such that the low-index coating 110b is positioned between the substrate 104 and the nanopillars 102b. The low-index coating 110b may be a multi-layer low-index coating. The low-index coating 110b has a lower refractive index than the nanopillars 102b. FIG. 1I illustrates a cross-sectional view of the nanopillars 102b disclosed in connection with FIG. 1H.

In contrast to the low-index coating 108a, 108b of FIGS. 1D-1F or the low-index coating 110a, 110b of FIGS. 1G-1I, the low-index coating 106a, 106b of FIG. 1A-1C may be etched after the deposition. While a 2D building block may only be demonstrated with a circular cross-section, the nanostructures may include regular/irregular polygonal cross-sections as well.

Figure 2:
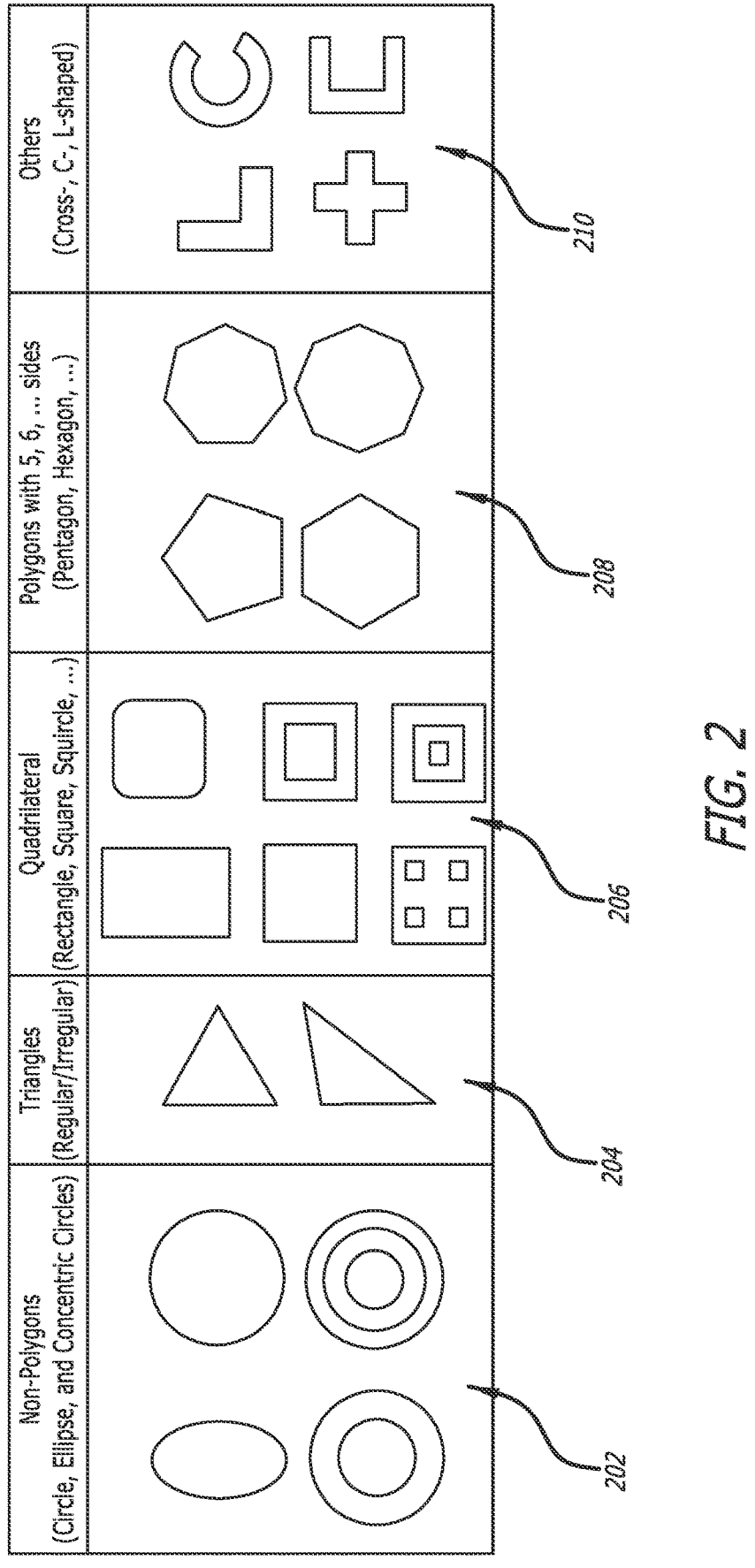
FIG. 2 is a schematic of several cross-sections for the 2D building blocks in accordance with embodiments of the invention.

The low-index coating enhances the optical efficiency of both 1D grating nanostructures and 2D nanopillars with various patterned cross-sectional shapes without adding any significant fabrication complexity. FIG. 2 illustrates other possible unit-cell cross-sections (e.g., x-y plane) in accordance with various embodiments of the invention. The five illustrates categories include but are not limited to non-polygons 202 (e.g., circle, ellipse, and concentric circles), regular/irregular triangles 204, quadrilateral 206 (e.g., rectangle, square, squircle, and concentric rectangles), N-sided polygons 208 (N>4), and others 210 (cross-, C-, L-shaped). Other cross-sections which are not shown here have been contemplated.

Figure 3C:
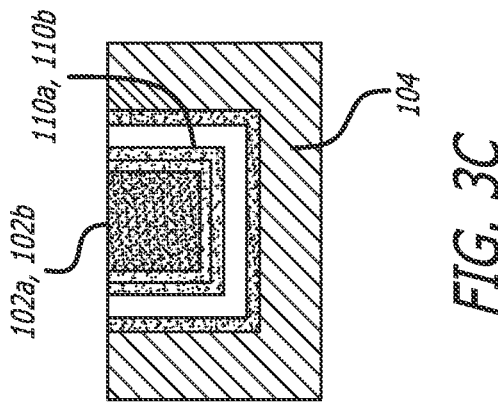
FIGS. 3A-3C illustrate various different cross-sections of different configurations for high-index nanostructures incorporating low-index coatings in accordance with embodiments of the invention.
Figure 3B:
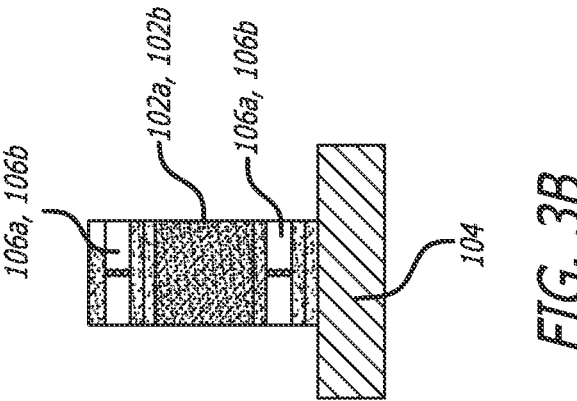
Figure 3A:
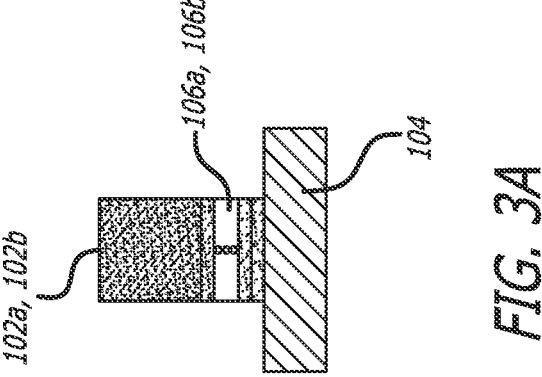

Also, the disclosed low-index coatings may include any other possible inspired or derivative topologies from the ones elaborated in FIG. 1. FIGS. 3A-3C illustrate various different cross-sections of different configurations for high-index nanostructures incorporating low-index coatings in accordance with embodiments of the invention. The low-index coating 106a, 106b described in connection with FIG. 1A-1C can be located beneath or both on top and beneath the high-index nanostructures 102a, 102b, as shown in FIGS. 3A and 3B. Moreover, FIG. 3C illustrates another closely-related topology to the low-index coating 110a, 110b described in connection with FIG. 1G-1I. As illustrated, the low-index coating 110a, 110b may be absent from top surface of the substrate 104. The low-index coating 110a, 110b may be etched or polished from the surface of the substrate 104 such that the nanopillar 102a or the nanograting 102b is level with the surface of the substrate 104.

Examples of improvements to optical efficiency produced by the low-index coating may include:

Total Transmission Improvement: The increase of the total transmittance (e.g., the ratio of transmitted intensities in all diffraction harmonics to the intensity of incident beam). This can be achieved by enhancing the transmission amplitude of each individually selected meta-surface unit-cell. Under assumption of low dissipative loss in the optical system (e.g., absence of lossy materials or presence of materials with negligibly small extinction coefficients), this also may result in the reduction of reflection.

On-demand Beam Deflection Efficiency Enhancement: Highly directive meta-array with high gain: The enhancement of beam deflection efficiency (the ratio of the power which is transmitted to a desired diffraction order to the total power of the incident beam) for a single target angle up to θ<30°. This is attainable due to the possibility of obtaining almost a uniform transmission amplitude for all the individual unit-cells which are included in an optimized meta-grating.

Full control over radiation pattern side-lobes: reduction of undesired diffraction orders: The reduction of specular reflection (e.g., the reflected zero-order diffraction) in a transmissive meta-grating while the transmitted zero-order diffraction may be maintained at a low level.

Robust applicability for sophisticated beam-forming/shaping: Diffraction efficiency improvement over wide angle-of-view: Consistent enhancement of diffraction efficiency for a broad angle-of-view (e.g., −30° to +30°) leading to improvement of functionality for more sophisticated lenses, including holograms with maximum deflection angle of θ<30° and focusing lenses with f-number as low as approximately 0.9. Generally, these lenses benefit from multiple meta-gratings (e.g., different arrangement of meta-surfaces) with different diffraction angles. As a result, embodiments of the disclosed design techniques may produce the possibility of simultaneous diffraction efficiency improvement over a wide angle-of-view which may lead to the overall functionality improvement with less dependency on the meta-array arrangements.

Nano-Structure Design and Example Methods of Manufacture

Embodiments of the invention include a versatile concept for incorporating multi-layer low-index coatings into meta-surface based optical platforms. Each of these embodiments includes high-index nanostructures which can be made of Si, Ge, III-V compound semiconductors (e.g., GaP, GaAs, GaSb, InP, InAs, and InSb), TiO$_2$, SiN, and germanium-antimony-tellurium (GST), or other high-index materials. These high-index nano-elements may form 1D nanograting or 2D pillars with various kinds of patterned cross-sections, as depicted in FIG. 2. These building blocks with refractive indices higher than 1.8 (n>1.8), and a height in the range of [λ/2−λ] may produce robust light manipulation via spatial phase modulation. In some embodiments, the high-index nano-elements may have a refractive index higher than 2.5 (n>2.5). These high-index nano-elements can be fabricated through a deposition process such as a sputtering process, followed by patterning via electron beam-, photo-, and nanoimprint-lithography, followed by etching the deposited high-index films.

It has been discovered that these high-index nano-elements form meta-surface based platforms which include high-index inclusions. These meta-surface based platforms may be faced with optical efficiency limitations. Without limitation to any particular theory, these restrictions may arise due to the lack of possibility of achieving simultaneous full transmission and phase coverage (e.g., perfect impedance matching for all the unit-cells with variable structural parameters). Various embodiments of the invention include a layered low-index material including Al$_2$O$_3$, SiO$_2$, MgO, MgF$_2$, SiN, and HfO$_2$. This layered low-index material may be coated onto the high-index nano-elements and may help to add more degrees of freedom in the design procedure and enhance the optical efficiency. The low-index layers may be grown by various deposition processes such as chemical vapor deposition (CVD), atomic layer deposition (ALD), plasma enhanced chemical vapor deposition (PECVD), sputtering, and e-beam/thermal evaporation. The low-index films may each have refractive indices in the range of 1.46-2.1 and thicknesses between 5 nm and 300 nm. In some embodiments, different layers of a multi-layer low-index coating may be made out of different low-index coating materials (e.g., one layer may be made out of Al$_2$O$_3$ whereas the other may be made out of SiO$_2$) In contrast to the low-index coating 108a, 108b discussed in connection with FIGS. 1D-1F and the low-index coating 110a, 110b discussed in connection with FIGS. 1G-1I, the low-index coating 106a, 106b discussed in connection with FIGS. 1A-1C may include a further fabrication step, in which the low-index films are etched after their deposition process but before the high-index nanostructure is defined. The etching may be carried out via developing a photoresist film to define the pattern. Advantageously, this single etch step may then define both the high-index pillar and the associated low-index coatings. The photoresist may eventually be removed by a lift-off technique. To sum up, the fabrication of the proposed self-aligned pillar coatings can be carried out using multiple deposition stages and lithography procedures. These straightforward implementation steps make these nanostructures fabrication-friendly and desirable for dense-integration into optical meta-devices.

Example Physical Mechanism

Figure 4B:
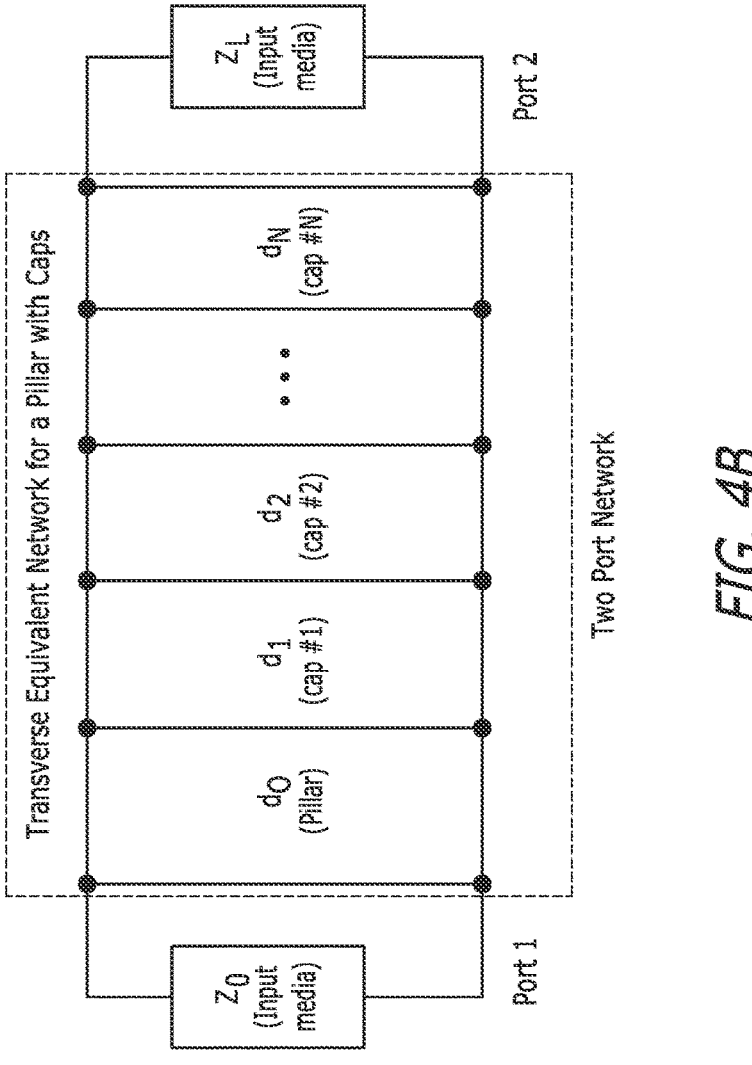
FIG. 4B is a two-port transverse equivalent network for the high-index nanopillar with circular cross-section including the multilayer low-index caps described in connection with FIG. 4A.
Figure 4A:
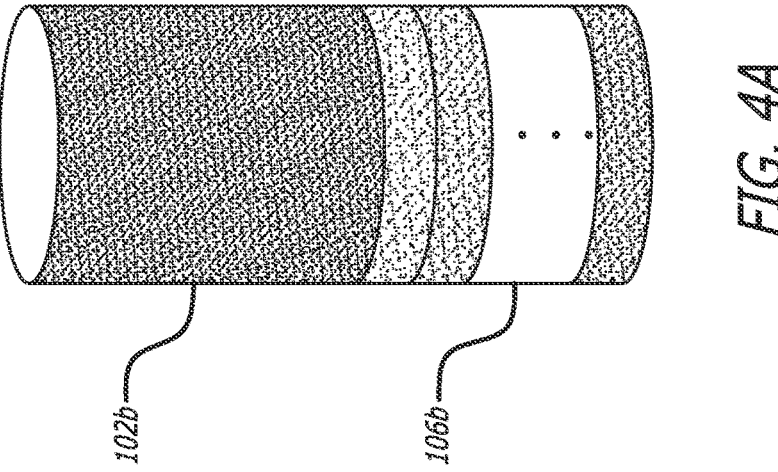
FIG. 4A is a schematic of a cascaded circular waveguide filled by different low-/high-index materials in accordance with an embodiment of the invention.

An analogy between the nanopillar 102b disclosed in connection with FIGS. 1B and 1C in presence of the low-index dielectric cap 106b and a circular waveguide with N+1 discontinuities is presented. FIG. 4A is a schematic of a cascaded circular waveguide filled by different low-/high-index materials in accordance with an embodiment of the invention. The cascaded circular waveguide may include nanopillars 102b which may be oriented along z-axis, under illumination of TE-/TM-polarized light. The cascaded circular waveguide may be filled by the nanopillars 102*b* coated with the low-index coating 106*b* formed as a low-index dielectric cap. FIG. 4A shows the diagram of a cascaded waveguide configuration comprises four sections: Section 1 is the high-index-filled waveguide including the nanopillars 102*b* and Sections 2-4 are filled by low-index materials which may include the low-index coatings 106*b*. The waveguide cross-section may be identical along the nanostructure so the only discontinuity may be related to the change of the optical constant of materials along the propagation direction (e.g. z-axis). An analysis was performed of the propagation of electromagnetic waves including the magnetic transverse (TM) and electric transverse (TE) modes in the case of isotropic circular waveguides. FIG. 4B is a two-port transverse equivalent network for the high-index nanopillar 102*b* with circular cross-section including the multilayer low-index caps 106*b* described in connection with FIG. 4A. The transfer matrix of a unit cell composed of a dielectric layer of thickness $d_i$, refractive index of $n_i$, and radius of a for TE/TM waves may be written as follows (under assumption of time harmonic fields of the form $e^{i\omega \tau}$), $$\left[T^{TM/TE}\right] = \tag{1}$$

$$\begin{bmatrix} A_{cap/pillar} & B_{cap/pillar} \\ C_{cap/pillar} & D_{cap/pillar} \end{bmatrix} = \begin{bmatrix} \cos(\beta_d d) & iZ_{mn}^{TM/TE}\sin(\beta_d d) \\ \dfrac{i}{Z_{mn}^{TM/TE}}\sin(\beta_d d) & \cos\beta_d d) \end{bmatrix},$$

where $\beta_d = \beta\sqrt{1-(f_c/f)}$ is the complex propagation constant along the z-axis inside the dielectric-filled circular waveguide and the wave impedances for TE and TM waves are $$Z_{mn}^{TM} = \eta\sqrt{1-(f_c/f)} \text{ and } Z_{mn}^{TE} = \eta/\sqrt{1-(f_c/f)},$$

respectively, under assumption of an operating frequency larger than the cut-off frequency (f>f_c). For TE-polarized modes, the cutoff frequency (f_c) is defined as $(f_c)_{mn} = \chi'_{mn}/2\pi a\sqrt{\mu\varepsilon}$ where a is the radius of circular waveguide and $\chi'_{mn}$ indicates the nth zero (n=1, 2, 3, . . . ) of the derivative of the Bessel function $J_m$ of the first kind and of order m(m=0, 1, 2, 3, . . . ). For the sake of simplicity, we investigated only the propagation modes in this cascaded waveguide, filled with isotropic media. The total ABCD (voltage-current transmission) matrix can be obtained by chaining the ABCD matrices of all the cascaded discontinuities in the corresponding waveguide. ABCD parameters are independent upon the source and load impedances. In order to convert ABCD parameters to scattering (S-)parameters, while the common approach is consideration of $TE_{mn}/TM_{mn}$ mode wave-impedance of an empty waveguide with the same cross-section for the port reference impedance, free space wave impedance was assumed to be consistent with the underlying physics of the problem which is free-standing high-index nanopillar with multi-layer caps. Therefore, $|S_{21}|$ (ratio of the output transmitted power wave divided by the input incident power wave, transmission coefficient) and $|S_{11}|$ (ratio of the reflected power wave divided by the input incident power wave, reflection coefficient) can be calculated as a function of circular waveguide radius. In case of illumination of a specific $TE_{mn}/TM_{mn}$ mode, since all the interfaces have the same cross-section, no other modes can be excited along the cascaded layers. Thus, adding the multiple low-index layers with carefully optimized thicknesses of $d_i$ and refractive indices of $n_i$ to a high-index layer may help to enrich its functionalities and give it the ability to manipulate light with superior optical characteristics. Examples of the significant contributions of multilayer low-index caps may include:

Increased transmission amplitude ($|S_{21}|$) for the majority of pillar radii,

Stabilized transmission amplitude response as a function of pillar radius,

Increased transmission phase span ($\angle S_{21}$) as a function of pillar radius.

Without limitation to any particular theory, the aforementioned contributions may be achieved because of adding more degrees of freedom to the building block which may make it possible to achieve broader impedance matching between the source and load impedances. This may be equivalent to the full power transition between two mediums while the phase-delay can be robustly controlled. While the physical mechanism may be analogous to the broadband band-pass filters achieved by cascaded waveguides in mm-wave structures, the goal here is keeping the impedance matching for different pillar radii, instead of particularly broadening the frequency bandwidth. The disclosed method may be a robust way to diminish the reflection loss (e.g. loss of some of the power from the source that illuminate the transmissive optical platform reflect back towards the source). As disclosed below, the aforementioned achievements may specifically help to improve the optical efficiency of high-index pillar meta-surfaces.

Other Embodiments

Figure 5:
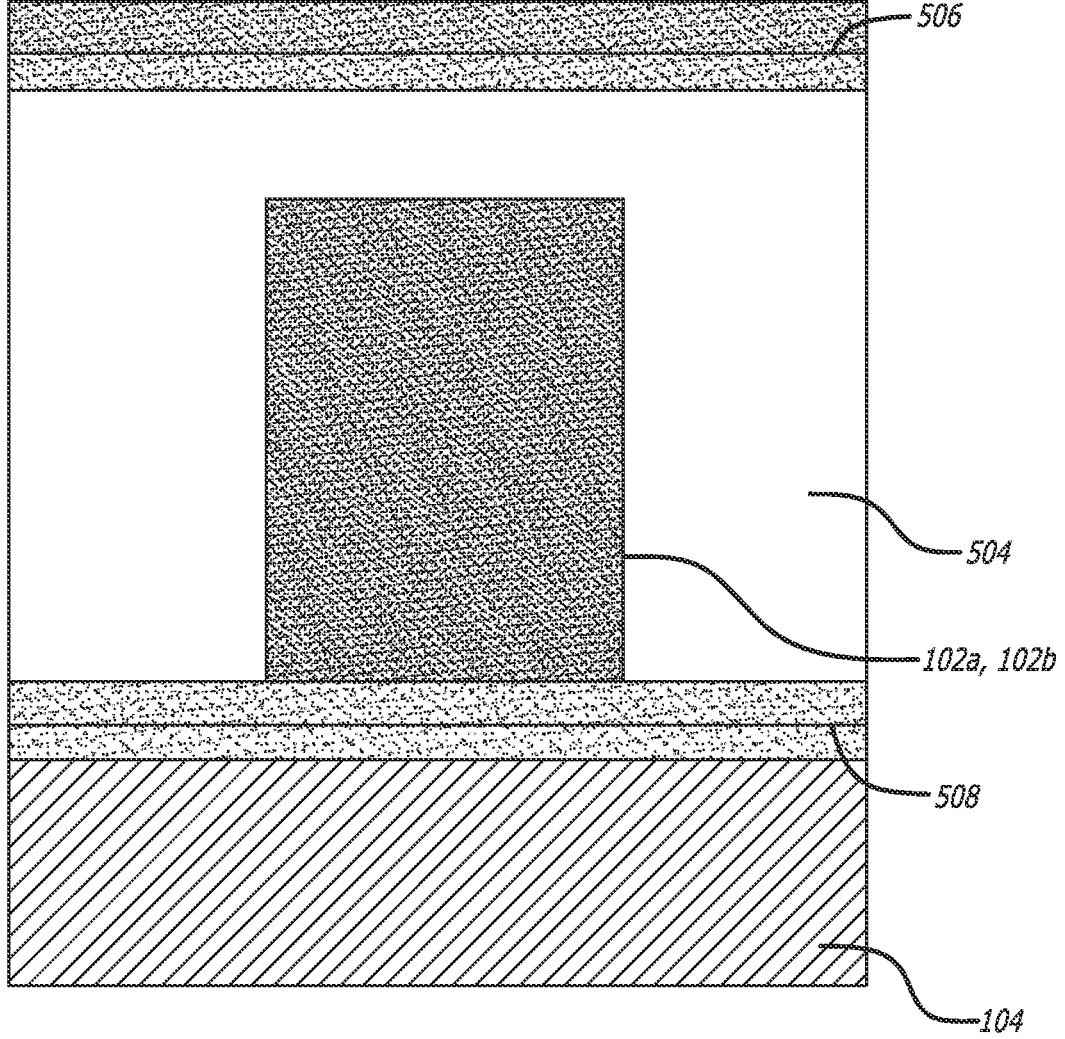
FIG. 5 illustrates a cross-sectional view of a nanostructure implemented with low-index coatings in accordance with an embodiment of the invention.

While the above disclosure relates to a multi-layer cap that may be present on the nanostructures, the multi-layer structure may also be implemented as continuous layers overlapping the nanostructures. The nanostructures may be the nanopillars 102*a* or the nanogratings 102*b* discussed above. FIG. 5 illustrates a cross-sectional view of a nanostructure implemented with low-index coatings in accordance with an embodiment of the invention. The nanostructure may be nanopillars 102*a* or nanogratings 102*b*. A bottom low-index coating 508 may be positioned below the nanostructures 102*a*,102*b* such that the bottom low-index coating 508 is between the substrate 104 and the nanostructure 102*a*,102*b*. The bottom low-index coating 508 may be a continuous and/or unpatterned coating. The bottom low-index coating 508 may be a multilayered low-index coating. The nanostructures 102*a*,102*b* may be covered by an encapsulation media 504. A top low-index coating 506 may be positioned on top of the encapsulation media 504. The top low-index coating 506 may be a continuous and/or unpatterned coating. The top low-index coating 506 may be a multilayered low-index coating.

Figure 6A:
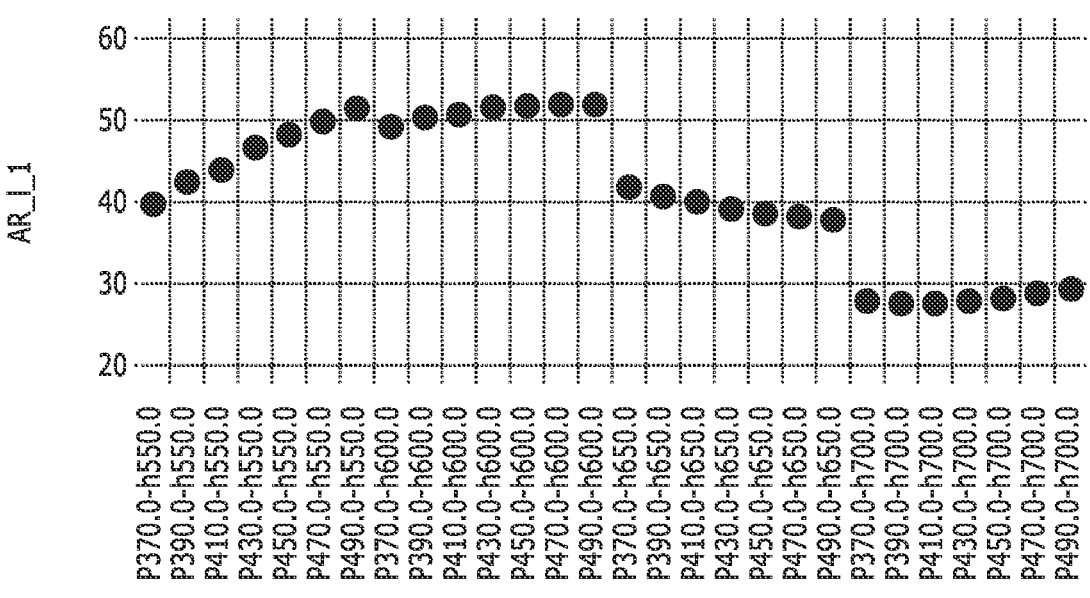
FIGS. 6A-6D illustrate various plots for the various layers of the top low-index coating and the bottom low-index coating in accordance with various embodiment of the invention.
Figure 6B:
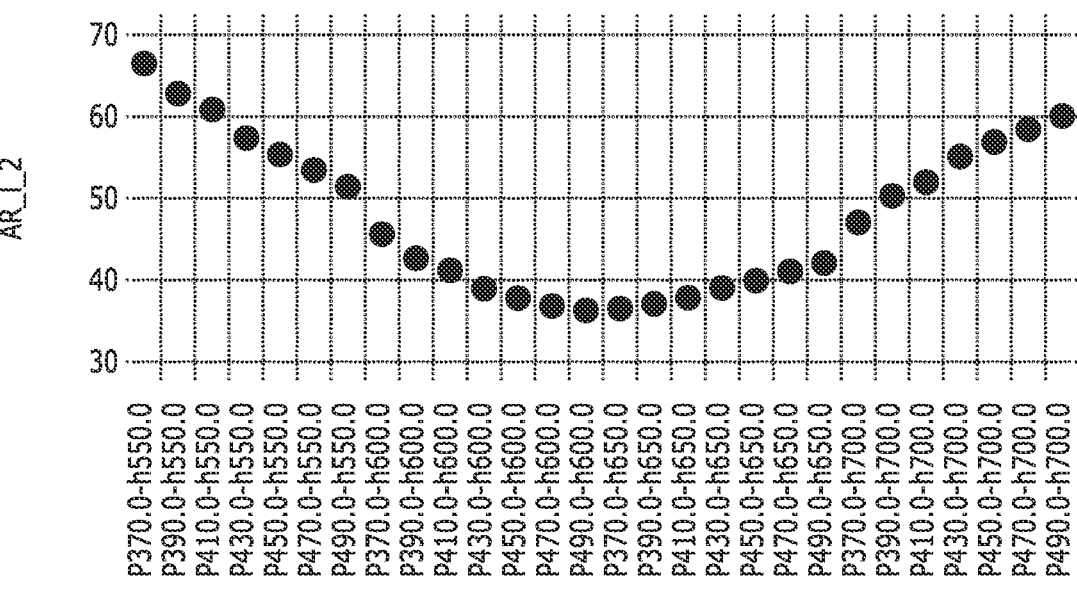
Figure 6C:
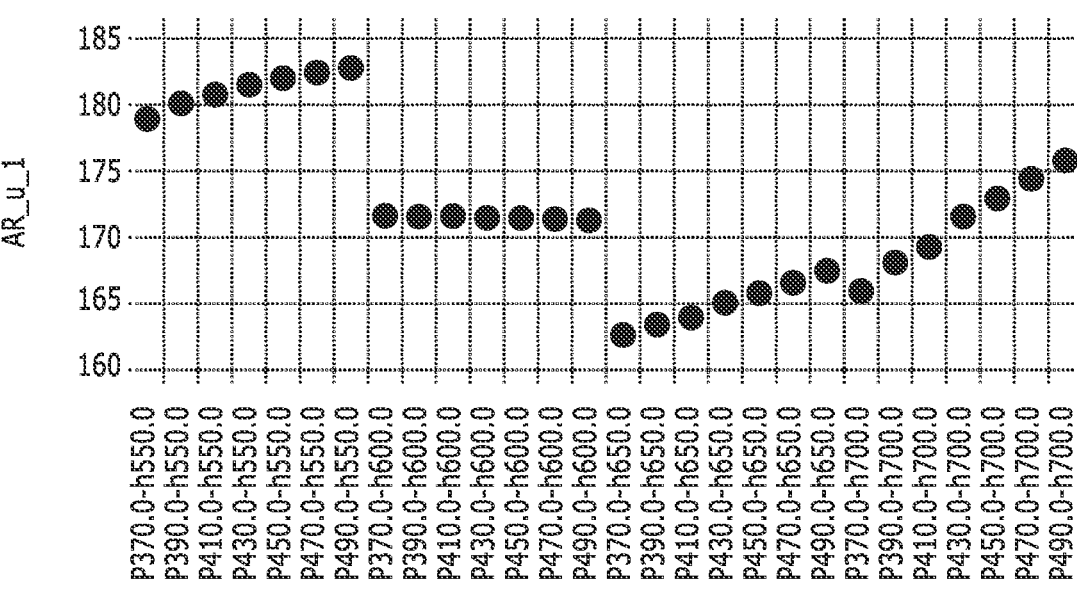
Figure 6D:
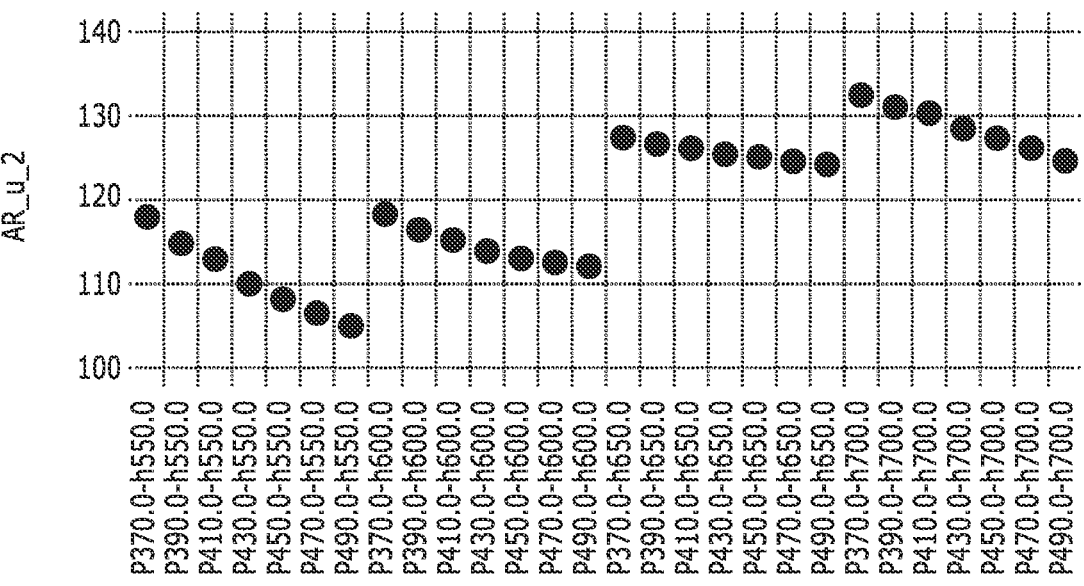

FIGS. 6A-6D illustrate various plots for the various layers of the top low-index coating 506 and the bottom low-index coating 508 in accordance with various embodiment of the invention. The bottom low-index coating 508 may include two low-index layers. FIG. 6A illustrate a plot of various thicknesses for various implementations of a first low-index layer of the bottom low-index coating 508. FIG. 6B illustrate a plot of various thicknesses for various implementations of a second low-index layer of the bottom low-index coating 508. The top low-index coating 506 may include two low-index layers. FIG. 6C illustrate a plot of various thicknesses for various implementations of a first low-index layer of the top low-index coating 506. FIG. 6D illustrate a plot of various thicknesses for various implementations of a second low-index layer of the top low-index coating 506. For FIGS. 6A-6D, the vertical axis represents various thicknesses and the horizontal axis represents various designs. For the horizontal axis, P### indicates a certain pitch of the nanostructures 102*a*,102*b* whereas h### indicates a certain height of the nanostructures 102*a*,102*b*. For example, P360-h550.0 indicates a pitch of 360 nm and a height of 550 nm for the nanostructures 102*a*,102*b*.

In some embodiments, the top low-index coating 506 includes a first top low-index coating and a second top low-index coating and the bottom low-index coating 508 includes a first bottom low-index coating and a second bottom low-index coating. Various configurations for thicknesses of each of the coatings may be found in FIGS. 6A-6D. In some embodiments, the first top low-index coating comprises a thickness of 25 nm-55 nm and the second top low-index coating comprises a thickness of 70 nm-35 nm. In some embodiments, the first bottom low-index coating comprises a thickness of 160 nm-185 nm and the second bottom low-index coating comprises a thickness of 100 nm-135 nm.

Figure 7:
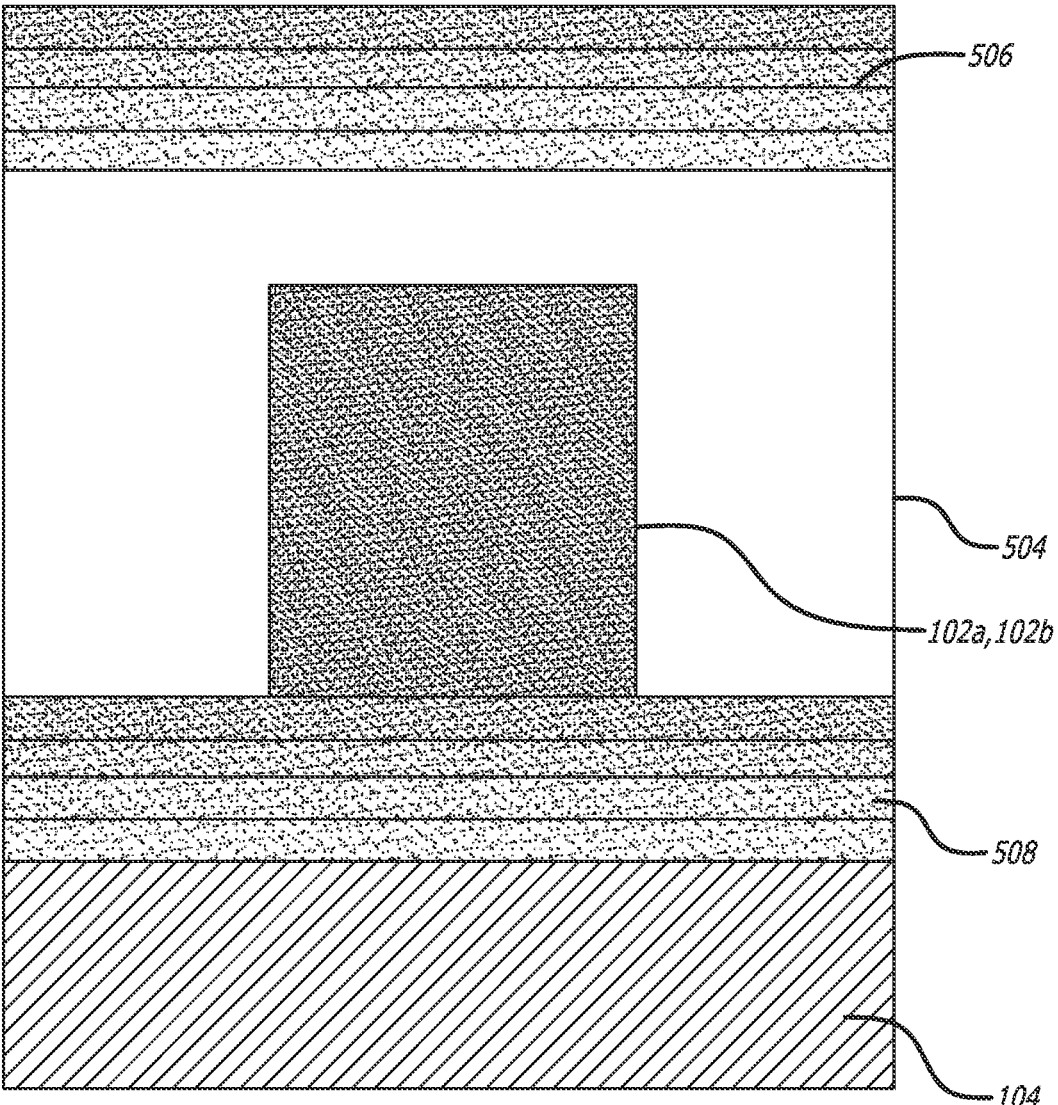
FIG. 7 illustrates a cross-sectional view of a nanostructure implemented with low-index coatings in accordance with an embodiment of the invention.

In some embodiments, the top low-index coating 506 further includes a third top low-index coating and a fourth top low-index coating, and wherein the bottom low-index coating 508 further includes a third bottom low-index coating and a fourth bottom low-index coating (illustrated in FIG. 7). Various configurations for thicknesses of each of the coatings may be found in FIGS. 8A-8H.

Figure 8A:
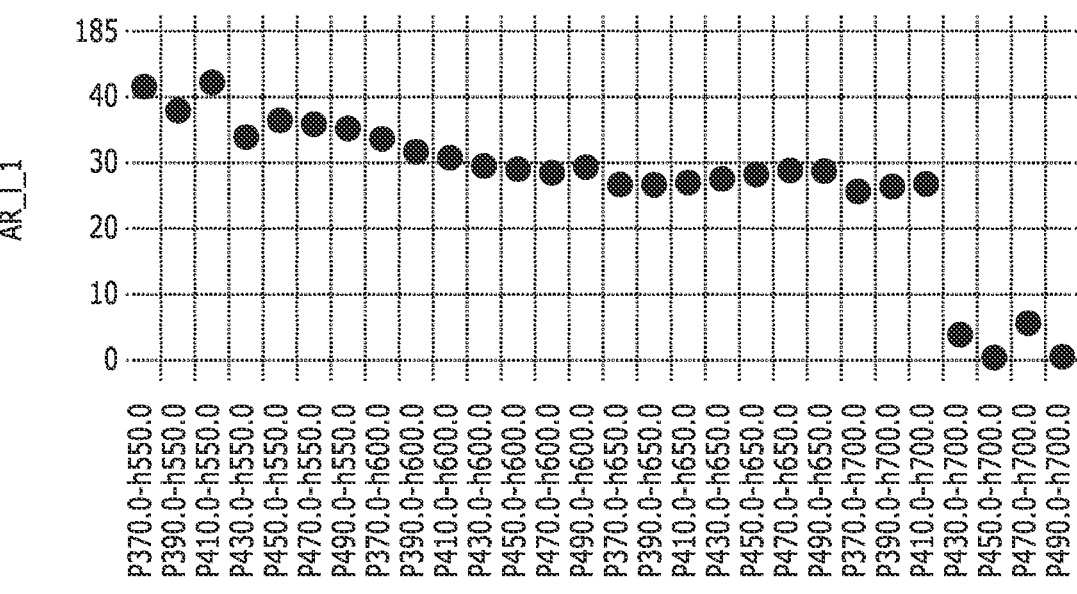
FIGS. 8A-8H illustrate various plots for the various layers of the top low-index coating and the bottom low-index coating in accordance with various embodiment of the invention.
Figure 8B:
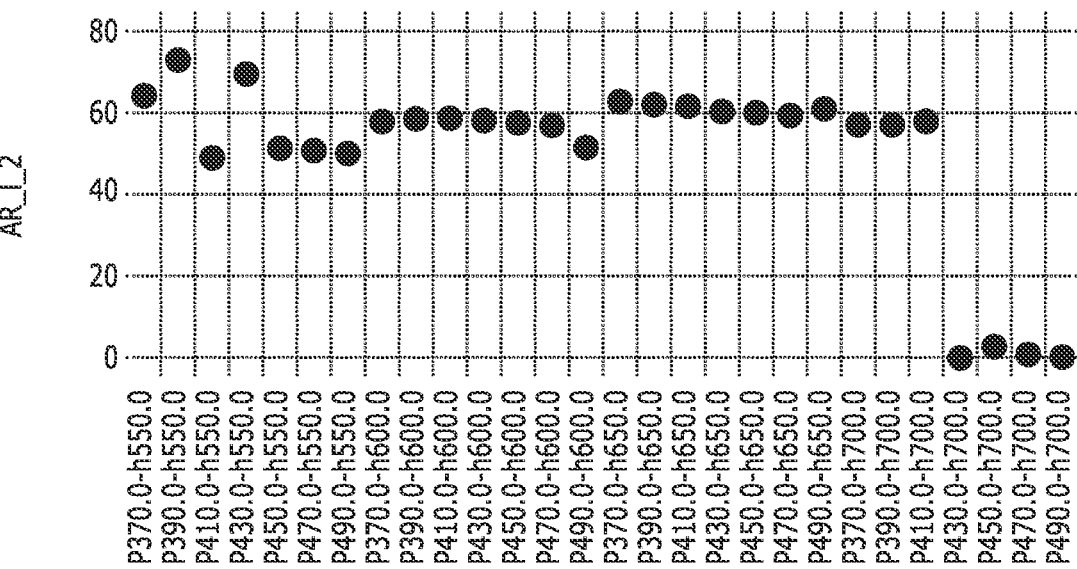
Figure 8C:
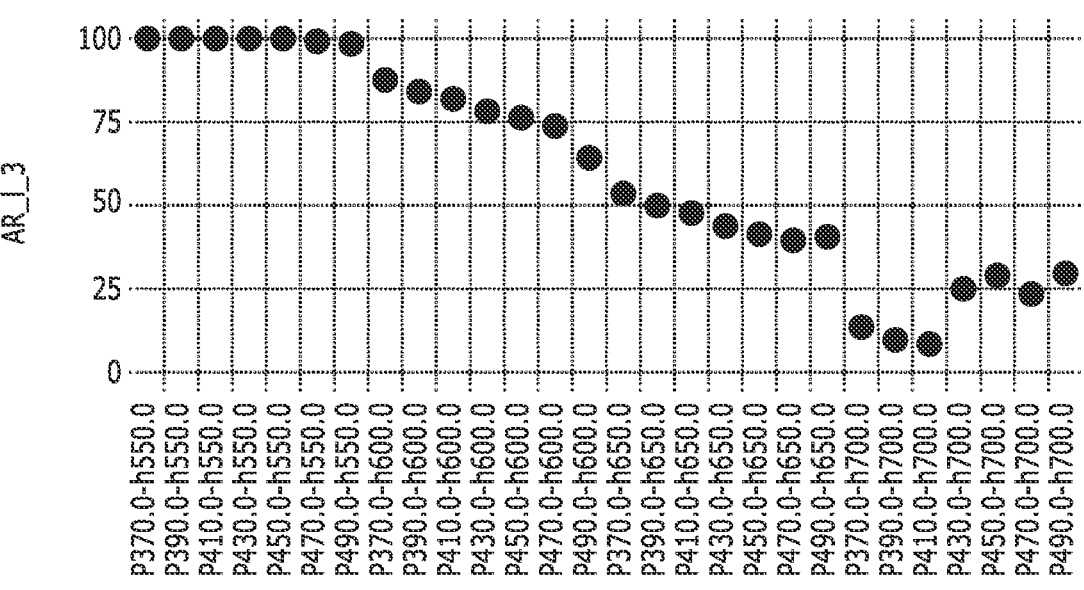
Figure 8D:
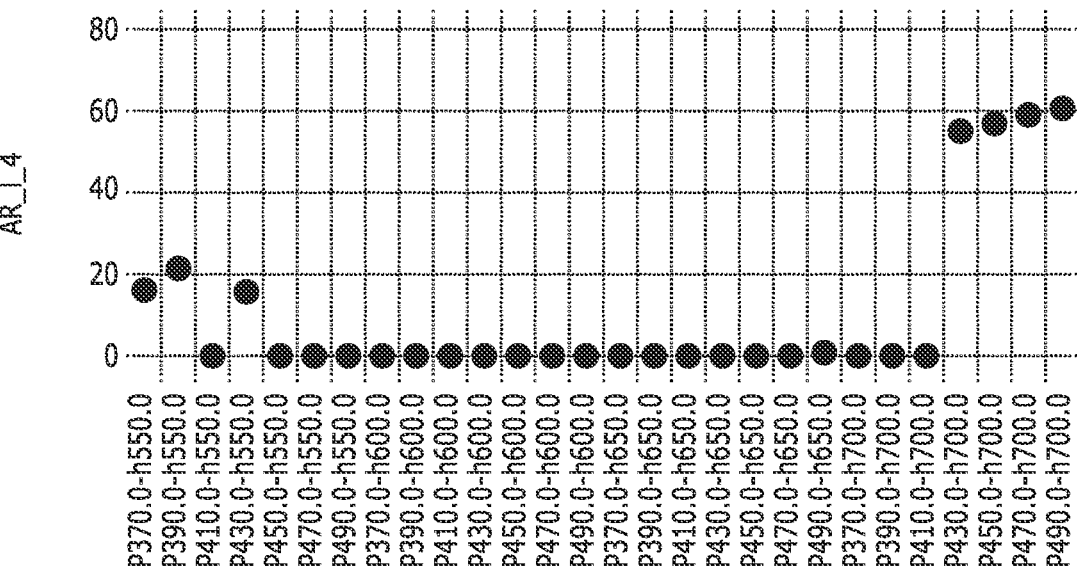

FIG. 7 illustrates a cross-sectional view of a nanostructure implemented with low-index coatings in accordance with an embodiment of the invention. The features of FIG. 7 are described in connection with FIG. 5 and these descriptions will not be repeated. FIGS. 8A-8H illustrate various plots for the various layers of the top low-index coating 506 and the bottom low-index coating 508 in accordance with various embodiment of the invention. The bottom low-index coating 508 may include four low-index layers. FIG. 8A illustrate a plot of various thicknesses for various implementations of a first low-index layer of the bottom low-index coating 508. FIG. 8B illustrate a plot of various thicknesses for various implementations of a second low-index layer of the bottom low-index coating 508. FIG. 8C illustrate a plot of various thicknesses for various implementations of a third low-index layer of the bottom low-index coating 508. FIG. 8D illustrate a plot of various thicknesses for various implementations of a fourth low-index layer of the bottom low-index coating 508.

Figure 8E:
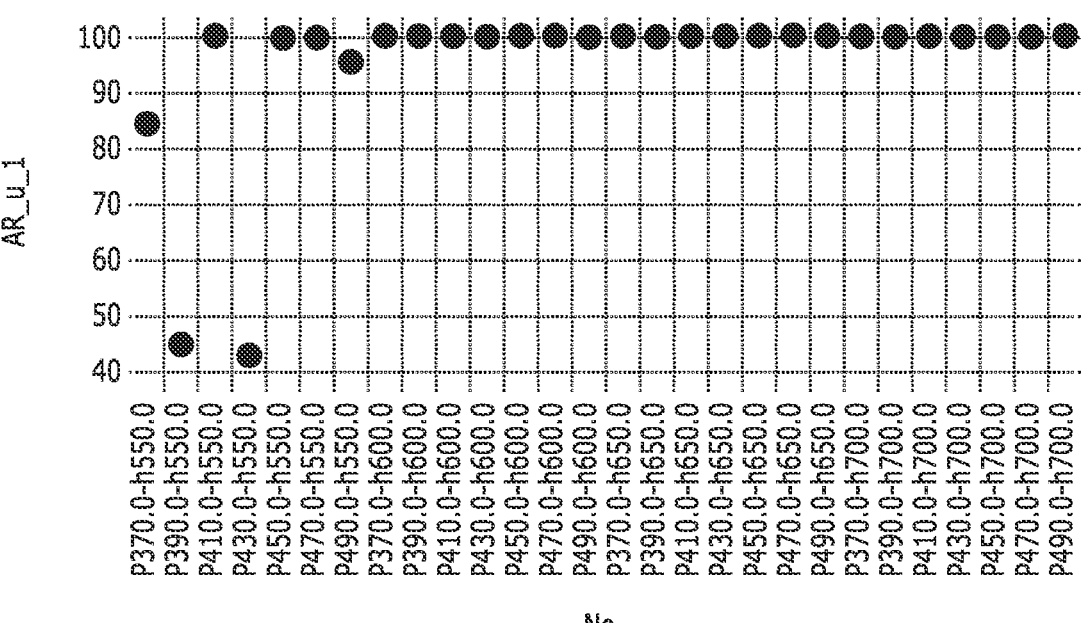
Figure 8F:
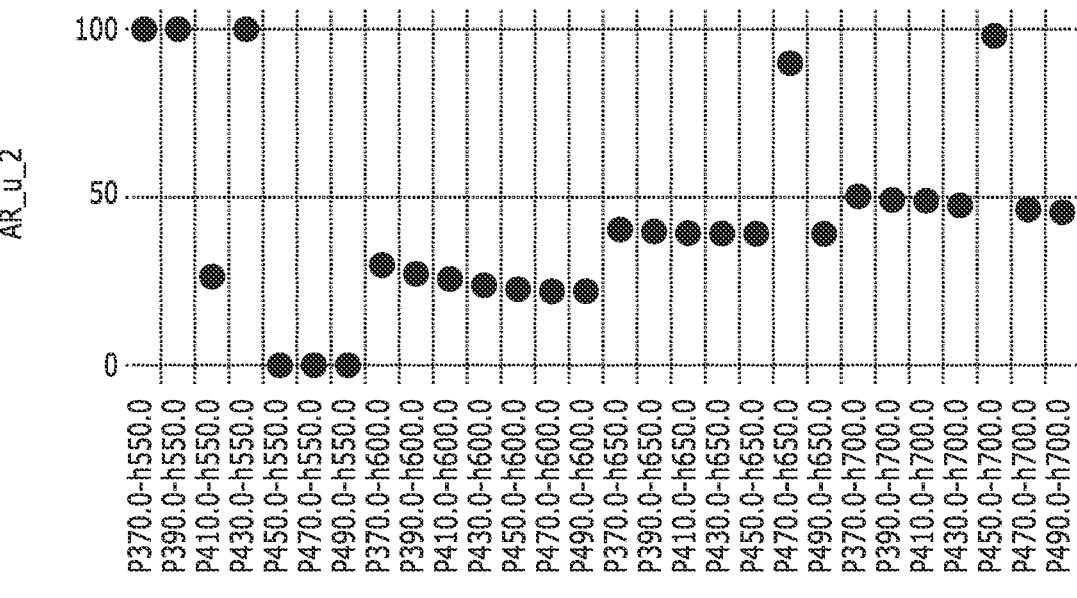
Figure 8G:
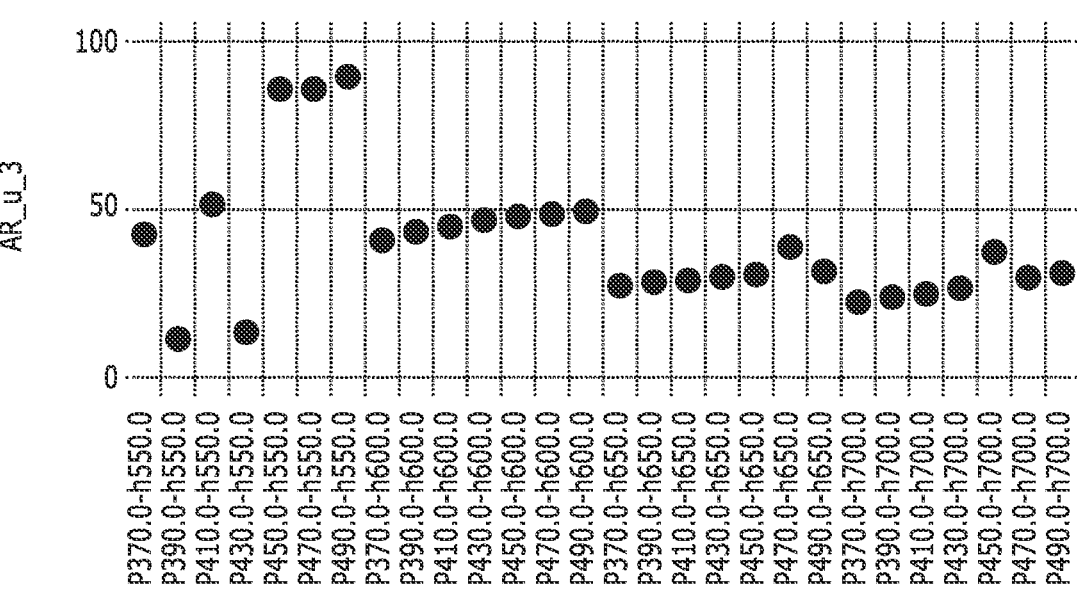
Figure 8H:
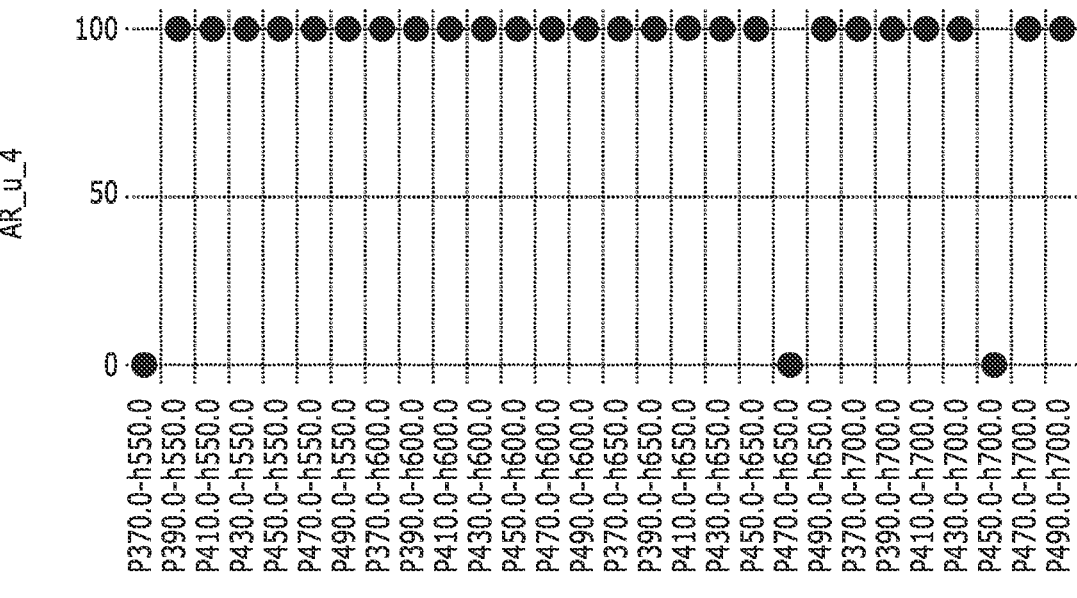

The top low-index coating 506 may include four low-index layers. FIG. 8E illustrate a plot of various thicknesses for various implementations of a first low-index layer of the top low-index coating 506. FIG. 8F illustrate a plot of various thicknesses for various implementations of a second low-index layer of the top low-index coating 506. FIG. 8G illustrate a plot of various thicknesses for various implementations of a third low-index layer of the top low-index coating 506. FIG. 8H illustrate a plot of various thicknesses for various implementations of a fourth low-index layer of the top low-index coating 506. For FIGS. 8A-8H, The vertical axis represents various thicknesses and the horizontal axis represents various designs. For the horizontal axis, P### indicates a certain pitch of the nanostructures 102*a*, 102*b* whereas h### indicates a certain height of the nanostructures 102*a*,102*b*. For example, P370-h550.0 indicates a pitch of 370 nm and a height of 550 nm for the nanostructures 102*a*,102*b*.

Figure 9:
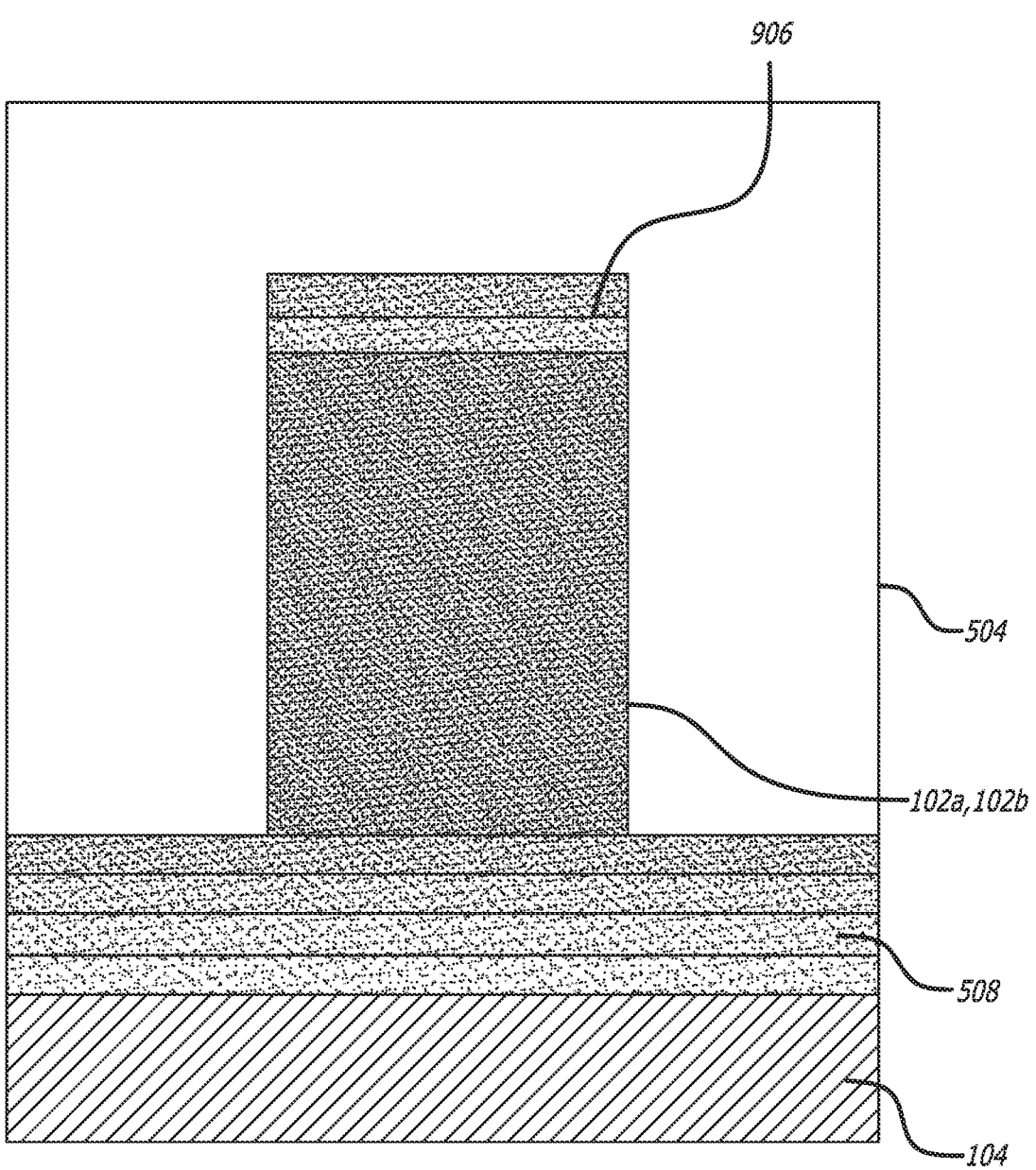
FIG. 9 illustrates a cross-sectional view of a nanostructure implemented with low-index coatings in accordance with an embodiment of the invention.

FIG. 9 illustrates a cross-sectional view of a nanostructure implemented with low-index coatings in accordance with an embodiment of the invention. Many of the features of FIG. 9 are described in connection with FIG. 5 and these descriptions will not be repeated. In FIG. 9, the nanostructures 102*a*,102*b* may be directly coated with a top low-index coating 906. The top low-index coating 906 may be patterned to form a cap directly on the nanostructures 102*a*, 102*b*. The encapsulation media 504 may be formed on top of the top low-index coating 906 such that the top low-index coating 906 is positioned between the encapsulation media 504 and the nanostructures 102*a*,102*b* while the encapsulation media 504 directly contacts the sidewalls of the nanostructures 102*a*,102*b*.

In some embodiments, the top low-index coating 906 includes a first top low-index coating and a second top low-index coating and the bottom low-index coating 508 includes a first bottom low-index coating, a second bottom low-index coating, a third bottom low-index coating, and a fourth bottom low-index coating. Various configurations for thicknesses of each of the coatings may be found in FIGS. 10A-10F.

Figure 10A:
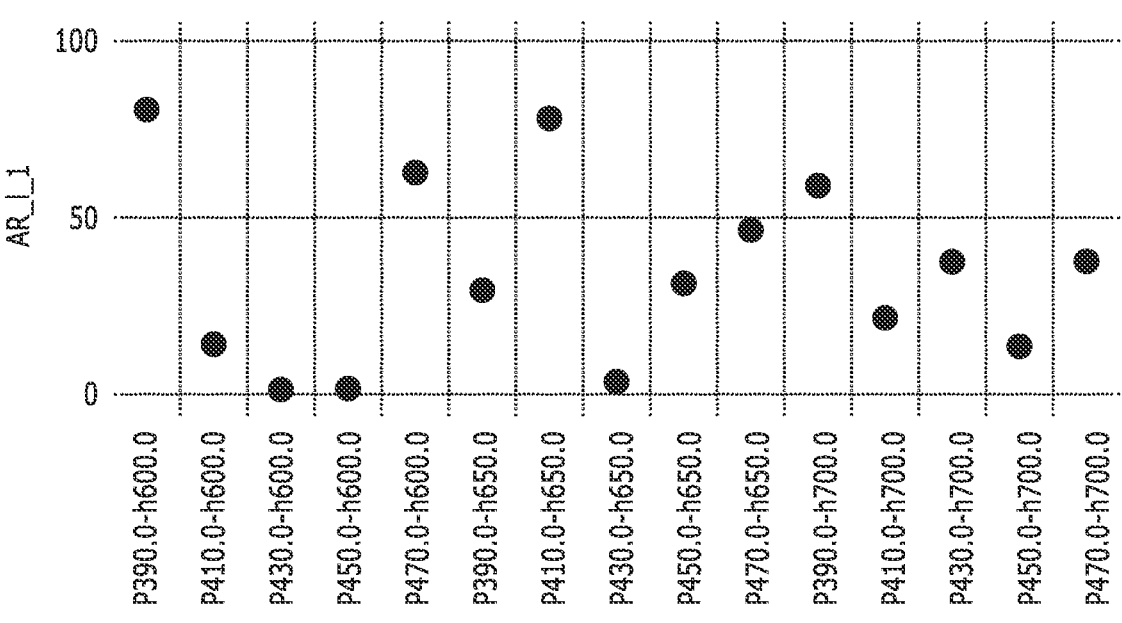
FIGS. 10A-10F illustrate various plots for the various layers of the top low-index coating and the bottom low-index coating in accordance with various embodiment of the invention.
Figure 10B:
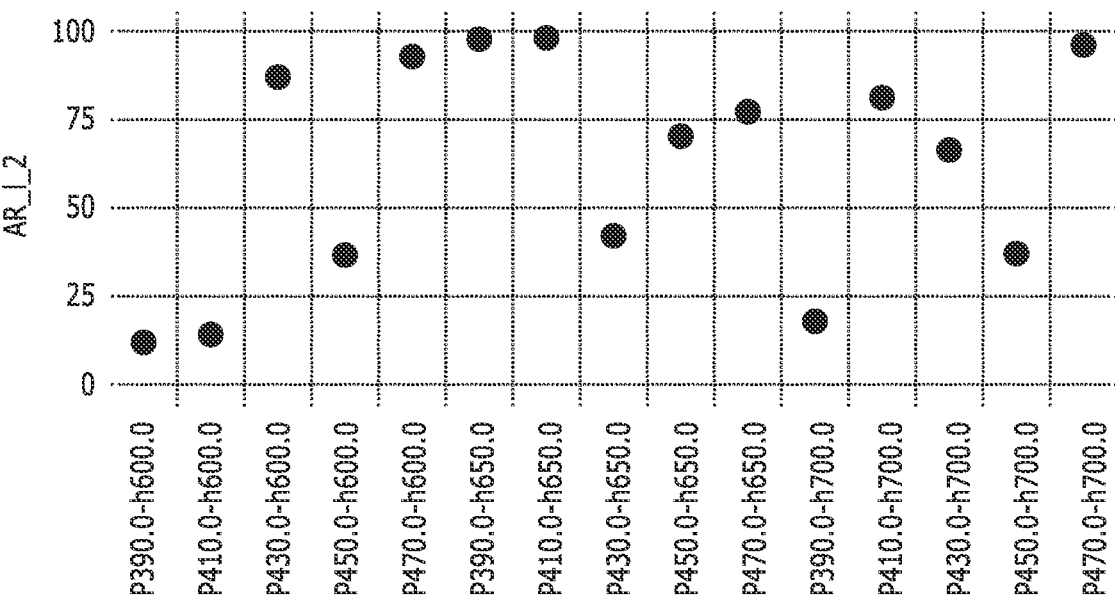
Figure 10C:
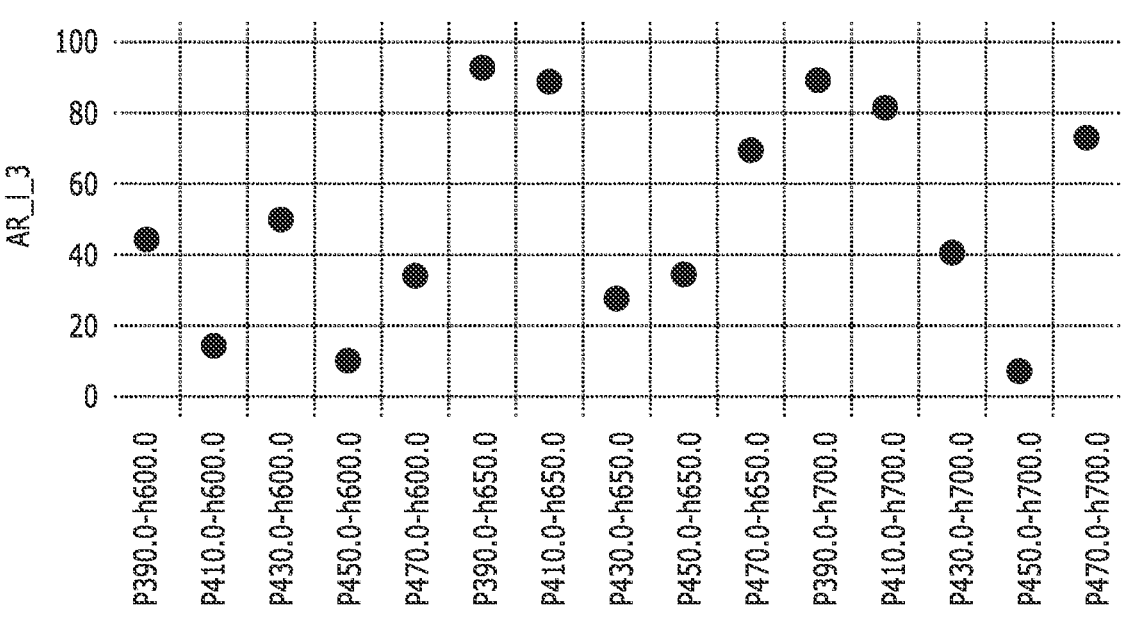
Figure 10D:
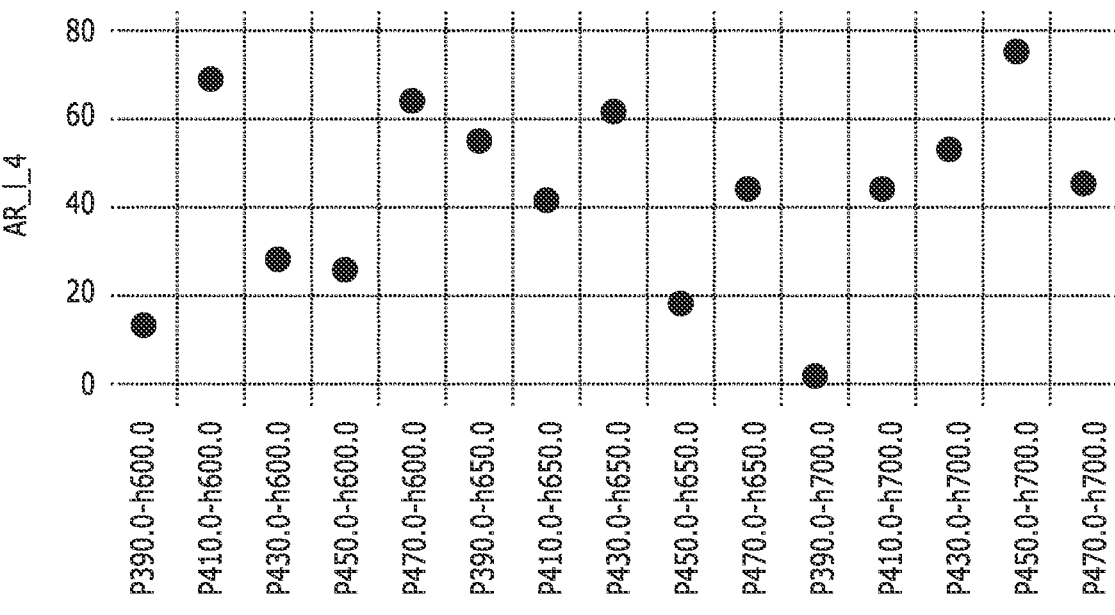

FIGS. 10A-10F illustrate various plots for the various layers of the top low-index coating 906 and the bottom low-index coating 508 in accordance with various embodiment of the invention. The bottom low-index coating 508 may include four low-index layers. FIG. 10A illustrate a plot of various thicknesses for various implementations of a first low-index layer of the bottom low-index coating 508. FIG. 10B illustrate a plot of various thicknesses for various implementations of a second low-index layer of the bottom low-index coating 508. FIG. 10C illustrate a plot of various thicknesses for various implementations of a third low-index layer of the bottom low-index coating 508. FIG. 10D illustrate a plot of various thicknesses for various implementations of a fourth low-index layer of the bottom low-index coating 508.

Figure 10E:
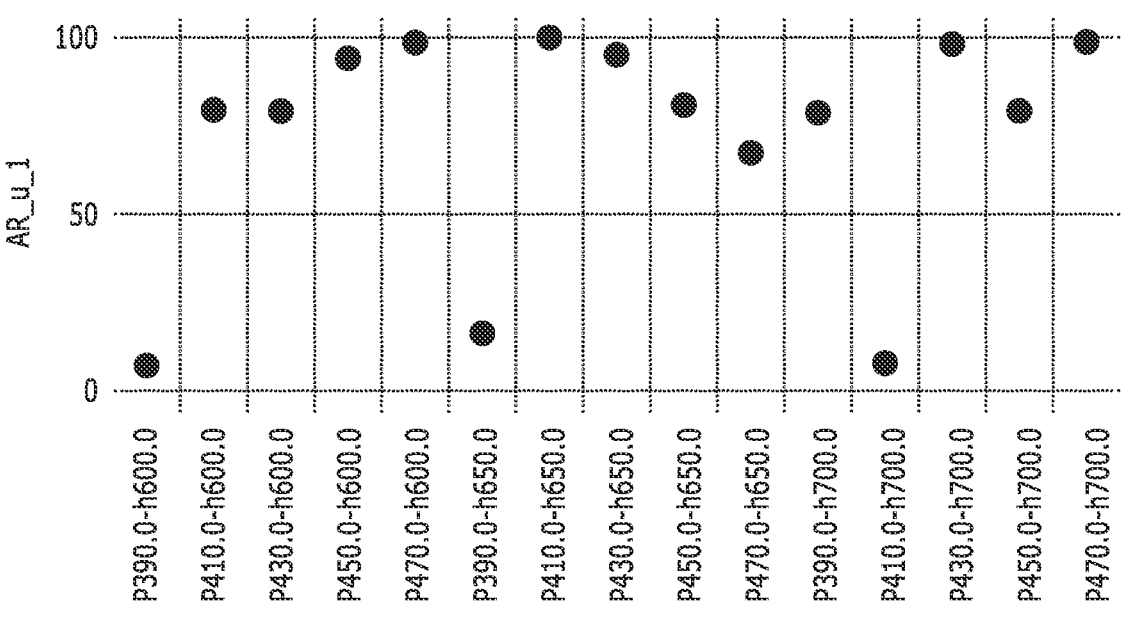
Figure 10F:
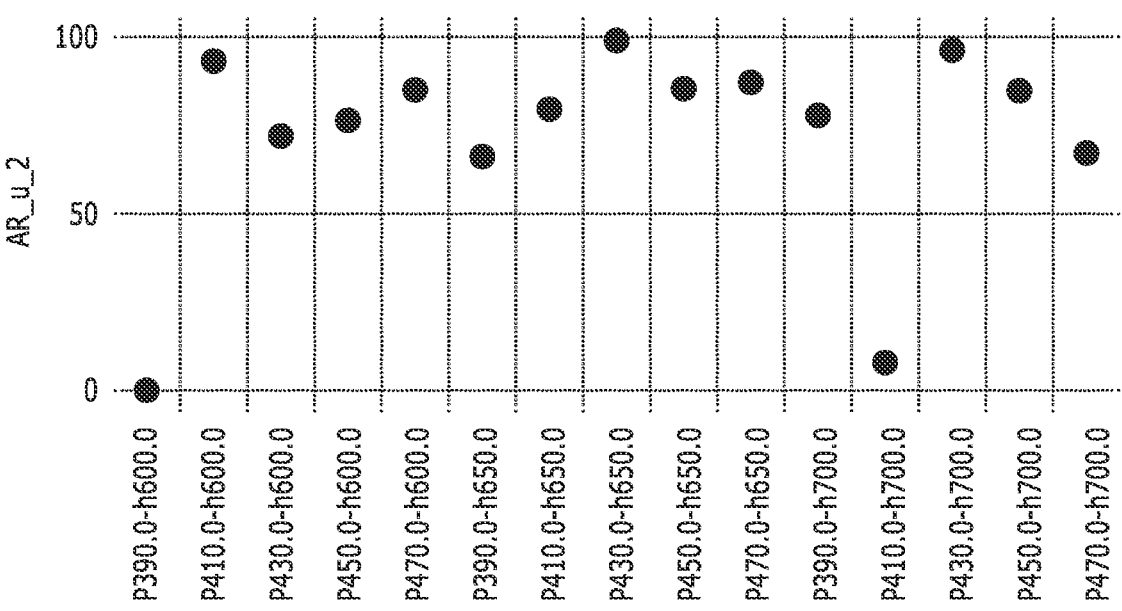

The top low-index coating 906 may include two low-index layers. FIG. 10E illustrate a plot of various thicknesses for various implementations of a first low-index layer of the top low-index coating 906. FIG. 10F illustrate a plot of various thicknesses for various implementations of a second low-index layer of the top low-index coating 906. For FIGS. 10A-10F, the vertical axis represents various thicknesses and the horizontal axis represents various designs. For the horizontal axis, P### indicates a certain pitch of the nanostructures 102*a*,102*b* whereas h### indicates a certain height of the nanostructures 102*a*,102*b*. For example, P390-h600.0 indicates a pitch of 390 nm and a height of 600 nm for the nanostructures 102*a*,102*b*.

Figure 11:
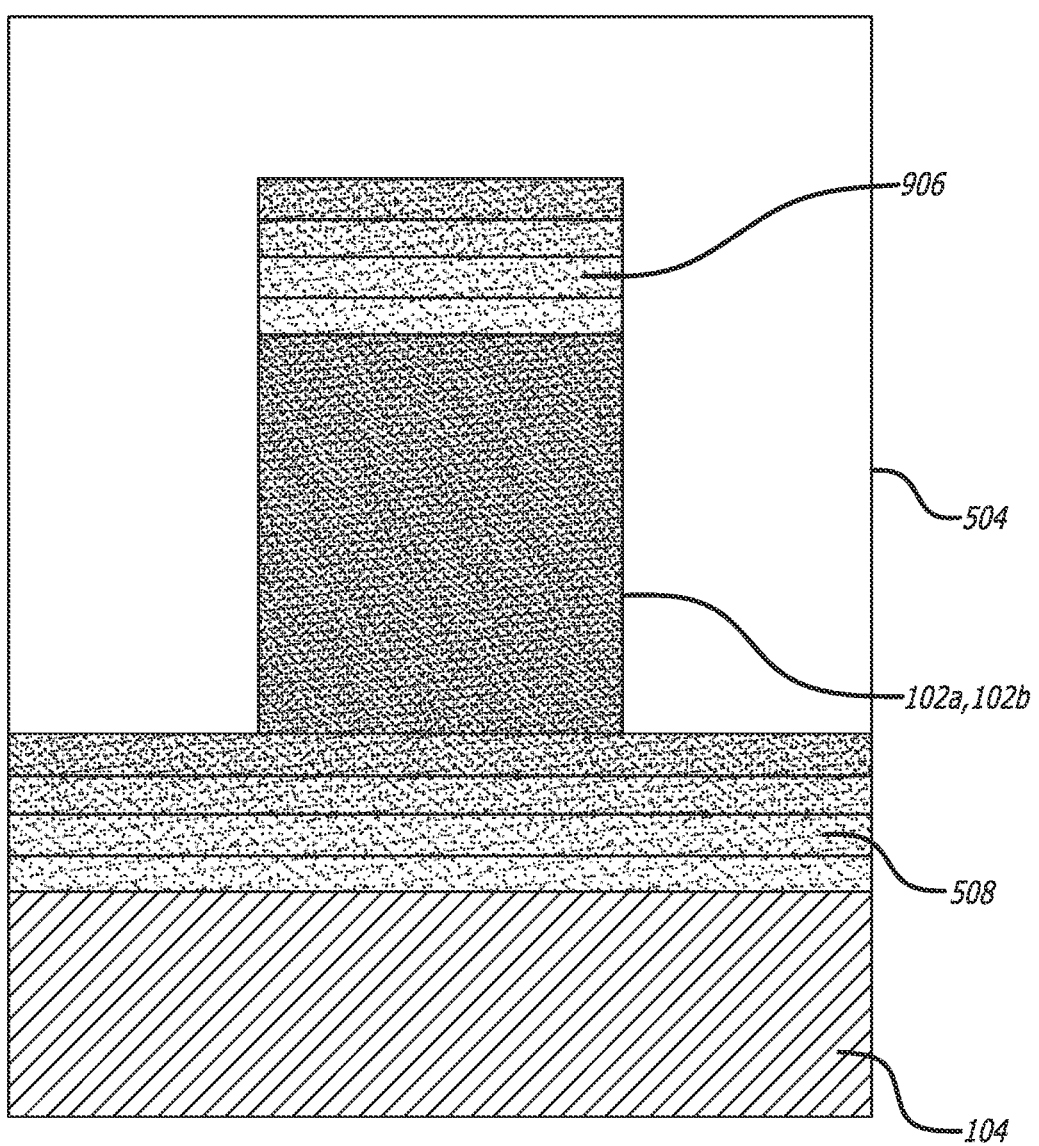
FIG. 11 illustrates a cross-sectional view of a nanostructure implemented with low-index coatings in accordance with an embodiment of the invention.

FIG. 11 illustrates a cross-sectional view of a nanostructure implemented with low-index coatings in accordance with an embodiment of the invention. The features of FIG. 11 are described in connection with FIG. 9 and these descriptions will not be repeated. In some embodiments, the top low-index coating 906 includes a first top low-index coating, a second top low-index coating, a third top low-index coating, and a fourth top low-index coating and the bottom low-index coating 508 includes a first bottom low-index coating, a second bottom low-index coating, a third bottom low-index coating, and a fourth bottom low-index coating. Various configurations for thicknesses of each of the coatings may be found in FIGS. 12A-12H.

Figure 12A:
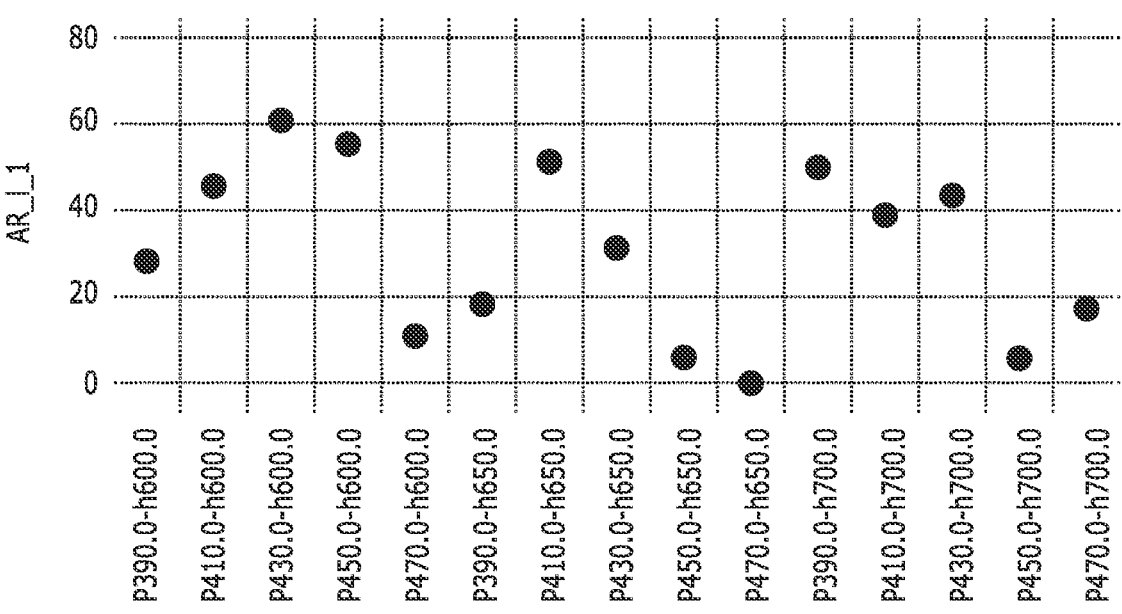
FIGS. 12A-12H illustrate various plots for the various layers of the top low-index coating 906 and the bottom low-index coating 508 in accordance with various embodiments of the invention.
Figure 12B:
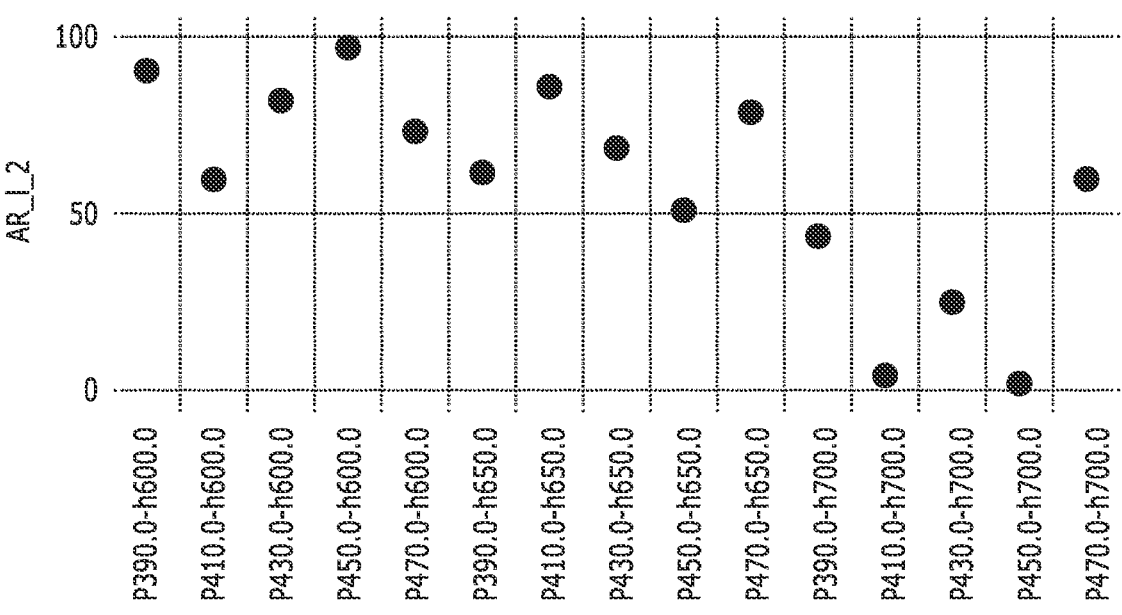
Figure 12C:
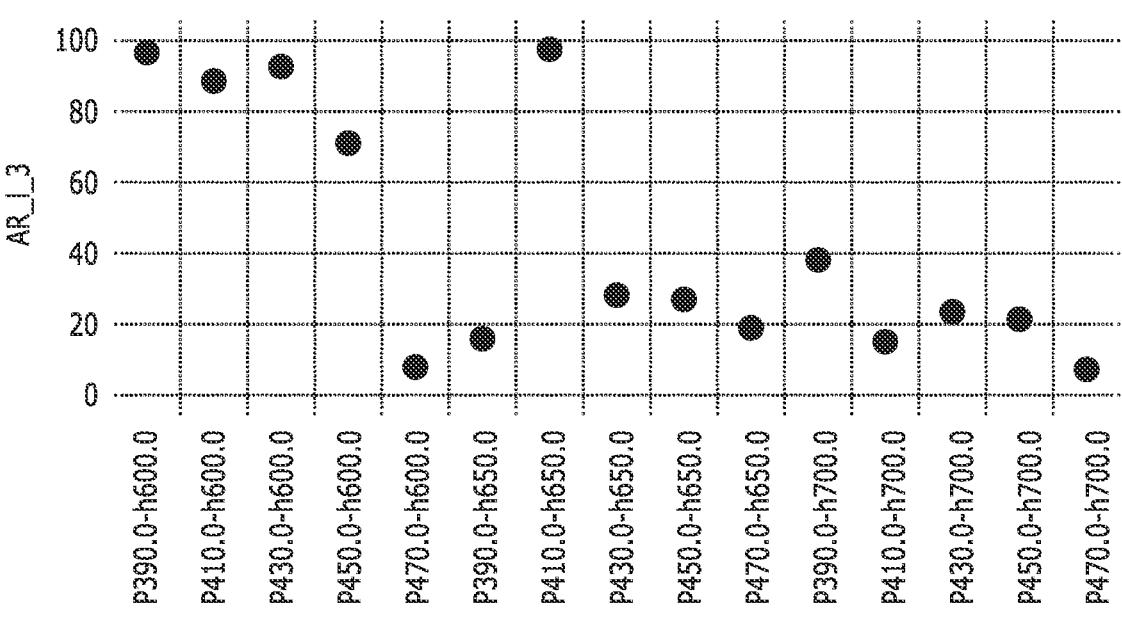
Figure 12D:
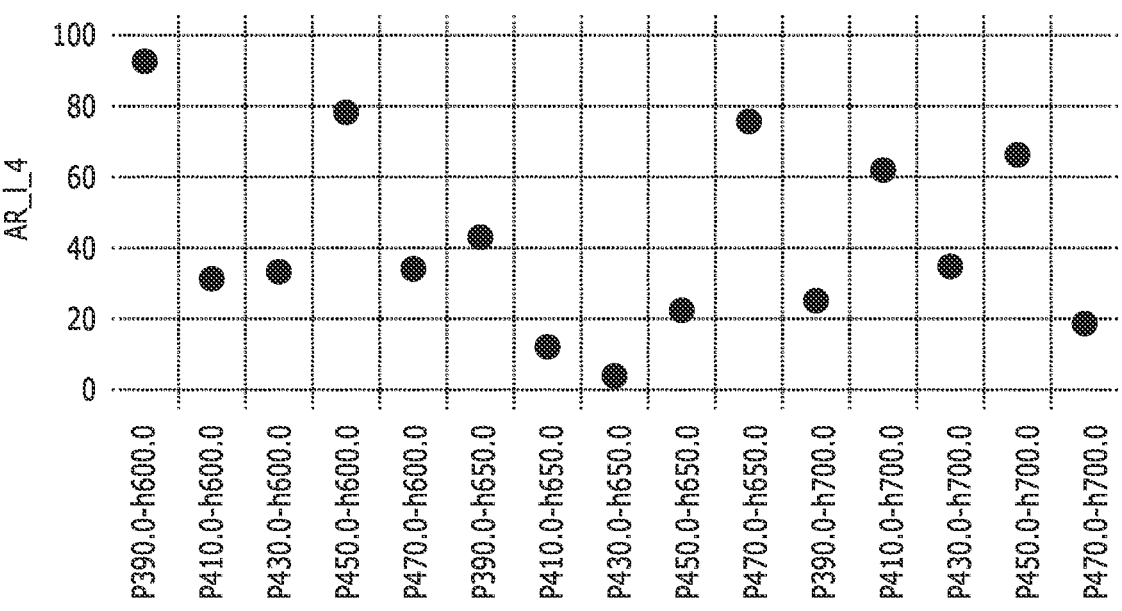

FIGS. 12A-12H illustrate various plots for the various layers of the top low-index coating 906 and the bottom low-index coating 508 in accordance with various embodiments of the invention. The bottom low-index coating 508 may include four low-index layers. FIG. 12A illustrate a plot of various thicknesses for various implementations of a first low-index layer of the bottom low-index coating 508. FIG. 12B illustrate a plot of various thicknesses for various implementations of a second low-index layer of the bottom low-index coating 508. FIG. 12C illustrate a plot of various thicknesses for various implementations of a third low-index layer of the bottom low-index coating 508. FIG. 12D illustrate a plot of various thicknesses for various implementations of a fourth low-index layer of the bottom low-index coating 508.

Figure 12E:
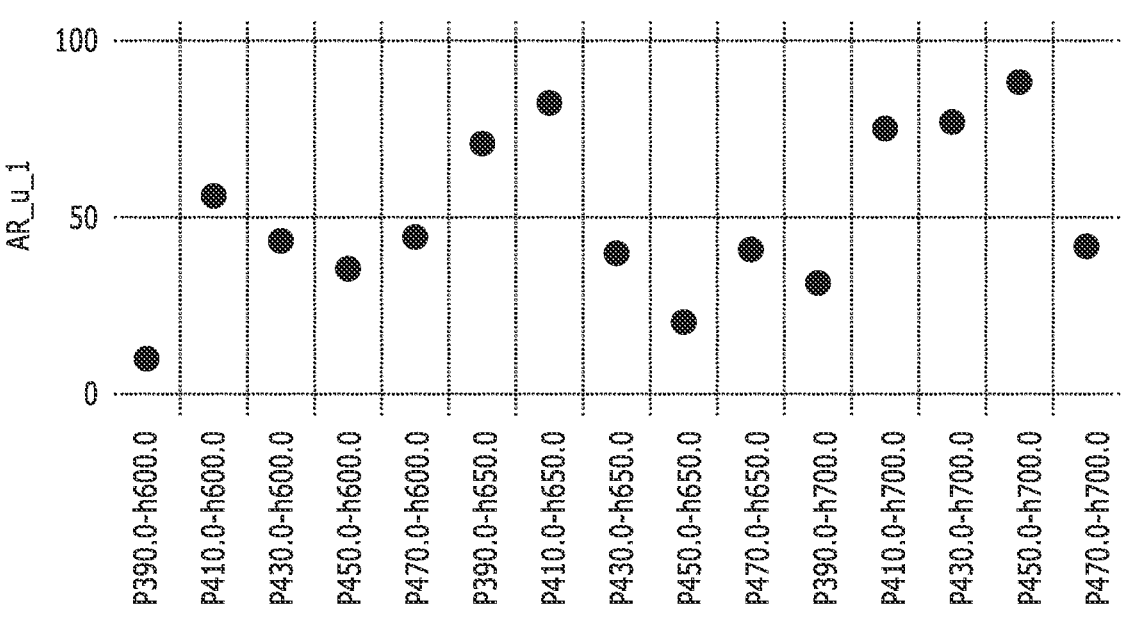
Figure 12F:
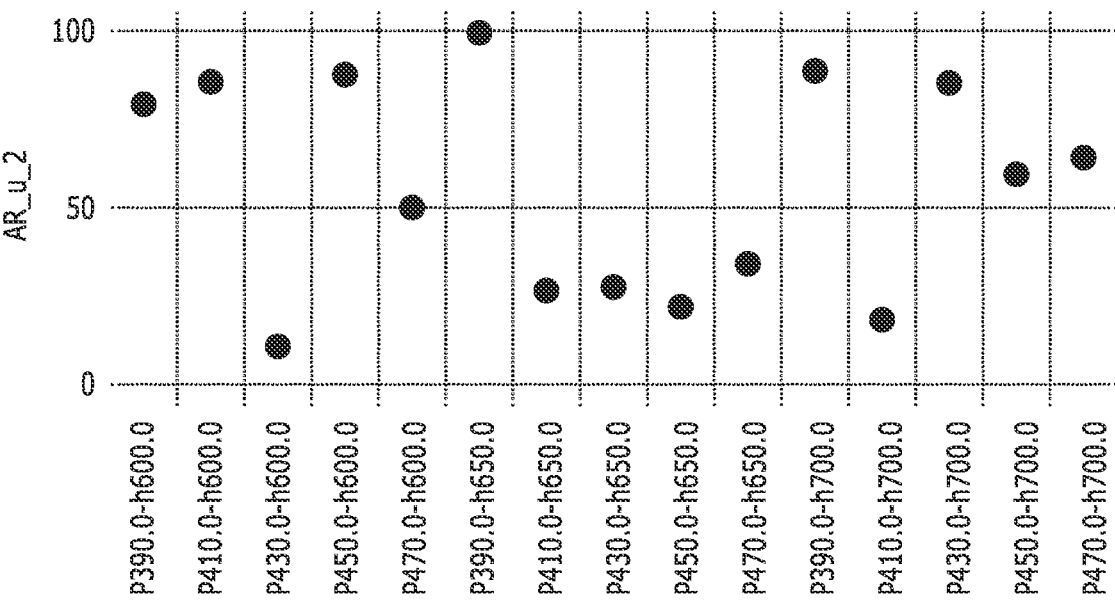
Figure 12G:
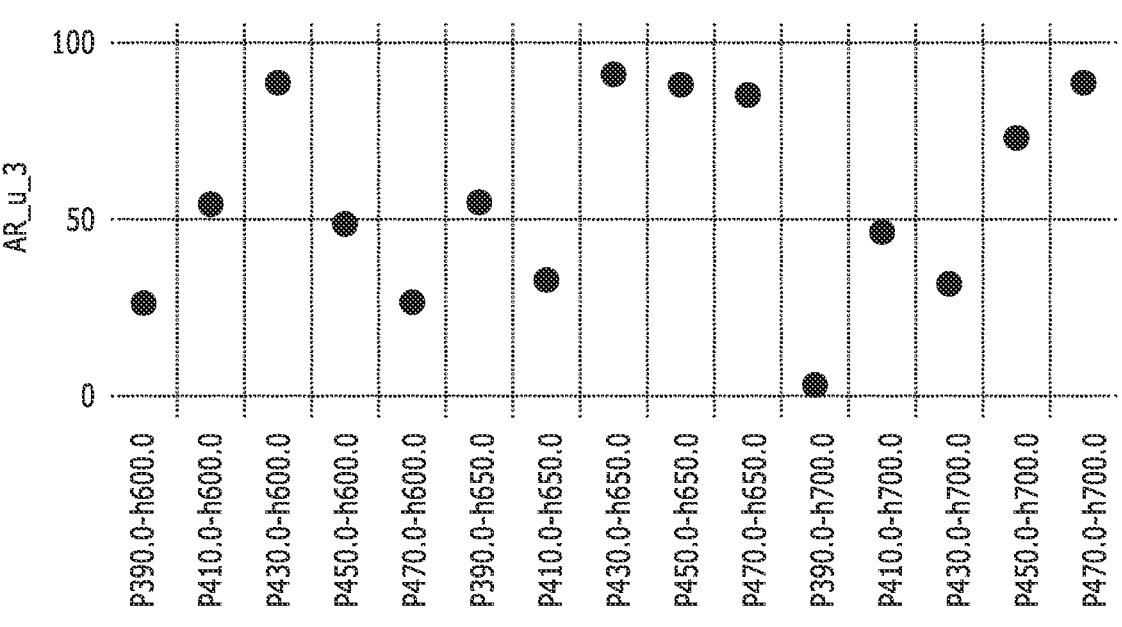
Figure 12H:
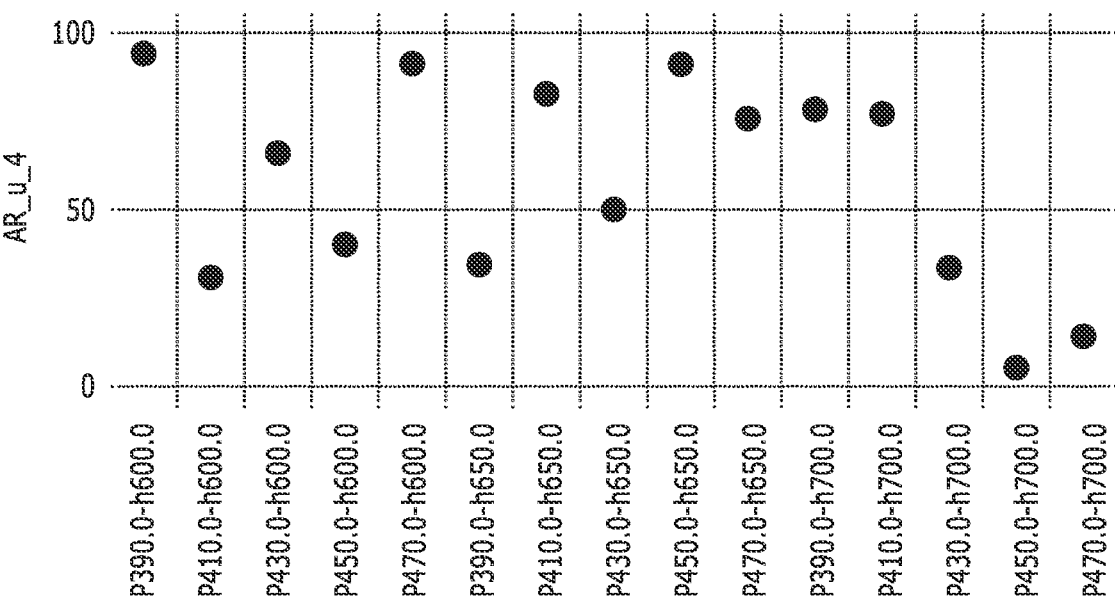

The top low-index coating 906 may include four low-index layers. FIG. 12E illustrate a plot of various thicknesses for various implementations of a first low-index layer of the top low-index coating 906. FIG. 12F illustrate a plot of various thicknesses for various implementations of a second low-index layer of the top low-index coating 906. FIG. 12G illustrate a plot of various thicknesses for various implementations of a third low-index layer of the top low-index coating 906. FIG. 12H illustrate a plot of various thicknesses for various implementations of a fourth low-index layer of the top low-index coating 906. For FIGS. 10A-10H, The vertical axis represents various thicknesses and the horizontal axis represents various designs. For the horizontal axis, P### indicates a certain pitch of the nanostructures 102a, 102b whereas h### indicates a certain height of the nanostructures 102a,102b. For example, P390-h600.0 indicates a pitch of 390 nm and a height of 600 nm for the nanostructures 102a,102b.

While the embodiments discussed above include a two or four low-index layers for the top low-index coating 506,906 and the bottom low-index coating 508, the top low-index coating 506,906 and the bottom low-index coating 508 may include more or less low-index layers. For example, the top low-index coating 506,906 and the bottom low-index coating 508 may include one layer, two layers, three layers, four layers, five layers, etc. Further, the configurations described in connection with FIGS. 5-12 may be used with any of the configurations described in connection with FIGS. 1-4. The encapsulation media 504 may be deposited through a non-selective process. In cases where the encapsulation media 504 encapsulates the nanostructures 102a,102b, the encapsulation media 504 may encapsulate the full nanostructures 102a,102b including the low index caps 906 as illustrated in FIG. 9 or FIG. 11.

Discussion of Various Example Improvements

Total Transmission Improvements

One of the critical criteria in the design and implementation of transmissive optical lenses is related to their capability in order to successfully transmit the power of illuminated light from the source to the target plane. In the meta-surface based lenses, it may be beneficial for all the individually selected meta-surface building blocks to fully transmit the incident beam with negligibly small reflection. It should be emphasized that in order to accomplish the phase agility from 0 to $2\pi$, meta-lenses may include an array of subwavelength unit-cells with various structural parameters (e.g., diameter, width, length, etc). In general, simultaneous high transmission and full phase-shift may not be easily achieved by a simple unit-cell (e.g. nanopillars without multilayer low-index coatings) since the full phase coverage can be mainly accomplished by experiencing local geometrical resonances. This may cause non-uniformity and fluctuation in the spatial distribution of the amplitude of transmitted light.

As discussed, the nanopillars without multilayer coatings may be unable to achieve ideal impedance matching for all the necessary physical dimensions. Advantageously, the integration of low-index pillar caps/coatings may alleviate this issue and achieve $2\pi$ phase shift easier with less reliance on geometrical resonances.

Figure 13A:
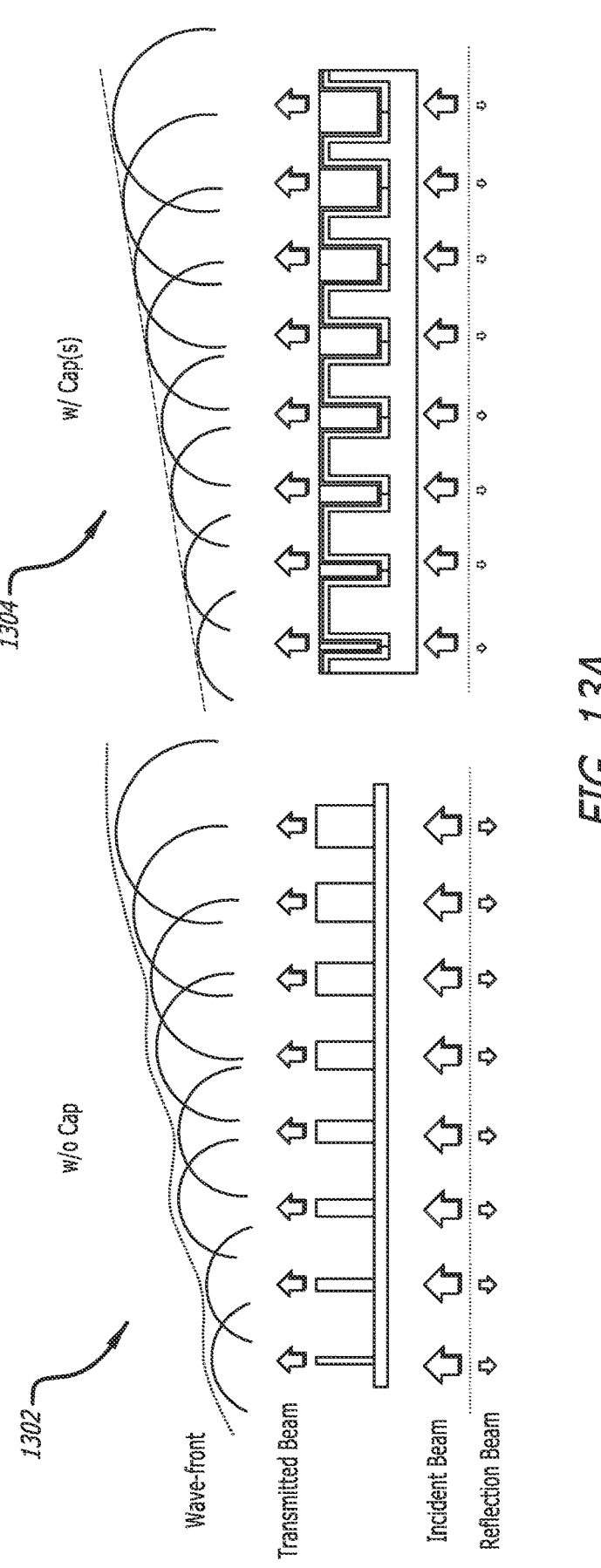
FIG. 13A is a schematic of total transmission improvement by incorporating multilayer low-index coatings into high-index meta-array in accordance with an embodiment of the invention.
Figure 13B:
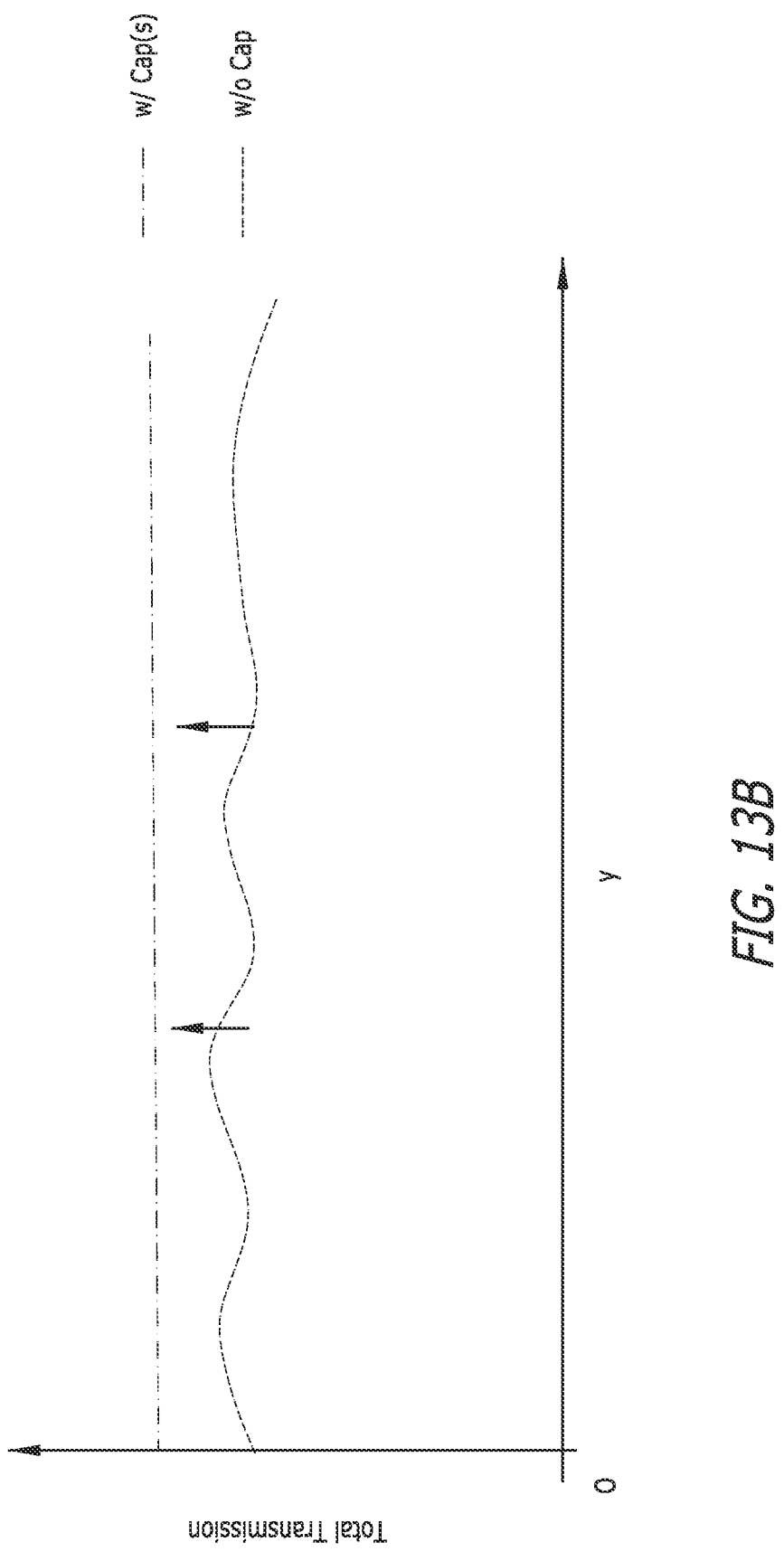
FIG. 13B illustrates plots comparing the transmission of a metasurface device with and without the low-index coating (e.g. low-index cap) as described in connection with FIG. 13A.

FIG. 13A is a schematic of total transmission improvement by incorporating multilayer low-index coatings into high-index meta-array in accordance with an embodiment of the invention. As illustrated, bare nanopillars 1302 may include non-ideal optical characteristics which include both non-uniform wavefront and lower transmittance to the meta-array when compared to nanopillars incorporated multilayer low-index coatings 1304. The optimized meta-array 1304 includes self-aligned pillar coatings which may enhance the total transmission and improve the uniformity of the transmitted wave-front. The bare nanopillars 1302 exhibit both non-uniform wavefront and lower transmittance (e.g. the ratio of transmitted power in all diffraction harmonics to the power of incident beam). The meta-array with incorporated multilayer low-index coatings 1304 may exhibit low dissipative loss in the optical system and negligibly small extinction coefficients for the constituent materials which may advantageously decrease reflection. FIG. 13B illustrates plots comparing the transmission of a metasurface device with and without the low-index coating (e.g. low-index cap) as described in connection with FIG. 13A. As illustrated, the low-index coating creates greater uniformity of total transmission for various positions.

Let $S^{ij}$ be the S-parameters of the unit-cell, located at the coordinate of (i, j), depending on the selected physical dimensions (here, diameters of nanopillars).

$$|S_{11}^{ij}|$$

refers to the power reflected from the unitcell as the specular reflection and back-scattering and $$|S_{21}^{ij}|$$

represents the ratio of the transmitted power to the incident power. f(x,y) is the complex value of fields (e.g., amplitude and phase) at the interface of meta-surface (z=0). Therefore, the total incident power at the place of each unitcell, $F_{ij}$, is equal to $\iint_{unitcell-area} f(x, y)dxdy$. The total transmission efficiency can be evaluated through, $$\text{total transmission efficiency} = \frac{\Sigma_{ij}F_{ij}|S_{21}^{ij}|^2}{\Sigma_{ij}F_{ij}}. \quad (2)$$

Under the local periodicity assumption, the S-parameters may be utilized which may be calculated through the periodic unit-cell study as function of variable physical dimensions (e.g., diameters). The suggested design schemes provide a robust framework to achieve optimal value for Eq. 2. By using an optimization technique linked with an electromagnetic solver based on Maxwell equations (e.g. rigorous coupled-wave analysis; RCWA), the proper physical dimensions such as periodicity, height of high-index inclusions, and the thicknesses/refractive indices of pillar coating layers can be determined in such a way that the full phase pickup with ultimately high transmission level can be realized for all the studied unit-cells. As a consequence, $$|S_{21}^{ij}|$$

may be increased and the general optical performance of the generated meta-surface may be beyond the commonly used nano-pillars without multilayer coatings/caps.

On-demand Beam Deflection Efficiency Enhancement: Highly Directive Meta-Array with High Gain In general, the beam deflection with optical meta-surfaces in the transmission mode may be faced with several challenges, namely Deviation from the pre-designed deflection angle, Low deflection efficiency (also-called gain for a finite meta-array) especially for high bending angles, Large half-power beam-width or full-width at half-maximum of the main far-field pattern lobe, Limited directivity.

These can arise due to several possible imperfections such as coupling between neighboring pixels, imperfect realization of the required phase distribution and inaccessibility to full phase pick up (2π), abrupt phase shift in neighbor elements, and non-uniformity of transmission amplitude during phase modulation. The last one can be considered as the most vital factor in order to obtain the beam deflection with optimal optical efficiency. This along with the sub-wavelength unit cell (<λ/2), a reasonable height of high-index inclusion (<λ), and accessibility to the phase-shift of 0 to 2π may be impediments towards a highly directive meta-array with high gain. Embodiments of the self-aligned pillar coating discussed throughout can ameliorate the previously mentioned artifacts by offering higher and uniform transmission amplitude during phase modulation and providing full phase pickup (2π).

The optical efficiency may be commonly defined through gain and directivity for a finite meta-array. Directivity is the ratio of radiation intensity in a specific direction to the radiation intensity averaged over all directions. The directivity can be calculated as follows:

$$D(\theta, \phi) = \frac{U(\theta, \phi)}{\frac{1}{4\pi}\int_{\phi=0}^{\phi=2\pi}\int_{\theta=0}^{\theta=\pi} U(\theta, \phi)\sin(\theta)d\theta d\phi}, \quad (3)$$

where U(θ, φ) is the radiation intensity at [θ,φ]. Moreover, the gain refers to the directivity multiplied by meta-array efficiency (e.g. the ratio of the radiated power to the incident power). As discussed above, The incorporation of multilayer low-index coatings can increase the meta-array efficiency thus the gain can be increased in the optical system in case of the increase in directivity. The reduction in gain and directivity may occur due to non-uniform magnitudes of electromagnetic fields on the meta-surface aperture.

Figure 14A:
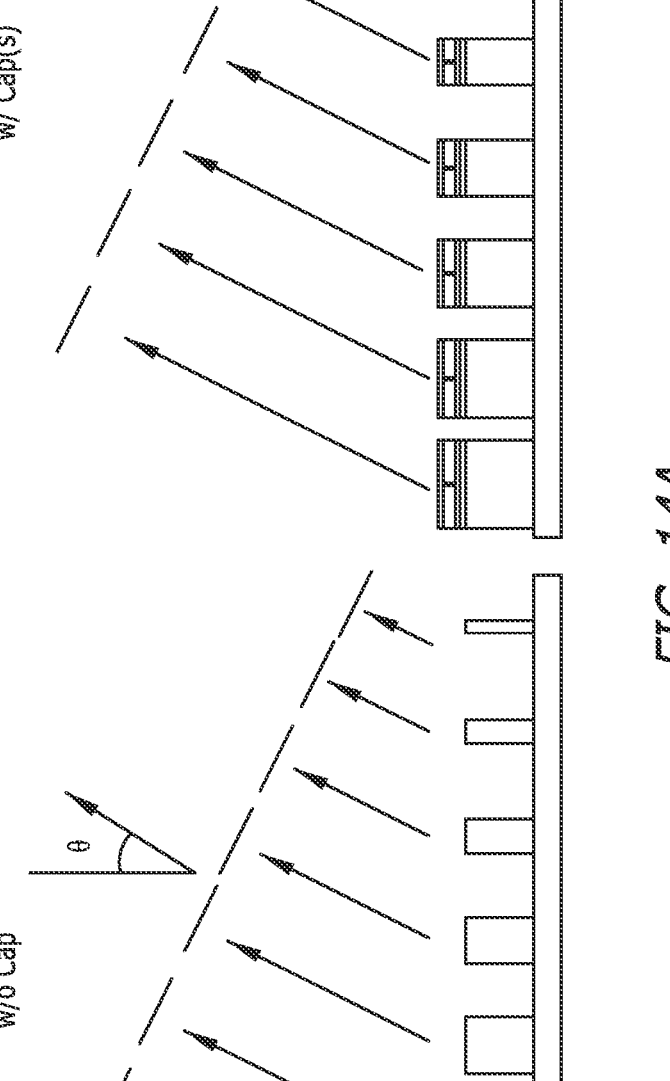
FIG. 14A is a schematic overview of a supercell including an array of high-index nanopillars in the presence and absence of the multilayer low-index caps in accordance with an embodiment of the invention.
Figure 14B:
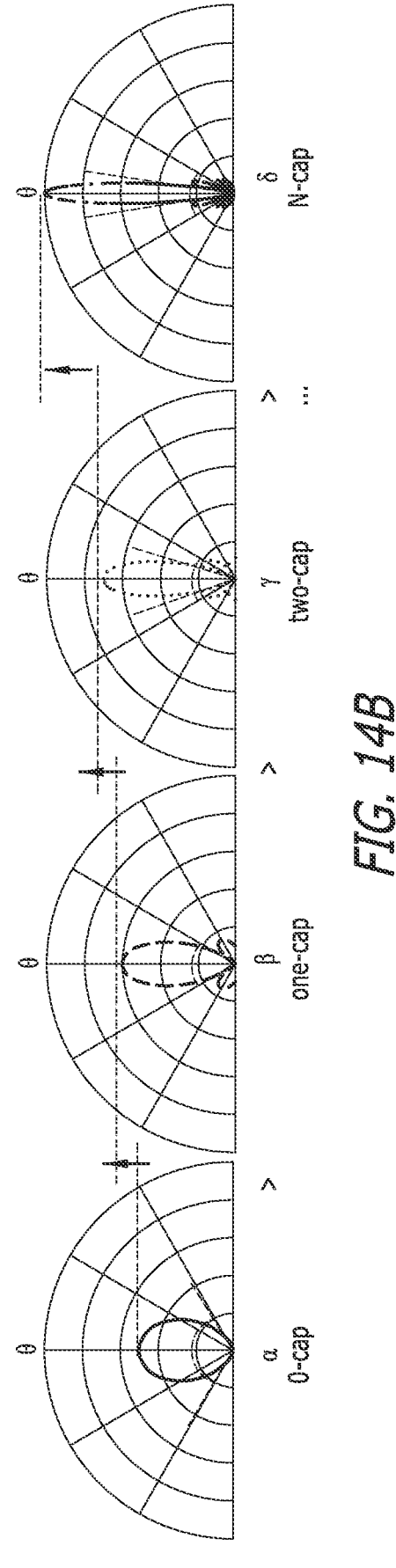
FIG. 14B is a demonstration of the trend for the far-field radiation patterns of an optimized finite large-scale bending meta-lens in the absence and presence of one, two, . . . , and N caps in accordance with an embodiment of the invention.

A generic example of the graded-pattern meta-surface used to deflect the incident beam toward the bending angle of 6 is shown in FIGS. 14A and 14B in the presence and absence of multi-layer low-index caps/coatings in accordance with an embodiment of the invention. FIG. 14A is a schematic overview of a supercell including an array of high-index nanopillars in the presence and absence of the multilayer low-index caps in accordance with an embodiment of the invention. FIG. 14B is a demonstration of the trend for the far-field radiation patterns of an optimized finite large-scale bending meta-lens in the absence and presence of one, two, . . . , and N caps in accordance with an embodiment of the invention. α, β, γ, and δ influence the beam-widths of the transmitted signal. The directivity, gain, half power beam width (HPBW), and/or full width half maximum (FWHM) may be improved step-by-step by adding additional the cap layers.

FIG. 14A illustrates a low-index coating configuration similar to the low-index coating 106a,106b described in connection with FIGS. 1A-1C, the beneficial results may be obtained by other low-index coatings described herein as well (e.g. the low-index coating 108a,108b of FIGS. 1D-1F or the low-index coating 110a,110b of FIGS. 1G-1I). By optimizing the physical parameters of the low-index coating 106a,106b, the optical efficiency of the desired diffraction order (the transmitted first-order diffraction, T_{+1}), correlated to the target bending angle, may be increased. The optimized multi-layer low-index coatings may produce the largest possible value for the deflection efficiency at the single pre-defined bending angle (for instance, <30°).

As schematically illustrated in FIG. 14B, there is a trade-off between the gain/directivity and the beam-width. Increased number of caps may increase the gain and directivity and the beam-width of the far-field radiation pattern main lobe which becomes narrower (α>β>γ>δ). As a result, the gain, directivity, and HPBW may be increased step-by-step by adding cap layers.

In comparison with the low-index coating 108a,108b of FIGS. 1D-1F or the low-index coating 110a,110b of FIGS. 1G-1I, the low-index coating 106a,106b described in connection with FIGS. 1A-1C may not be limited to its benefits for the optical efficiency improvement. The low-index coating 106a,106b described in connection with FIGS. 1A-1C can also offer the following benefits:

If one of the incorporated low-index caps has a dissipative loss, the low-index coating 106a,106b described in connection with FIGS. 1A-1C can still enable all the aforementioned efficiency improvements. The light interaction with the lossy low-index layer 106a,106b may be limited in contrast to the low-index coating 108a,108b of FIGS. 1D-1F or the low-index coating 110a,110b of FIGS. 1G-1I.

The low-index coating 106a,106b described in connection with FIGS. 1A-1C can be utilized to improve the optical efficiency of an already fabricated meta-surface with bare high-index nano-pillars. This is also possible in the low-index coating 108a,108b of FIGS. 1D-1F. In other words, if a meta-surface has already been fabricated, it may not be necessary to repeat all the fabrication steps again. A single step of deposition of continuous or discrete multi-layer coatings as illustrated in FIGS. 1A-1C and FIGS. 1D-1F may be utilized in order to improve the impedance matching and increase the optical efficiency.

Figure 15:
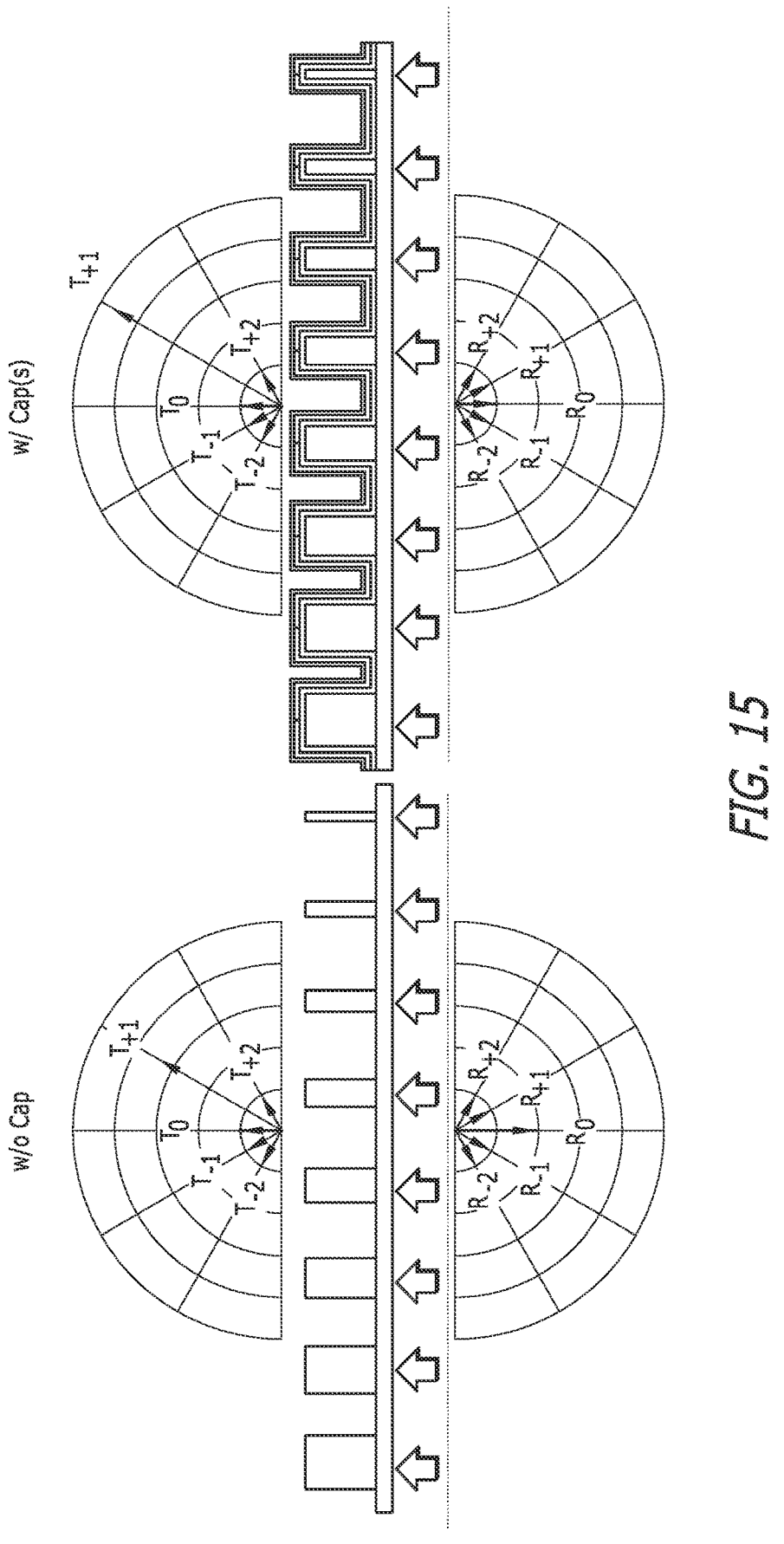
FIG. 15 illustrates two periodic meta-gratings including an array of nanopillars with and without multilayer low-index coatings in accordance with an embodiment of the invention.

Full Control Over Radiation Pattern Side-Lobes: Decrease of Undesired Diffraction Orders In optical applications involving the light manipulation toward a specific direction, the optical device may benefit from avoidance of the excitation of undesired radiation pattern side-lobes in order to attain optimal functionality. The far-field radiation pattern side-lobes of a finite large-scale meta-lens may be proportional to the excitation of undesired diffraction orders when the meta-lens is studied in the infinitely large periodic fashion. Therefore, the reduction of side-lobes in the finite large-scale meta-lens may be obtained by diminishing the undesired diffraction excitations in periodic meta-gratings. FIG. 15 is a schematic illustration of deduction of the undesired diffraction orders by incorporating multilayer low-index coatings into a high-index meta-array in accordance with an embodiment of the invention. FIG. 15 illustrates two periodic meta-gratings including an array of nanopillars with and without multi-layer low-index coatings in accordance with an embodiment of the invention. Among the undesired diffraction orders, the reflected zero-order (also called specular reflection or mir-ror-like reflection), the transmitted zero-order ($T_0$), and transmitted second-order ($T_{\pm2}$) may be of particular impor-tance since these diffraction orders potentially cause unde-sired artifacts in imaging and sensing applications through the degradation of image quality or inaccuracy in the light detection for the integrated sensors.

The incorporation of multi-layer low-index coatings on an array of high-index nanopillars can increase the diffracted power toward the desired angle (e.g. $T_{+1}$), as discussed above. Based on the conservation of energy in an optical system and upon the absence of dissipative loss (or negli-gibly small loss), this can be translated to a general degra-dation of the power which may be transferred to other transmitted/reflected diffraction orders. In addition, we have mentioned above that the total transmission (e.g. the ratio of transmitted power in all diffraction harmonics to the power of the incident beam) may be increased in presence of multilayer low-index coatings. Therefore, this also confirms the overall suppression of the reflected diffraction orders. To sum up, the incorporation of multi-layer low index coatings may help to address and alleviate the concerns regarding the reflected diffraction orders in particular the specular reflec-tion ($R_0$) as schematically shown in FIG. 15. The trend of the transmitted/reflected diffraction orders is elaborated through the arrows, in which the length of arrows indicates the strength of the corresponding diffraction order. The desired $T_{+1}$ is increased and the undesired diffraction orders (e.g., $R_0$, $T_0$, and $T_{+2}$) are decreased or kept small. Furthermore, it can decrease the transmitted higher-order diffractions ($T_{\pm2}$, $T_{\pm3}$, . . . ). Regarding the transmitted zero-order diffraction, its level usually benefits from the periodicity of the unit-cell and realization of the phase distribution at the metagrating interface. Since structures including the multi-layer low-index coatings may retain the periodicity and the phase distribution, the transmitted zero-order diffraction level can still be kept relatively small.

Robust Applicability for Sophisticated Beam-Forming/ Shaping: Diffraction Efficiency Improvement Over Wide Angle-of-View In previous sections, we focused on the optical platforms with beam deflection toward a single bending angle and how multilayer low-index coatings may improve the optical efficiency under various mechanisms including topology optimization. While the capability to improve beam steering toward a specific angle may be beneficial in different optical applications, consistent enhancement of the diffraction effi-ciency for a broad field-of-view may also be of importance. Functionality improvement for more sophisticated lenses, including the holograms and focusing/convergence lenses may benefit from a broad field-of-view. For example, a focusing lens with a parabolic phase distribution consists of different arrangements of the unit-cells. A first-principles simulation may include solving the electromagnetic fields of an extremely large finite meta-surface which may be com-putationally expensive and may be repeated case-by-case (e.g. focusing lenses with different focal lengths).

Figure 16:
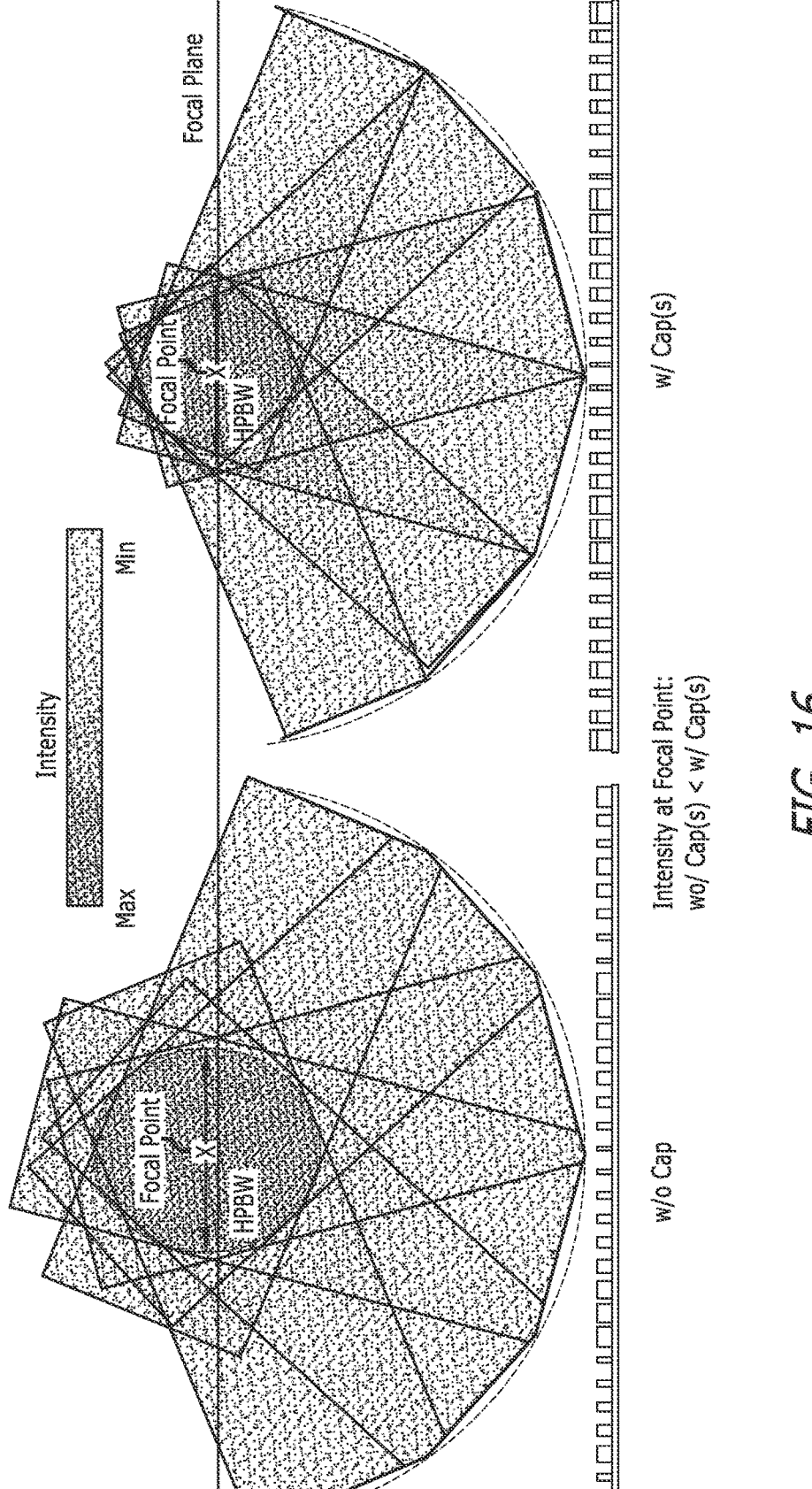
FIG. 16 schematically illustrates a focusing lens with a parabolic phase distribution, which may include nanopillar meta-arrays with and without low-index material coatings in accordance with an embodiment of the invention.

FIG. 16 schematically illustrates a focusing lens with a parabolic phase distribution, which may include nanopillar meta-arrays with and without low-index material coatings in accordance with an embodiment of the invention. The multilayer low-index coatings may increase the optical efficiency for the focusing functionality. The trend of focus-ing characteristics is elaborated in which the intensity of the focal point, HPBW, and the spatial position of formed focal point are improved. It may be possible to divide the para-bolic phase distribution to several linear phase profiles, which can be fulfilled by supercells similar to the ones discussed in previous sections. The focusing lenses face may have several issues including poor focusing efficiency, large half-power beam-width (HPBW) of the focal spot, deviation from the pre-designed focal length, and large depth of focus (DOF). In a meta-array equipped with multilayer low-index coatings, each supercell can manipulate the light more efficiently thus the focal efficiency may be increased. As a consequence, relatively smaller HPBW and DOF may be achieved when compared to the case in the absence of the multilayer low-index coatings. Designs with the low-index coating may be superior when compared to those without multilayer low-index coatings. By optimization of physical parameters of the design scheme, the overall structure may be optimized. In some embodiments, designs implementing multilayer low-index coatings may be incorporated in holo-grams with maximum deflection angle of $\theta<30°$ and focus-ing lenses with f-number as low as approximately 0.9.

Further, the proposed design schemes may include a specific type of high-index materials (e.g. active materials). In some embodiments the high-index materials may be germanium-antimony-telluride (GST, or GeSbTe) and liquid crystals (e.g., E7). These materials may play a central role in active beam-forming/shaping, which may be the fundamen-tal principle behind light detection and ranging devices (LiDAR) used in various applications including autonomous drones/vehicles and wireless/satellite communication nano-/ micro-antennas. Therefore, incorporating the multilayer low-index coatings into such optical meta-devices may help to achieve highly-efficient tunable beam-forming/shaping. In particular, the possibility to improve gain, directivity, HPBW, and side-lobe levels may be beneficial for free-space optical communications. In addition, it can help to improve the accuracy of LiDAR devices in capturing the information from the surrounding areas.

Further Sample Embodiments

Figures 17A, 17B, 17C:
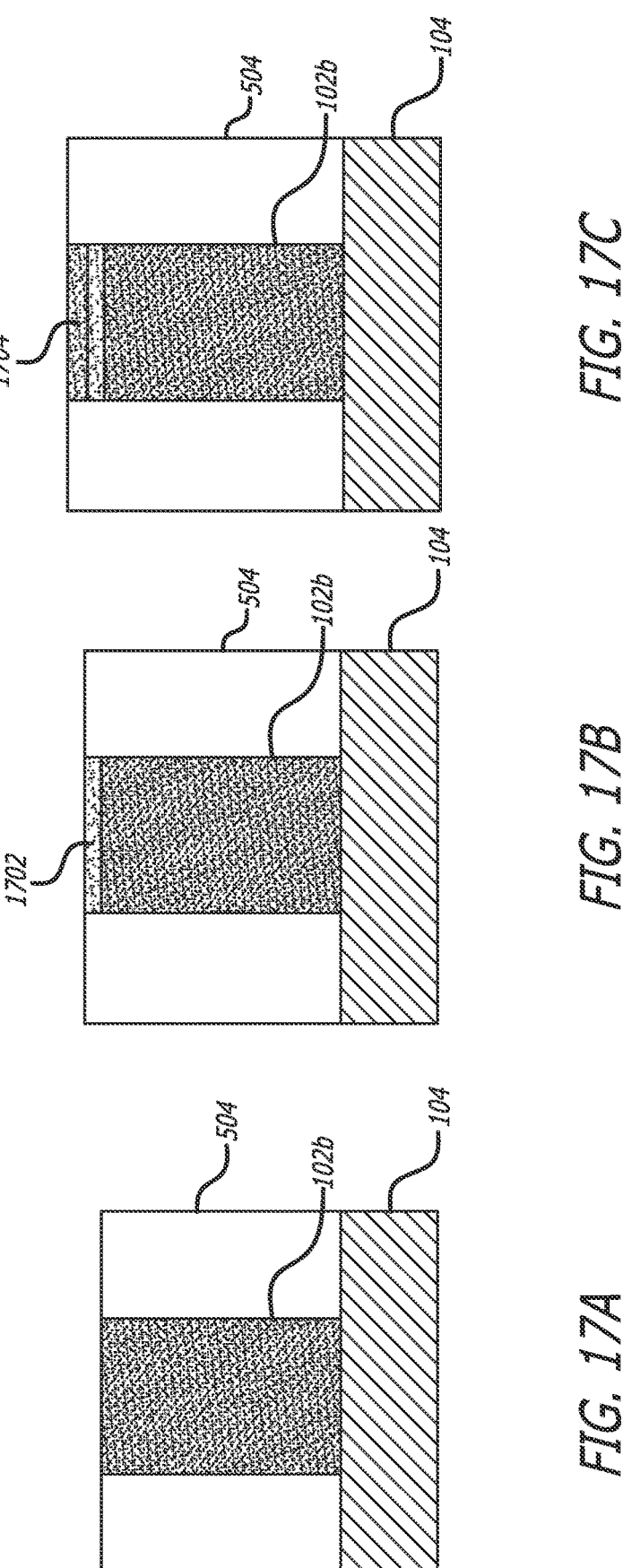
FIGS. 17A-17C illustrate exemplary meta-surface devices in accordance with embodiments of the invention.

Exemplary embodiments are provided to illustrate spe-cific contemplated designs but are in no way limiting. FIGS. 17A-17C illustrate exemplary meta-surface devices in accordance with embodiments of the invention each includ-ing a high-index material which includes an array of sub-wavelength Si nanobars ($n_{si}=3.789$) with width, height, and periodicity of w, h, and P, surrounded by a low-index material with refractive index of $n_{Encapsulation}=1.47$ and placed on a low-index substrate with refractive index of $n_{substrate}=1.451$. In FIGS. 17A-17C, subwavelength Si nano-pillar ($n_{si}=3.789$) with height, periodicity, and width of h, P, and w, are embedded into a low-index material with refrac-tive index of $n_{Encapsulation}=1.47$ and placed on a low-index substrate with refractive index of $n_{substrate}=1.451$, in the (left) absence of multi-layer pillar coatings, (middle and right) presence of one and two-layer(s) caps. The illustrated designs of FIGS. 17A-17C are those of FIGS. 1A-1C which incorporate the self-aligned pillar coatings. FIG. 17A illus-trates a high-index nanopillar without the low-index coating. The nanopillar 102*b* is encased in an encapsulation media 504. FIG. 17B illustrates the nanopillar 102*b* with a single layer low index coating 1702. FIG. 17C illustrates the nanopillar 102*b* with a two layer low index coating 1704.

Several quantitative criteria may be used to compare the optical performance of Si nanogratings in the presence (FIGS. 17B and 17C) and absence (FIG. 17A) of multilayer self-aligned low-index coatings, Average of transmittance ($\bar{t}$) or transmission ($\bar{T}$): This may be calculated through dividing the sum total of transmittance/transmission values for different physical dimensions (e.g. widths (w)) by the number of studied width samples ($N_w$), which may be used for $2\pi$ phase-coverage, $$\bar{t} = \frac{1}{N_w} \sum_{i=1}^{i=N_w} |T(w_i)|^2 = \frac{1}{N_w} \sum_{i=1}^{i=N_w} t(w_i), \quad (4)$$

$$\bar{T} = \frac{1}{N_w} \sum_{i=1}^{i=N_w} |T(w_i)|. \quad (5)$$

Average of reflectance ($\bar{r}$) or reflection ($\bar{R}$): The average of the reflectance/reflection values calculated for different physical dimensions (e.g. w) over the studied number of width samples ($N_w$), $$\bar{r} = \frac{1}{N_w} \sum_{i=1}^{i=N_w} |R(w_i)|^2 = \frac{1}{N_w} \sum_{i=1}^{i=N_w} r(w_i), \quad (6)$$

$$\bar{R} = \frac{1}{N_w} \sum_{i=1}^{i=N_w} |R(w_i)|. \quad (7)$$

Standard deviation of transmission ($\sigma_T$) or transmittance ($\sigma_t$): $\sigma_t/\sigma_T$ is a measure of how spread out the transmittance/transmission values are. Therefore, it can help to quantify the uniformity of the transmittance/transmission response, $$\sigma_T = \sqrt{\frac{1}{N_w} \sum_{i=1}^{i=N_w} \left(|T(w_i)| - \bar{T}\right)^2}, \quad (8)$$

$$\sigma_t = \sqrt{\frac{1}{N_w} \sum_{i=1}^{i=N_w} \left(|t(w_i)| - \bar{t}\right)^2}. \quad (9)$$

Transmitted first-order diffraction ($T_{+1}$): This is related to the diffracted power toward the desired angle. This can be translated to the increment of directivity ($D(\theta, \varphi)$). In case of increment of meta-array efficiency (e.g. the ratio of the radiated power to the incident power), gain may be increased as well.

Reflected zero-order diffraction (also called specular reflection or mirror-like reflection, $R_0$) and the transmitted zero-order diffraction ($T_0$): These can be considered as undesired diffraction orders which should be diminished in order to decrease the imaging/sensing artifacts. This can be translated to the decrement of the radiation pattern side-lobes in a finite meta-array.

Average of transmitted first-order diffraction ($\sqrt{T_{+1}}$), transmitted zero-order diffraction ($\sqrt{T_0}$), and reflected zero-order diffraction ($\sqrt{R_0}$): These can be obtained by calculating the average of $T_{1+}$, $T_0$, and $R_0$ across different target angles (e.g. 5°, 7.7°, 10.5°, 13.3°, 16.11°, 18.8°, 21.6°, 24.4°, 27.2°, and 30°).

Example 1

FIG. 18 is a table comparison of the optical performances ($\bar{T}$, $\bar{t}$, $\bar{r}$, $\sigma_T$, and $\sigma_t$) of the Si nanobar unit-cell which are illustrated in FIGS. 17A-17C in the absence and presence of multilayer self-aligned low-index coatings in accordance with various embodiments of the invention. The table compares optical performance quantitative values for $\bar{T}$, $\bar{t}$, $\sqrt{\bar{r}}$, $\sigma_T$, and $\sigma_t$ obtained from many exemplary embodiments including Si nanogratings in the presence and absence of multilayer self-aligned low-index coatings. The optimized thicknesses $$\left(h_{cap}^1, h_{cap}^2\right)$$

and refractive indices $$\left(n_{cap}^1, n_{cap}^2\right)$$

of the multilayer self-aligned coatings are also provided in FIG. 18 along with the height and periodicity of the Si nanobars (h and P). The width range is considered between 120 nm and (P-120 nm) with the step size of 2 nm.

As seen, the incorporation of pillar caps helps increase the average of transmission and transmittance ($\bar{T}$ and $\bar{t}$) and decrease the average of reflection and reflectance ($\bar{R}$ and $\bar{r}$). This means higher total transmission in case of presence of multilayer low-index self-aligned coatings. Moreover, the standard deviation of transmittance/transmission ($\sigma_t$ and $\sigma_T$) is decreased by adding the low-index caps which can be translated to a more uniform transmission amplitude during phase modulation for all the individual unit-cells. As a result, the engineered wave-front in the transmission mode will be more uniform. Better performance results were yielded with a higher number of cap/coating layers.

Example 2

FIG. 19 is a table comparison of the optical performances ($T_{+1}$, $T_0$, and $R_0$) of Si nanogratings in the presence and absence of multilayer self-aligned low-index coatings for target angles of 5°, 10.5°, 16.11°, 21.6°, and 30° in accordance with various embodiments of the invention. The table compares the transmitted first-order ($T_{+1}$), transmitted zero-order ($T_0$), and reflected zero-order ($R_0$) diffractions of exemplary embodiments including a Si nanograting in the presence and absence of multi-layer self-aligned low-index coatings. The optimized thicknesses $$\left(h_{cap}^1, h_{cap}^2\right)$$

and refractive indices $$\left(n_{cap}^1, n_{cap}^2\right)$$

23 of multilayer self-aligned coatings are also provided in FIG. 11 along with the height and periodicity of Si nanogratings (h and P). The target angles are chosen between π/6 and π/3 and the pillar's width range is considered between 120 nm and P-120 nm with the step size of 2 nm.

As indicated in FIG. 19, the integration of self-aligned pillar caps gradually improves the transmitted first-order diffraction ($T_{+1}$) for almost all the target angles smaller than ±30°. The results related to the negative target angles are omitted here for the sake of brevity. As illustrated, the values the angles of $T_{+1}$ are more than 5% higher when comparing cases where the low-index coating(s) are present than in the absence of the low-index coating for angles between 5° and 30°. Advantageously, the two-layer low-index coating is more than 10% higher for the higher target angles (e.g. 30°). Thus, using multi-layer pillar coatings may lead to the implementation of a highly directive meta-array with high gain.

Furthermore, the reflected zero-order diffraction significantly decreases for the illustrated angles of 5°, 10.5°, 16.11°, 21.6°, and 30°. As illustrated, the reflected zero-order diffractions ($R_0$) have been decreased at least by 80% of their values for all angles when comparing cases where a two-layer low-index coating is present and where the low-index coating is absent. The transmitted zero-order ($T_0$) is maintained at a low level for cases where the low-index coating(s) is present or absent. While the values of transmitted/reflected higher-order diffractions, like $T_{\pm2}$, are not provided, their magnitudes may also be decreased and/or kept negligibly small in presence of multi-layer low-index pillar coatings. Since the enhancement of the optical performance has been obtained in a broad angle-of-view, the presence of multi-layer low index pillar coatings may increase optical efficiency for more sophisticated optical platforms like holograms with maximum deflection angle of θ<30° and focusing lenses with f-number as low as approximately 0.9.

Further, FIG. 20 is a table comparison of the optical performances ($\overline{T_{+1}}$, $\overline{R_0}$, and $\overline{T_0}$) of the optimized Si nanogratings in the absence and presence of multilayer self-aligned low-index coatings in accordance with various embodiments of the invention. FIG. 20 is a table illustrating the results of the self-aligned pillar caps described in connection with FIG. 19 indicating performance criteria for the average of transmitted first-order diffraction ($\overline{T_{+1}}$), transmitted zero-order diffraction ($\overline{T_0}$), and reflected zero-order diffraction ($\overline{R_0}$). It can be clearly seen that the $\overline{T_{+1}}$ increases from 74.84% in the absence of pillar coatings to 80.84% in presence of a single-layer low-index coating and finally became 84.20% by using two-layer self-aligned pillar coatings. Moreover, almost an 85% reduction of the average specular reflection ($\overline{R_0}$) is observed when comparing the absence of pillar coatings and the presence of a two-layer low-index coating. Finally, $\overline{T_0}$ has been decreased from 0.87% in the absence of pillar coatings to 0.68% in the presence of a two-layer low-index pillar coating. Thus, a skilled artisan would recognize an upward trend of better performance based on more layers of low-index pillar coatings.

Doctrine of Equivalents

While the above description contains many specific embodiments of the invention, these should not be construed as limitations on the scope of the invention, but rather as an example of one embodiment thereof. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A meta-surface device comprising:
a substrate;
a pattern of high-index pillars formed on the substrate; and
a coating of low-index material overlapping with the high-index pillars, wherein the coating of low-index material has a lower refractive index than the high-index pillars; wherein the coating of low-index material is in direct contact with the high-index pillars wherein the coating of low-index material is coated only on top surfaces of the high-index pillars;
a low-index encapsulation material, wherein the coating of low-index material is positioned between the low-index encapsulation material and the high-index pillars; and
a second low-index coating located between the high-index pillars and the substrate.

2. The meta-surface device of claim 1, wherein the pattern of high-index pillars comprises silicon, germanium, gallium phosphorus, gallium arsenic, gallium antimony, indium phosphorus, indium arsenic, indium antimony, titanium oxide, silicon nitride, or germanium-antimony-tellurium; and wherein the coating of low-index material comprises aluminum oxide, silicon oxide, magnesium oxide, magnesium fluoride, silicon nitride, or hafnium oxide.

3. The meta-surface device of claim 1, wherein the high-index pillars are surrounded by the low-index encapsulation material.

4. The meta-surface device of claim 1, wherein the coating of low-index material comprises a multi-layer low-index material.

5. The meta-surface device of claim 4, wherein the multi-layer low-index material comprises two or more layers of low-index material each having a refractive index lower than the high-index pillars.

6. The meta-surface device of claim 1, wherein the substrate comprises lower refractive index than the refractive index of the high-index pillars.

7. The meta-surface device of claim 1, wherein the coating of low-index material is located on a side of the high-index pillars opposite to the substrate.

8. The meta-surface device of claim 1, wherein the coating of low-index material is located between the high-index pillars and the substrate.

9. The meta-surface device of claim 1, wherein the coating of low-index material is located both on a side of the high-index pillars opposite to the substrate and between the high-index pillars and the substrate.

10. The meta-surface device of claim 1, wherein the coating of low-index material is conformally coated on the top and side surfaces of the high-index pillars.

11. The meta-surface device of claim 1, wherein the coating of low-index material is coated only on top surfaces of the high-index pillars.

12. The meta-surface device of claim 1, wherein the high-index pillars each reside within a plurality of openings in the substrate.

13. The meta-surface device of claim 12, wherein the coating of low-index material is conformally coated on the substrate including the plurality of openings.

14. The meta-surface device of claim 13, wherein portions of the coating of low-index material are between the substrate and the high-index pillars.

15. The meta-surface device of claim 1, wherein the coating of low-index material comprises one or more transverse dimensions about equal to one or more transverse dimensions of the high-index pillars.

16. The meta-surface device of claim 1, wherein the high-index pillars comprise a semiconductor or chalcogenide material and the coating of low-index material comprises a lower index dielectric or oxide.

17. The meta-surface device of claim 1, wherein the coating of low-index material has a refractive index between 1.46 and 2.1.

18. The meta-surface device of claim 17, wherein the high-index pillars have a refractive index above 1.8.

19. The meta-surface device of claim 18, wherein the high-index pillars have a refractive index above 2.5.

20. The meta-surface device of claim 1, wherein the second low-index coating is a continuous layer coating the substrate directly contacting the high-index pillars and the low-index encapsulation material.

* * * * *